US012141107B2

(12) United States Patent
Joyce et al.

(10) Patent No.: US 12,141,107 B2
(45) Date of Patent: Nov. 12, 2024

(54) TECHNIQUES FOR DISCOVERING AND UPDATING SEMANTIC MEANING OF DATA FIELDS

(71) Applicant: Ab Initio Technology LLC, Lexington, MA (US)

(72) Inventors: John Joyce, Boston, MA (US); David Huang, Sugar Land, TX (US); Andrew Chang, Westford, MA (US); Niel Morrison, Western Cape (ZA)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 18/470,405

(22) Filed: Sep. 19, 2023

(65) Prior Publication Data
US 2024/0095219 A1      Mar. 21, 2024

Related U.S. Application Data

(60) Provisional application No. 63/408,400, filed on Sep. 20, 2022.

(51) Int. Cl.
| G06F 16/00 | (2019.01) |
| G06F 16/21 | (2019.01) |
| G06F 40/30 | (2020.01) |

(52) U.S. Cl.
CPC ............. *G06F 16/21* (2019.01); *G06F 40/30* (2020.01)

(58) Field of Classification Search
CPC ................................ G06F 16/21; G06F 40/30
USPC ......................................................... 707/802
See application file for complete search history.

(56) References Cited

U.S. PATENT DOCUMENTS

| 7,587,636 | B2 | 9/2009 | Tillmann et al. |
| 7,756,873 | B2 | 7/2010 | Gould et al. |
| 7,849,075 | B2 | 12/2010 | Gould et al. |
| 8,082,243 | B2 | 12/2011 | Gorelik et al. |
| 8,379,939 | B1 | 2/2013 | Bourdev et al. |
| 8,583,747 | B2 | 11/2013 | Buchheit et al. |

(Continued)

FOREIGN PATENT DOCUMENTS

EP      3 745 276 A1     12/2020

OTHER PUBLICATIONS

*U.S. Appl. No. 18/545,416, filed Dec. 19, 2023, Joyce et al.

(Continued)

*Primary Examiner* — Alexandria Y Bromell
(74) *Attorney, Agent, or Firm* — Wolf, Greenfield & Sacks, P.C.

(57) ABSTRACT

Techniques for discovering semantic meaning of data in fields included in one or more data sets, the method including: a first field having a previously-assigned label that indicates a semantic meaning of the first field; identifying a set of one or more candidate labels, for potential assignment to the first field instead of the previously-assigned label; evaluating, using a previously-determined label score and a first candidate label score, whether to assign a first candidate label to the first field, the evaluating comprising: when the first candidate label score is at least a first threshold amount greater than a previously-determined label score, presenting the first candidate label to a user by generating an interface through which the user can provide input indicating whether to assign the first candidate label to the first field instead of the previously-determined label.

20 Claims, 28 Drawing Sheets

(56) References Cited

U.S. PATENT DOCUMENTS

| | | | |
|---|---|---|---|
| 8,732,213 | B2 | 5/2014 | Sowell et al. |
| 8,868,580 | B2 | 10/2014 | Gould et al. |
| 9,792,351 | B2 | 10/2017 | Hernandez-Sherrington et al. |
| 10,198,460 | B2 | 2/2019 | Gorelik |
| 10,409,802 | B2 | 9/2019 | Spitz et al. |
| 10,459,954 | B1 | 10/2019 | Walters et al. |
| 10,489,360 | B2 | 11/2019 | Procops et al. |
| 10,552,443 | B1 | 2/2020 | Wu et al. |
| 10,565,177 | B2 | 2/2020 | Gausman |
| 11,704,494 | B2 | 7/2023 | Butler et al. |
| 11,886,399 | B2 | 1/2024 | Joyce et al. |
| 2007/0027674 | A1 | 2/2007 | Parson et al. |
| 2008/0027860 | A1 | 1/2008 | Mullen et al. |
| 2008/0201172 | A1 | 8/2008 | McNamar |
| 2009/0123419 | A1 | 5/2009 | Sherman et al. |
| 2012/0030160 | A1 | 2/2012 | Ratnam et al. |
| 2012/0254333 | A1 | 10/2012 | Chandramouli et al. |
| 2013/0073594 | A1 | 3/2013 | Jugulum et al. |
| 2014/0108357 | A1 | 4/2014 | Procops et al. |
| 2014/0280062 | A1 | 9/2014 | Augustin et al. |
| 2015/0095296 | A1 | 4/2015 | Nandwani et al. |
| 2016/0042225 | A1 | 2/2016 | Barak |
| 2016/0055427 | A1 | 2/2016 | Adjaoute |
| 2016/0364325 | A1 | 12/2016 | Ouzzani et al. |
| 2017/0060894 | A1 | 3/2017 | Gorelik |
| 2017/0068891 | A1 | 3/2017 | Shironoshita |
| 2017/0139975 | A1* | 5/2017 | Chow .................... G06N 5/022 707/707 |
| 2017/0193838 | A1 | 7/2017 | Buchenau et al. |
| 2017/0235848 | A1 | 8/2017 | Van Dusen et al. |
| 2018/0060404 | A1 | 3/2018 | Sun et al. |
| 2018/0107694 | A1* | 4/2018 | Dupey ................ G06F 16/2365 707/707 |
| 2019/0215331 | A1 | 7/2019 | Anakata et al. |
| 2019/0220508 | A1 | 7/2019 | Hu |
| 2020/0012626 | A1 | 1/2020 | Walters et al. |
| 2020/0012666 | A1 | 1/2020 | Walters et al. |
| 2020/0110736 | A1 | 4/2020 | Bauman |
| 2020/0301950 | A1 | 9/2020 | Lorrain-Hale et al. |
| 2020/0380212 | A1* | 12/2020 | Butler ..................... G06F 40/30 707/707 |
| 2021/0192394 | A1 | 6/2021 | McKay et al. |
| 2021/0263900 | A1* | 8/2021 | Joyce ..................... G06N 20/00 707/707 |
| 2022/0245175 | A1 | 8/2022 | Hawco et al. |
| 2023/0409835 | A1 | 12/2023 | Butler et al. |
| 2024/0126734 | A1 | 4/2024 | Joyce et al. |
| 2024/0126735 | A1 | 4/2024 | Joyce et al. |
| 2024/0152495 | A1 | 5/2024 | Joyce et al. |

OTHER PUBLICATIONS

*U.S. Appl. No. 18/399,522, filed Dec. 28, 2023, Joyce et al.
*U.S. Appl. No. 18/399,545, filed Dec. 28, 2023, Joyce et al.
*U.S. Appl. No. 18/201,545, filed May 24, 2023, Butler et al.
PCT/US2023/074617, mailed Jan. 3, 2024, International Search Report and Written Opinion.
PCT/US2020/035226, mailed Dec. 9, 2021, International Preliminary Report on Patentability.
EP 20177617.6, mailed Aug. 5, 2022, Communication pursuant to Article 94(3).
PCT/US2020/035226, mailed Aug. 19, 2020, International Search Report and Written Opinion.
PCT/US2021/019572, mailed Jul. 22, 2021, International Search Report and Written Opinion.
PCT/US2021/019572, mailed Jun. 1, 2021, Invitation to Pay Additional Fees.
PCT/US2021/019572, mailed Sep. 9, 2022, International Preliminary Report on Patentability,
EP 20177617.6, mailed Sep. 7, 2020, Extended European Search Report.
CA 3142252, mailed Jan. 30, 2024, Office Action.
EP 20177617.6, mailed Oct. 31, 2023, Summons to attend oral proceedings.
JP 2022-550704, mailed May 23, 2024, Office Action.
International Preliminary Report on Patentability for International Application No. PCT/US2020/035226 mailed Dec. 9, 2021.
Communication pursuant to Article 94(3) EPC for European Application No. 20177617.6 mailed Aug. 5, 2022.
International Search Report and Written Opinion for International Application No. PCT/US2020/035226 mailed Aug. 19, 2020.
International Search Report and Written Opinion for International Application No. PCT/US2021/019572 mailed Jul. 22, 2021.
Invitation to Pay Additional Fees for International Application No. PCT/US2021/019572 mailed Jun. 1, 2021.
International Preliminary Report on Patentability for International Application No. PCT/US2021/019572 mailed Sep. 9, 2022.
Extended European Search Report for European Application No. 20177617.6 mailed Sep. 7, 2020.
International Search Report and Written Opinion for International Application No. PCT/US2023/074617 mailed Jan. 3, 2024.
Canadian Office Action for Canadian Application No. 3142252 mailed Jan. 30, 2024. 8 pages.
Summons to attend oral proceedings for European Application No. 20177617.6 mailed Oct. 31, 2023.
Japanese Office Action for Japanese Application No. 2022-550704 dated May 23, 2024.
[No Author Listed], Informatica Advanced Masking Solution. Informatica. 2018. 3 pages. https://www.informatica.com/content/dam/informatica-com/en/collateral/solution-brief/advanced-masking-solution_solution-brief_3580en.pdf (Last accessed Nov. 4, 2023).
[No Author Listed], Rule-based system. Wikipedia. Oct. 2023. 2 pages. https://en.wikipedia.org/wiki/Rule-based_system (Last accessed Nov. 4, 2023).
[No Author Listed], Talend [Online] Get started with data profiling through automatic semantic discovery, Part II—Talend 6 Features. Nov. 10, 2015. 1 page. https://web.archive.org/web/20210721010236/ https://www.youtube.com/watch?v=EltwXhaPASM.
[No Author Listed], talend.com [Online] Semantic Discovery. Retrieved Dec. 10, 2019, retrieved from URL <https://help.talend.com/reader/ nAXiZW0j0H-2-YApZisRFw/uLT6CFkPAjCbZ30Tf9juFw> 8 pages.
[No Author Listed], Using AI and Machine Learning to Power Data Fingerprinting. Waterline Data. 2017. 6 pages. https://www. hitachivantara.com/en-US/pdfd/white-paper/using-ai-ml-to-power-data-fingerprinting-whitepaper.pdf (Last accessed Nov. 4, 2023).
Chen et al., Generating schema labels through dataset content analysis. Companion Proceedings of the The Web Conference 2018. Apr. 23, 2018: 1515-22.
Haldeman, Compare IBM data masking solutions: InfoSphere Optim and DataStage. IBM Corporation, Nov. 15, 2012, 10 pages.
Hassanzadeh, Semantic concept discovery over event databases. IBM. Jul. 17, 2018. 4 pages. https://phys.org/news/2018-07-semantic-concept-discovery-event-databases.html (Last accessed May 14, 2024).
Naumann, Data profiling revisited. ACM Sigmod Record. Feb. 28, 2014;42(4):40-9.
Pham et al., Semantic labeling: a domain-independent approach. The Semantic Web-ISWC 2016: 15th International Semantic Web Conference, Kobe, Japan, Oct. 17-21, 2016:446-62.
Rouse, Semantic Data Model. Techopedia. Jun. 30, 2020. 11 pages. https://www.techopedia.com/definition/30489/semantic-data-model (Last accessed May 14, 2024).

* cited by examiner

TECHNIQUES FOR DISCOVERING AND UPDATING SEMANTIC MEANING OF DATA FIELDS

RELATED APPLICATIONS

This Application claims the benefit under 35 U.S.C. § 119(e) of U.S. Provisional Application Ser. No. 63/408,400, filed Sep. 20, 2022, entitled "TECHNIQUES FOR DISCOVERING AND UPDATING SEMANTIC MEANING OF DATA FIELDS", which is herein incorporated in its entirety.

FIELD

This disclosure relates to computerized discovery of semantic meaning of data. More specifically, this disclosure relates to techniques of updating semantic meaning of data.

BACKGROUND

An organization (e.g., a multinational corporation, e-commerce company, or other company) may store its data in a data set comprising multiple fields. Data stored in each of the fields may indicate a certain type of information. For example, a data set may store address information for users that includes a zip code field, a street name field, a house number field, a city field, a state field, and a country field. In another example, a data set may store information about bank accounts in an account number field, an account holder field, and a balance field.

SUMMARY

The following systems and processes described in this disclosure can include one or more of the following advantages. In many systems, existing data sets that can be very large and undocumented. In some cases, if the data sets are labeled, the labels can be inconsistent or technical in nature such that it is difficult to ascertain business information from the labels. Due to legacy systems, and versioning of the systems over time, if can be difficult to determine what each portion of the data set is in a practical context. There is a need to develop annotation to such data sets.

These systems and processes are configured to rapidly and, in some cases, automatically provide labels for data sets. The system and processes described in this document are configured to perform a series of statistical checks on metadata and data content of a data set in order to discover, classify, and label data content of the data set. Discovering data content includes determining that the data content (or data field) is present in the data set. For example, the systems and processes described in this disclosure provide for the labeling of data fields (e.g., columns in a table or a database) that is either non-labeled or labeled in a non-meaningful way. These systems and processes are configured to discover that particular data fields are present in the data set and label the particular data fields. To do this labelling, the systems and processes described in this document are configured to map a descriptive definition to fields of the data set, such as by assigning business terms or domains to the fields of the data sets. The labels that are generated for the data fields provide information about the data content stored in the data fields. The information can indicate what kind of data content is included in the data fields (e.g., phone numbers, first names, dates, etc.).

The information can be used by computing systems for various applications. For example, applications that can use the generated labels of data sets can include data quality enforcement, personal data anonymization, data masking, personally identifiable information (PII) reports, test data management, data set annotation, and so forth. For example, comment data may include PII, and may require masking. In another example, the systems and processes described in this document can provide a mechanism to label $3r$ d party data from different sources. This can be useful for systems in which the system administrator is responsible for knowing and understanding what data is in the data set stored on the system, such as for regulatory reasons.

In addition, the systems and processes described herein enable an infrastructure to be built that allows data standards to be applied across many different data items from different data sources. The infrastructure can be easily modified (e.g., by adding definitions to classification tests through a user interface) so that additional tests can be added as new data requirements are determined.

In some embodiments, a method implemented by a data processing system for discovering semantic meaning of data in fields included in one or more data sets is provided. The method comprises: using the data processing system to perform: identifying a first field having a previously-assigned label that indicates a semantic meaning of the first field, the previously-assigned label having a corresponding previously-determined label score; identifying a set of one or more candidate labels, for potential assignment to the first field instead of the previously-assigned label, and a corresponding set of candidate label scores, the set of candidate labels including a first candidate label corresponding to a first candidate label score in the set of candidate label scores; and evaluating, using the previously-determined label score and the first candidate label score, whether to assign the first candidate label to the first field, the evaluating comprising: when the first candidate label score is at least a first threshold amount greater than the previously-determined label score, presenting the first candidate label to a user by generating an interface through which the user can provide input indicating whether to assign the first candidate label to the first field instead of the previously-determined label; and when the first candidate label score is not at least the threshold amount greater than the previously determined label score, bypassing presentation of the first candidate label to the user.

In some embodiments, bypassing presentation of the first candidate label to the user comprises bypassing generation of the interface through which the user can provide input indicating whether to assign the first candidate label to the first field instead of the previously-determined label.

In some embodiments, the method further comprises: identifying a second field, different from the first field, that does not have an assigned label that indicates a semantic meaning of the second field, wherein one or more previously-identified candidate labels were previously identified for potential assignment to the second field with a corresponding set of previous candidate label scores and wherein none of the previously-identified candidate labels were assigned to the second field; identifying a second set of one or more candidate labels, for potential assignment to the second field, and a corresponding second set of candidate label scores, the second set of candidate labels including a second candidate label corresponding to a second candidate label score in the second set of candidate label scores; and evaluating, using the previous candidate label scores and the second candidate label score, whether to assign the second candidate label to the second field, the evaluating comprising: when the second candidate label score is at least a second threshold amount greater than each of the previous candidate label scores, presenting the second candidate label to the user by generating an interface through which the user can provide input indicating whether to assign the second candidate label to the second field; and when the second candidate label score is not at least the threshold amount greater than each of the previous candidate label scores, bypassing presentation of the second candidate label to the user.

In some embodiments, the method further comprises: identifying a third field that does not have an assigned label that indicates a semantic meaning of the third field, wherein no candidate labels were previously identified for potential assignment to the third field; identifying a third set of one or more candidate labels, for potential assignment to the third field, and a corresponding third set of candidate label scores, the third set of candidate labels including a third candidate label corresponding to a third candidate label score in the third set of candidate label scores; and evaluating whether to assign the third candidate label to the third field, the evaluating comprising: presenting the third candidate label to the user by generating an interface through which the user can provide input indicating whether to assign the third candidate label to the third field.

In some embodiments, wherein identifying the set of one or more candidate labels for potential assignment to the first field and the corresponding set of candidate label scores comprises: applying a plurality of label proposal tests to a profile of the first field to obtain a plurality of label proposals and a corresponding plurality of label proposal scores; and determining the set of one or more candidate labels and the corresponding set of candidate label scores using the plurality of label proposals and the corresponding plurality of label proposal scores. In some embodiments, wherein the plurality of label proposal tests are associated with a plurality of weight values, and determining the set of candidate label scores comprises: determining the set of candidate label scores using the plurality of label proposal scores and the plurality of weight values.

In some embodiments, the method further comprises: in response to receiving user input indicating to assign the first candidate label to the first field, storing, in a data store, an identifier of the first field in association with the first candidate label to indicate the semantic meaning of the first field.

In some embodiments, the method further comprises using the data processing system to perform: after evaluating whether to assign the first candidate label to the first field: determining a label assigned to the first field; associating one or more attributes with the first field based on the label assigned to the first field, the one or more attributes indicating that data in the first field includes personally identifying information (PII); and processing at least some data from the first field based on the one or more attributes. In some embodiments, wherein processing the at least some data from the first field based on the one or more attributes comprises masking of PII in data from the first field.

In some embodiments, the method further comprises using the data processing system to perform: after evaluating whether to assign the first candidate label to the first field, using a label assigned to the first field to execute at least one software application that performs data quality enforcement, PII anonymization, and/or data masking of personally identifiable information (PII). In some embodiments, the label assigned to the first field indicates that the first field includes PII.

In some embodiments, the method further comprises using the data processing system to perform: after the evaluating whether to assign the first candidate label to the first field, receiving a request to process data managed by the data processing system; accessing, in response to the request, the label assigned to the first field; determining, based on the label assigned to the first field, one or more data processing rules for processing the data; and processing the data in accordance with the determined one or more data processing rules. In some embodiments, the data includes data stored in the first field. In some embodiments, the determining, based on the label assigned to the first field, one or more data processing rules for processing the data includes: identifying, in a label index data structure, the label assigned to the first field; identifying, from the label index data structure, the one or more data processing rules associated with the label identified in the label index data structure, wherein one or more data processing rules are associated with the label in the label index data structure. In some embodiments, the label assigned to the first field indicates that the data stored in the first field includes PII, and the one or more data processing rules include one or more data masking rules to mask PII. In some embodiments, processing the data in accordance with the determined one or more data processing rules comprises masking PII included in the first field without scanning data in the first field to determine whether it includes PII. In some embodiments, the label assigned to the first field indicates that the data stored in the first field includes PII, and the one or more data processing rules include one or more data anonymization rules to anonymize PII in the first field. In some embodiments, processing the data in accordance with the determined one or more data processing rules comprises processing the data in accordance with the determined one or more data processing rules without analyzing data stored in the first field.

In some embodiments, a data processing system for discovering semantic meaning of data in fields included in one or more data sets is provided. The data processing system comprises: at least one processor; and at least one non-transitory computer-readable storage medium storing instructions that, when executed by the at least one processor, cause the at least one processor to perform a method comprising: identifying a first field having a previously-assigned label that indicates a semantic meaning of the first field, the previously-assigned label having a corresponding previously-determined label score; identifying a set of one or more candidate labels, for potential assignment to the first field instead of the previously-assigned label, and a corresponding set of candidate label scores, the set of candidate labels including a first candidate label corresponding to a first candidate label score in the set of candidate label scores; and evaluating, using the previously-determined label score and the first candidate label score, whether to assign the first candidate label to the first field, the evaluating comprising: when the first candidate label score is at least a first threshold amount greater than the previously-determined label score, presenting the first candidate label to a user by generating an interface through which the user can provide input indicating whether to assign the first candidate label to the first field instead of the previously-determined label; and when the first candidate label score is not at least the threshold amount greater than the previously determined label score, bypassing presentation of the first candidate label to the user.

In some embodiments, at least one non-transitory computer-readable storage medium storing instructions is provided. The instructions, when executed by at least one processor of a data processing system, cause the at least one processor to perform a method for discovering meaning of data in fields included in one or more data sets. The method comprises: identifying a first field having a previously-assigned label that indicates a semantic meaning of the first field, the previously-assigned label having a corresponding previously-determined label score; identifying a set of one or more candidate labels, for potential assignment to the first field instead of the previously-assigned label, and a corresponding set of candidate label scores, the set of candidate labels including a first candidate label corresponding to a first candidate label score in the set of candidate label scores; and evaluating, using the previously-determined label score and the first candidate label score, whether to assign the first candidate label to the first field, the evaluating comprising: when the first candidate label score is at least a first threshold amount greater than the previously-determined label score, presenting the first candidate label to a user by generating an interface through which the user can provide input indicating whether to assign the first candidate label to the first field instead of the previously-determined label; and when the first candidate label score is not at least the threshold amount greater than the previously determined label score, bypassing presentation of the first candidate label to the user.

In an aspect, a system is configured for identifying a field included in one or more data sets, with the field having an identifier; and for that field: profiling, by a data processing system, one or more data values of the field to generate a data profile; accessing a plurality of label proposal tests; based on applying at least the plurality of label proposal tests to the data profile, generating a set of label proposals; determining a similarity among the label proposals in the set of label proposals; based at least on the similarity among the label proposals in the set, selecting a classification; based on the classification, rendering a graphical user interface that requests input in identifying a label proposal that identifies the semantic meaning or determining that no input is required; identifying one of the label proposals as identifying the semantic meaning; and storing, in a data store, the identifier of the field with the identified one of the label proposals that identifies the semantic meaning. The function of the preamble is to set forth the general technical environment of the invention.

In some implementations, profiling the one or more data values of the field includes determining a format of a data value of the field. Profiling the data values of the field includes determining a statistical value representing the data values included in the field. The statistical value comprises at least one of a minimum length of the data values of the field, a maximum length of the data values of the field, a most common data value of the field, a least common data value of the field, a maximum data value of the field, and a minimum data value of the field. Applying the plurality of label proposal tests includes: determining that the field includes a primary key for a data set of the one or more data sets; and selecting a label proposal test of the plurality of label proposal tests that are that is related to the primary key. Applying the plurality of label proposal tests includes: performing a metadata comparison of data values of the field to terms in a glossary of terms. Applying the plurality of label proposal tests includes: determining, from the data profile, a pattern represented by the data values stored of the field; determining a particular label that is mapped to the pattern; and labeling the field with the particular label. Applying the plurality of label proposal tests includes: retrieving a list of values that are representative of a data collection; comparing the data values of the field to the list of values; determining, in response to the comparing, that a threshold number of the data values match the values of the list; and in response to the determining, labeling the field with a particular label that specifies the data collection. Applying the plurality of label proposal tests includes: generating at least two labels for the field; and determining whether the at least two labels are exclusive or inclusive of one another.

In some implementations, the system is configured to perform actions further including: determining, in response to applying the plurality of label proposal tests, a relationship between the field and another field of the one or more data sets. The relationship includes one of an indication that a first data value the field determines a second data value stored in the other field, an indication that the first data value correlates to the second data value, or an indication that the first data value is identical to the second data value. The plurality of label proposal tests are each associated with at least one weight value, the method further including: updating a weight value associated with at least one label proposal test; and reapplying the label proposal test to the data profile using the updated weight value.

In some implementations, the actions are further including training the plurality of label proposal tests using a machine learning process. The actions include retrieving, from a data quality rules environment, one or more data quality rules that are assigned to the label proposal specifying the semantic meaning; and assigning a data quality rule of the one or more data quality rules to the field. Comparing the label proposals generated from the label proposal tests includes: applying a score value to each label proposal; for each label of the label proposals, combining the score values associated with that label; and ranking the labels according to the score value associated with each label.

In some implementations, the actions are further including: receiving validation of the label proposals from the plurality of label proposal tests; and responsive to receiving the validation, weighting the plurality of label proposal tests with the label proposals. The data store includes a data dictionary. In some implementations, the actions are further including: outputting the label proposals to a data quality rules environment. In some implementations, the actions are further including: reducing, based on the identified one of the label proposals, a number of errors for processing data for the field using data quality rules from the data quality environment relative to another number of errors for processing the data for the field without using the identified one of the label proposals.

In an aspect, system includes a data storage storing instructions; and at least one processor configured to execute the instructions stored by the data storage to perform operations including: identifying a field included in one or more data sets, with the field having an identifier; and for that field: profiling, by a data processing system, one or more data values of the field to generate a data profile; accessing a plurality of label proposal tests; based on applying at least the plurality of label proposal tests to the data profile, generating a set of label proposals; determining a similarity among the label proposals in the set of label proposals; based at least on the similarity among the label proposals in the set, selecting a classification; based on the classification, rendering a graphical user interface that requests input in identifying a label proposal that identifies the semantic meaning or determining that no input is required; identifying one of the label proposals as identifying the semantic meaning; and storing, in a data store, the identifier of the field with the identified one of the label proposals that identifies the semantic meaning.

In some implementations, profiling the one or more data values of the field includes determining a format of a data value of the field. Profiling the data values of the field includes determining a statistical value representing the data values included in the field. The statistical value comprises at least one of a minimum length of the data values of the field, a maximum length of the data values of the field, a most common data value of the field, a least common data value of the field, a maximum data value of the field, and a minimum data value of the field. Applying the plurality of label proposal tests includes: determining that the field includes a primary key for a data set of the one or more data sets; and selecting a label proposal test of the plurality of label proposal tests that are that is related to the primary key. Applying the plurality of label proposal tests includes: performing a metadata comparison of data values of the field to terms in a glossary of terms. Applying the plurality of label proposal tests includes: determining, from the data profile, a pattern represented by the data values stored of the field; determining a particular label that is mapped to the pattern; and labeling the field with the particular label. Applying the plurality of label proposal tests includes: retrieving a list of values that are representative of a data collection; comparing the data values of the field to the list of values; determining, in response to the comparing, that a threshold number of the data values match the values of the list; and in response to the determining, labeling the field with a particular label that specifies the data collection. Applying the plurality of label proposal tests includes: generating at least two labels for the field; and determining whether the at least two labels are exclusive or inclusive of one another.

In some implementations, the system is configured to perform actions further including: determining, in response to applying the plurality of label proposal tests, a relationship between the field and another field of the one or more data sets. The relationship includes one of an indication that a first data value the field determines a second data value stored in the other field, an indication that the first data value correlates to the second data value, or an indication that the first data value is identical to the second data value. The plurality of label proposal tests are each associated with at least one weight value, the method further including: updating a weight value associated with at least one label proposal test; and reapplying the label proposal test to the data profile using the updated weight value.

In some implementations, the actions are further including training the plurality of label proposal tests using a machine learning process. The actions include retrieving, from a data quality rules environment, one or more data quality rules that are assigned to the label proposal specifying the semantic meaning; and assigning a data quality rule of the one or more data quality rules to the field. Comparing the label proposals generated from the label proposal tests includes: applying a score value to each label proposal; for each label of the label proposals, combining the score values associated with that label; and ranking the labels according to the score value associated with each label.

In some implementations, the actions are further including: receiving validation of the label proposals from the plurality of label proposal tests; and responsive to receiving the validation, weighting the plurality of label proposal tests with the label proposals. The data store includes a data dictionary. In some implementations, the actions are further including: outputting the label proposals to a data quality rules environment. In some implementations, the actions are further including: reducing, based on the identified one of the label proposals, a number of errors for processing data for the field using data quality rules from the data quality environment relative to another number of errors for processing the data for the field without using the identified one of the label proposals.

In an aspect, a system includes means for identifying a field included in one or more data sets, with the field having an identifier; for that field: means for profiling, by a data processing system, one or more data values of the field to generate a data profile; means for accessing a plurality of label proposal tests; means for generating, based on applying at least the plurality of label proposal tests to the data profile, a set of label proposals; means for determining a similarity among the label proposals in the set of label proposals; means for selecting, based at least on the similarity among the label proposals in the set, a classification; means for rendering, based on the classification, a graphical user interface that requests input in identifying a label proposal that identifies the semantic meaning or determining that no input is required; means for identifying one of the label proposals as identifying the semantic meaning; and means for storing, in a data store, the identifier of the field with the identified one of the label proposals that identifies the semantic meaning.

In some implementations, profiling the one or more data values of the field includes determining a format of a data value of the field. Profiling the data values of the field includes determining a statistical value representing the data values included in the field. The statistical value comprises at least one of a minimum length of the data values of the field, a maximum length of the data values of the field, a most common data value of the field, a least common data value of the field, a maximum data value of the field, and a minimum data value of the field. Applying the plurality of label proposal tests includes: determining that the field includes a primary key for a data set of the one or more data sets; and selecting a label proposal test of the plurality of label proposal tests that are that is related to the primary key. Applying the plurality of label proposal tests includes: performing a metadata comparison of data values of the field to terms in a glossary of terms. Applying the plurality of label proposal tests includes: determining, from the data profile, a pattern represented by the data values stored of the field; determining a particular label that is mapped to the pattern; and labeling the field with the particular label. Applying the plurality of label proposal tests includes: retrieving a list of values that are representative of a data collection; comparing the data values of the field to the list of values; determining, in response to the comparing, that a threshold number of the data values match the values of the list; and in response to the determining, labeling the field with a particular label that specifies the data collection. Applying the plurality of label proposal tests includes: generating at least two labels for the field; and determining whether the at least two labels are exclusive or inclusive of one another.

In some implementations, the system is configured to perform actions further including: determining, in response to applying the plurality of label proposal tests, a relationship between the field and another field of the one or more data sets. The relationship includes one of an indication that a first data value the field determines a second data value stored in the other field, an indication that the first data value correlates to the second data value, or an indication that the first data value is identical to the second data value. The plurality of label proposal tests are each associated with at least one weight value, the method further including: updating a weight value associated with at least one label proposal test; and reapplying the label proposal test to the data profile using the updated weight value.

In some implementations, the actions are further including training the plurality of label proposal tests using a machine learning process. The actions include retrieving, from a data quality rules environment, one or more data quality rules that are assigned to the label proposal specifying the semantic meaning; and assigning a data quality rule of the one or more data quality rules to the field. Comparing the label proposals generated from the label proposal tests includes: applying a score value to each label proposal; for each label of the label proposals, combining the score values associated with that label; and ranking the labels according to the score value associated with each label.

In some implementations, the actions are further including: receiving validation of the label proposals from the plurality of label proposal tests; and responsive to receiving the validation, weighting the plurality of label proposal tests with the label proposals. The data store includes a data dictionary. In some implementations, the actions are further including: outputting the label proposals to a data quality rules environment. In some implementations, the actions are further including: reducing, based on the identified one of the label proposals, a number of errors for processing data for the field using data quality rules from the data quality environment relative to another number of errors for processing the data for the field without using the identified one of the label proposals.

Other features and advantages of the system will become apparent from the following description, and from the claims.

DETAILED DESCRIPTION

Described herein are techniques for assigning labels to fields of one or more datasets that indicate semantic meanings of the fields. The techniques perform various labeling processes to identify the labels for the fields. For example, the labeling processes for a field may involve profiling data from the field, performing tests to identify candidate labels, and generating a graphical user interface (GUI) through which to obtain user input on the candidate labels.

Labeling of fields in the dataset(s) needs to be regularly updated to account for various dynamic factors such as changes in data stored in the fields, new available labels that may be assigned to fields, and/or updates to labeling processes. Techniques described herein intelligently determine whether to repeat labeling processes for fields to reduce the amount of computation required to update labels. The techniques may eliminate some or all of the processes involved in relabeling previously labeled fields. For example, the techniques may eliminate profiling of data values in the field and performance of tests to identify candidate labels for a previously labeled field. As another example, the techniques may bypass generation of a GUI through which to obtain input on candidate labels for a previously labeled field.

Figure 1A:
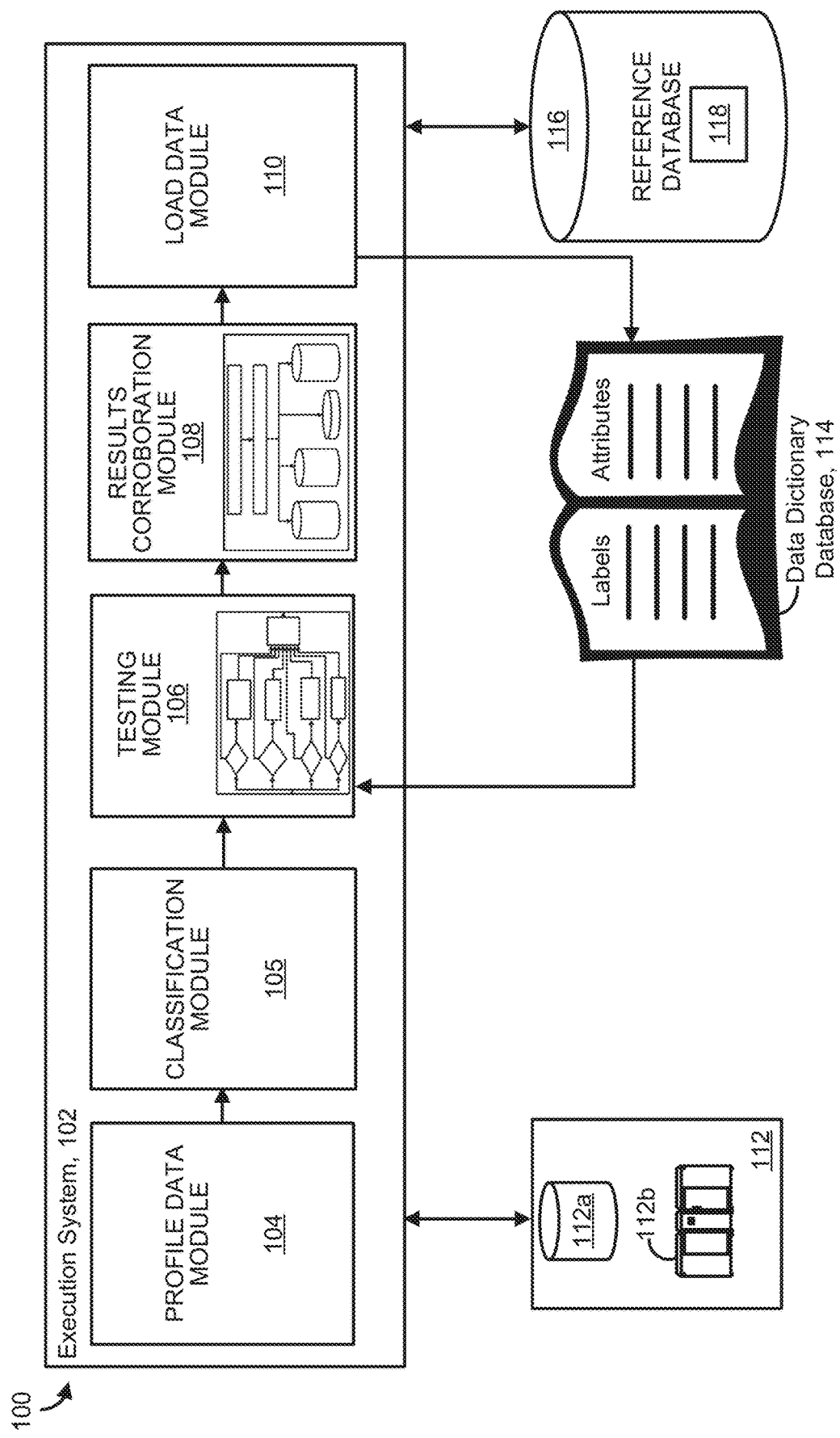
FIGS. 1A-1B are block diagrams of a system for discovering, classifying and labeling data fields by analyzing a data profile generated from data of the data fields.
Figure 1B:
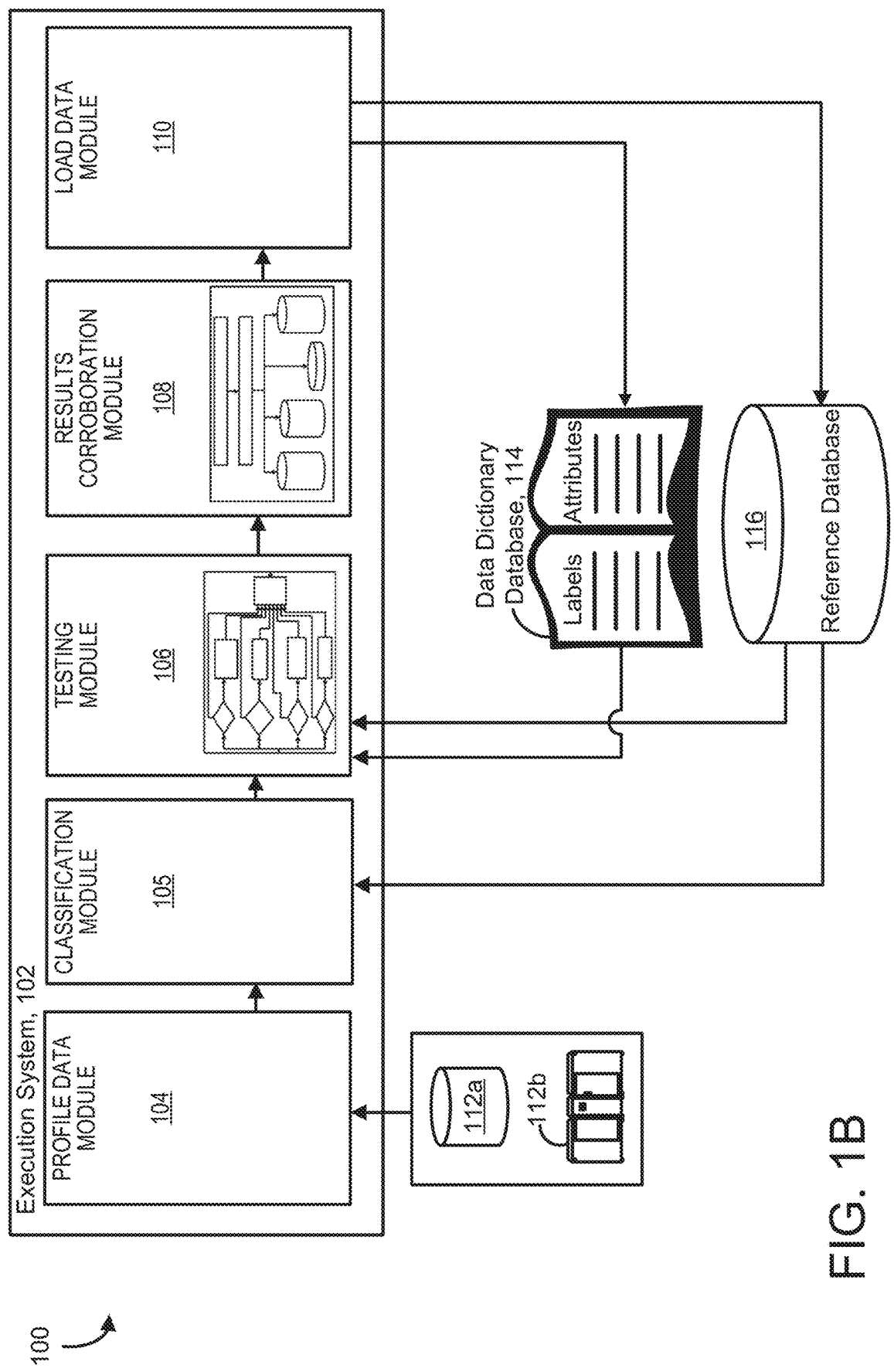

Referring to FIGS. 1A-1B, networked system 100 for discovering, classifying and labeling data fields by analyzing a data profile generated from data of the data fields is shown. The networked system 100 includes an execution system 102, one or more data sources 112, a reference database 116, and a data dictionary database 114. The execution system 102 is configured to receive source data from data source(s) 112a, 112b (collectively data sources 112) in the networked system 100. The execution system 102 is configured to profile source data received from the data sources 112 to generate a data profile representing the source data of the data sources 112. The execution system 102 is configured to analyze the profile data to discover, classify (e.g., test), and associate portions of the source data with labels representing the semantic meaning of those portions of the source data. A portion of the source data can include a field in the source data. In other words, the execution system 102 uses the profile data to determine, using a plurality of classification tests, a semantic meaning for one or more fields of the source data. Classifying the source data comprises associating a probability with the portion of the source data. The probability specifies a likelihood that the portion of the source data corresponds to a label included in the data dictionary database 114. Generally, the execution system 102 includes a profile data module 104, a classification module 105, a testing module 106, a results corroboration module 108, and a load data module 110, which together are configured to discover, classify, and label the data fields of the data received from the data sources 112. A general description of the labeling process by the execution system 102 (also called the semantic discovery process) is now described. The profile data module 104 receives source data 112 and generates profile data. As subsequently described, the profile data includes metadata representing statistical attributes of the source data and the fields of the source data. The profile data can also include data specifying relationships (e.g., statistical correlations, dependencies, and so forth) between or among the fields of the source data.

The classification module 105 classifies each field as having a data type (e.g., a date field, a numeric field, a string, etc.). The classification module checks the reference database 116 for a label index data structure (also referred to herein as a "label index") to determine whether the field (or other fields having a same field name) have already been labeled with a semantic label. A label index data structure may also be referred to herein as a "label index".

Generally, each field in the data set is associated with an identifier, such as a field name. The identifier can also include a field address specifying the location of the field in the data set. For example, the identifier can specify what table the field is in and what column of the table represents the field. In some implementations, the identifier is part of a label index, which associates identifiers of each field with semantic labels for those fields. The identifier can be the name of the field, a key value, or some other value that identifies the field.

The testing module 106 includes a plurality of classifiers each configured to operate on data values of the fields, the field names, and the profile data for each field. The classifiers (also called tests) of the testing module 106 each propose a label to be associated with the field using different methodologies, described in greater detail below. The tests use the dictionary of labels from data dictionary database 114 as a library of labels from which one or more labels can be proposed as identifying the semantic meaning of the field being tested. The tests may propose different labels from one another as a result of using the different methodologies, or the proposed labels can the same from all the tests. The proposed labels (and their scores, if applicable) from each test of the testing module 106 are sent to the results corroboration module 108.

The results corroboration module 108 buckets the proposed labels for a field into a category based on an amount of similarity among the proposed labels of the tests. If the proposed labels are all the same, the amount of similarity is high and a match is found. The results corroboration module 108 can also categorize the group of proposed labels for each field from the testing module 106 as recommended (with one of the proposed labels being the recommended label). The results corroboration module 108 can find that there is little similarity among the proposals and suggest that a user investigate the results further. The results corroboration module 108 can also categorize proposed labels from the testing module 106 as to be ignored, as subsequently described. The execution system 102 can receive validation data (e.g., from a user through a user interface) validating a proposed label as correctly identifying the semantic meaning of the field. Once validated, the proposed label is assigned to the field and the label index is updated to show that the field is associated with the assigned label. The load data module 110 sends the label index to the reference database 116 for access by future iterations of the labeling process (also called the sematic discovery process) or for access by downstream applications. The functions of the modules 104, 105, 106, 108, and 110 are subsequently described in greater detail with respect to FIGS. 2A-3G.

In some embodiments, the execution system 102 may be used to discover semantic meaning for data stored in a large number (e.g., thousands, tens of thousands, hundreds of thousands, or millions) of fields in a data set. To do so, the execution system 102 may identify, for each of the fields, a label indicating (e.g., identifying) a semantic meaning of the field. Labeling a field may involve various operations described herein to identify one or more candidate labels for the field and to assign a candidate label to the field to indicate its semantic meaning. For example, the execution system 102 may present one or more candidate labels in a user interface to request user input identifying a candidate label that indicates the semantic meaning of the field. In another example, the execution system 102 may perform operations (e.g., classification into a category) to automatically assign a candidate label to a field to indicate a semantic meaning of the field.

In some embodiments, after identifying a label for a field, the execution system 102 may determine that the labeling process for the field is complete. In other words, the execution system 102 may determine that the field is "closed". In some embodiments, the execution system 102 may determine that labeling for a field is complete or "closed" in one of the following situations: (1) when a label is assigned to the field (e.g., either automatically or based in part on a user's input), (2) all labels proposed for the field were rejected (e.g., by a user), or (3) no label proposals were generated for the field (e.g., so that a user was never even presented with the label proposals). In some embodiments, once the execution system 102 has completed labeling for a field, the execution system 102 may bypass certain operations for the field in a future labeling iteration. For example, the execution system 102 may bypass presentation of candidate label(s) in a user interface to request user input identifying a candidate label that indicates the semantic meaning of the field. By bypassing certain operations for fields, the system reduces the computations that are performed to complete labeling of fields.

However, after a labeling process for a particular field is completed by the execution system 102, various factors that potentially affect identification and assignment of a label may change. For example, data stored in the field may change, tests performed by the execution system 102 to identify label proposals may be modified, and/or the execution system 102 may be updated with new labels that more accurately indicate a semantic meaning of the field. To account for these factors, the execution system 102 typically repeats the labeling for a field to ensure that the best possible label is assigned to the field to indicate its semantic meaning. Labeling a field involves: (1) applying label proposal tests to a data profile; (2) identifying a set of one or more candidate labels and corresponding candidate label score(s) using results of the label proposal tests; and (3) generating an interface through which a user can provide input on a candidate label when user input is required.

Repeating the entirety of the labeling process for all the fields is computationally expensive because it requires continual identification and evaluation of candidate labels. In many cases, repeating the labeling process for all the fields requires repeating execution of labeling processes that were executed in a previous iteration of labeling. For example, the execution system 102 repeatedly profiles data values of fields, executes label proposal tests to identify candidate labels, and generates one or more user interfaces to present the candidate labels for a field in the user interface(s) to request that the user review the candidate labels and determine whether to pick a new label for the field. These processes consume computational resources. The execution system 102 may repeatedly perform labeling processes for hundreds or thousands of fields to account for dynamic factors (e.g., updates to data, updates to label proposal tests, and/or new labels) and repeatedly obtain the same labeling result for most of the fields. The repeated labeling processes add time and computational resources required to complete semantic discovery for a data set without significantly affecting labeling results.

Accordingly, the inventors have developed techniques that more efficiently account for the dynamic nature of the data and the execution system 102. Instead of repeating the entire labeling process for every field, the techniques allow the execution system 102 to intelligently determine whether it is necessary to perform certain labeling processes. The techniques may determine whether to perform data profiling, perform label proposal tests, and/or to generate a user interface for a field through which a user can provide input on a candidate label. The execution system 102 makes the determination based on whether there is potentially a stronger labeling result for the field. When the execution system 102 determines that it can potentially identify a stronger labeling result, the system 102 may repeat certain labeling processes. For example, the execution system 102 may bypass profiling data and/or performing label proposal tests if the execution system 102 is sufficiently confident of a previously assigned label (e.g., if a score corresponding to the previously assigned label is sufficiently high). As another example, the system may generate a user interface through which a user can provide input on a candidate label for the field only when it detects that there is another candidate label that is sufficiently better than a label that was previously assigned to the field.

In other words, the execution system 102 determines to "reopen" the field. The execution system 102 may then evaluate one or more candidate labels for the field (e.g., by performing label proposal tests to determine candidate label(s) and/or presenting candidate label(s) in a user interface for user input). When the execution system 102 determines that it cannot identify a stronger labeling result, the system 102 does not repeat labeling processes (e.g., performing label proposal tests and/or generating a user interface) and, as a result, saves computational resources. In this manner, the execution system 102 can update labels assigned to fields to indicate their semantic meanings without having to repeat the entire labeling process for fields when it is unlikely to result in different label assignment results for the fields.

As an illustrative example, during one labeling iteration of the execution system 102, an "AddressID" field of a dataset may have been labeled with the term "Address". Prior to a subsequent labeling iteration of the execution system 102, one or more tests used by the execution system 102 to determine label proposals may have been modified. In the next iteration of the execution system 102, the execution system 102 may identify a new candidate label of "Zip Code" that better indicates the semantic meaning of the "AddressID" field (e.g., as reflected by a corresponding score for the label). In response to identifying the new candidate label that better indicates the semantic meaning of the field, the execution system 102 may generate a user interface through which a user can provide input indicating whether to assign the candidate label to the field instead of the previously assigned label.

In some embodiments, a label may indicate a semantic meaning of data in a respective field. Accordingly, a label may also be referred to herein as a "semantic label". A label may be a recognized term or a set of terms that may, for example, appear in a data dictionary. In some embodiments, a label may associate a field with a set of attributes (e.g., in addition to or instead of indicating a semantic meaning of data in the field). For example, a label index may associate a field with a data object storing one or more attributes.

In some embodiments, one or more attributes that a field is associated with by a semantic label may be used in processing data values of the field. In some embodiments, attribute(s) may be used by a software application during execution. For example, the attribute(s) may indicate that the field stores personally identifiable information (PII). When the attribute(s) indicate that the field stores PII, a software application may mask data values from the field to protect the PII. As another example, the software application may anonymize personal data from the field. In some embodiments, a software application may use the attribute(s) that a field is associated with to perform data quality enforcement. For example, the attribute(s) may indicate that values in the field need to adhere to a particular format or standard (e.g., a standard format for a telephone number, address, social security number, birth date, or other type of information). A software application may determine whether the values in the field meet the particular format or standard based on the attribute(s) as part of its processing.

Some embodiments provide a data processing system for discovering semantic meaning of data in fields included in one or more data sets. The data processing system may be configured to: (1) identify a first field (e.g., a column in a table) having a previously-assigned label that indicates a semantic meaning of the first field (e.g., a semantic meaning of data values stored in a column), the previously-assigned label having a corresponding previously-determined label score; (2) identify a set of one or more candidate labels, for potential assignment to the first field instead of the previously-assigned label, and a corresponding set of candidate label scores (e.g., by applying label proposal tests to a profile of the first field to obtain the candidate label(s) and corresponding candidate label score(s)), the set of candidate labels including a first candidate label corresponding to a first candidate label score in the set of candidate label scores; and (3) evaluate, using the previously-determined label score and the first candidate label score, whether to assign the first candidate label to the first field. The evaluating comprises: (1) when the first candidate label score is at least a first threshold amount greater than the previously-determined label score, present the first candidate label to a user by generating an interface (e.g., a graphical user interface (GUI)) through which the user can provide input indicating whether to assign the first candidate label to the first field instead of the previously-determined label; and (2) when the first candidate label score is not at least the threshold amount greater than the previously determined label score, bypass presentation of the first candidate label to the user (e.g., by bypassing generation of the interface through which the user can provide input indicating whether to assign the first candidate label to the first field instead of the previously-determined label).

In some embodiments, the data processing system may be configured to: (1) identify a second field, different from the first field, that does not have an assigned label that indicates a semantic meaning of the second field, wherein one or more previously-identified candidate labels were previously identified for potential assignment to the second field with a corresponding set of previous candidate label scores and wherein none of the previously-identified candidate labels were assigned to the second field; (2) identify a second set of one or more candidate labels, for potential assignment to the second field, and a corresponding second set of candidate label scores, the second set of candidate labels including a second candidate label corresponding to a second candidate label score in the second set of candidate label scores; and (3) evaluate, using the previous candidate label scores and the second candidate label score, whether to assign the second candidate label to the second field. The evaluating comprises: (1) when the second candidate label score is at least a second threshold amount greater than each of the previous candidate label scores, presenting the second candidate label to the user by generating an interface through which the user can provide input indicating whether to assign the second candidate label to the second field; and (2) when the second candidate label score is not at least the threshold amount greater than each of the previous candidate label scores, bypass presentation of the second candidate label to the user (e.g., by bypassing generation of the interface through which the user can provide input indicating whether to assign the second candidate label to the second field).

In some embodiments, the data processing system may be configured to: identify a third field that does not have an assigned label that indicates a semantic meaning of the third field, wherein no candidate labels were previously identified for potential assignment to the third field (e.g., because previous label proposal tests did not yield any candidate labels or all candidate labels were rejected by a user); identify a third set of one or more candidate labels, for potential assignment to the third field, and a corresponding third set of candidate label scores, the third set of candidate labels including a third candidate label corresponding to a third candidate label score in the third set of candidate label scores; and evaluate whether to assign the third candidate label to the third field. The evaluating comprises presenting the third candidate label to the user by generating an interface through which the user can provide input indicating whether to assign the third candidate label to the third field.

In some embodiments, the plurality of label proposal tests is associated with a plurality of weight values, and determining the set of candidate label scores comprises: determining the set of candidate label scores using the plurality of label proposal scores and the plurality of weight values.

In some embodiments, the data processing may be configured to: in response to receiving user input indicating to assign the first candidate label to the first field, store, in a data store, an identifier of the first field in association with the first candidate label to indicate the semantic meaning of the first field.

In some embodiments, the data processing system may be configured to: after evaluating whether to assign the first candidate label to the first field: determine a label assigned to the first field; associate one or more attributes with the first field based on the label assigned to the first field, the one or more attributes indicating that data in the first field includes personally identifying information (PII); and process at least some data from the first field based on the one or more attributes (e.g., by masking PII in the at least some data, anonymizing PII in the at least some data, and/or restricting access to the at least some data).

In some embodiments, the data processing system may be configured to: after evaluating whether to assign the first candidate label to the first field, use a label assigned to the first field to execute at least one software application program that performs data quality enforcement, personal data anonymization, and/or data masking of personally identifiable information (PII) reports.

In some embodiments, the data processing system may be configured to: after evaluating whether to assign the first candidate label to the first field: receive a request to process data managed by the data processing system; access, in response to the request, the label assigned to the first field; determine, based on the label assigned to the first field, one or more data processing rules for processing the data; and process the data in accordance with the determined one or more data processing rules. In some embodiments, the data includes data stored in the first field. In some embodiments, determining, based on the label assigned to the first field, one or more data processing rules for processing the data includes: identifying, in a label index data structure, the label assigned to the first field; identifying, from the label index data structure, the one or more data processing rules associated with the label identified in the label index data structure, wherein one or more data processing rules are associated with the label in the label index data structure.

In some embodiments, the label assigned to the first field indicates that the data stored in the first field includes PII, and the one or more data processing rules include one or more data masking rules to mask PII. In some embodiments, processing the data in accordance with the determined one or more data processing rules comprising masking PII included in the data stored in the first field without scanning the data in the first field to determine whether it includes PII.

In some embodiments, the label assigned to the first field indicates that the data stored in the first field includes PII, and the one or more data processing rules include one or more data anonymization rules to anonymize PII in data stored in the first field.

In some embodiments, processing the data in accordance with the determined one or more data processing rules comprises processing the data in accordance with the determined one or more data processing rules without analyzing data stored in the first field.

The data dictionary database 114 includes a list of labels that are candidate labels for identifying the semantic meaning of fields of the source data. Each label of the data dictionary database 114 is associated with one or more attributes. The attributes describe the semantic meaning of the label, and can include tags, associations, or other metadata that provide context to the execution system 102 of what the semantic meaning of each label is. For example, an attribute can include statistical metadata describing values of a given field, a tag for a specific set of values for the field (e.g., a list of city names, zip codes, etc.), a specified data format (e.g., a date format), a relationship between or among fields of a data set, and so forth. During the testing (classification) process, the execution system 102 is configured to determine how closely the attributes of the label align with the attributes of the fields of the source data. The classification tests are configured to analyze the profile data of the fields and the content of the fields themselves to determine which labels of the data dictionary database 114 identify the semantic meaning of the fields. The data dictionary database 114 can be populated with a list of labels and label attributes prior to performing the semantic discovery process by the execution system 102.

As shown in FIG. 1A, the data dictionary database 114 is extensible, as new labels can be added to the data dictionary database 114 as data with new semantic meanings are processed by the execution system. In some implementations, a set of seed labels can be automatically provided to initialize the system, and additional labels can be added as needed if the existing labels of the data dictionary database 114 do not identify the semantic meaning of the fields. For example, if the execution system 102 fails to find a label in the data dictionary database 114 having attributes that satisfy the classification tests (e.g., a score for each test is below a threshold value), the execution system 102 can prompt a user to define a new label for the data dictionary database 114 as having attributes that correspond to the unlabeled field. In subsequent tests, the execution system 102 is configured to propose the newly defined label for labeling subsequent fields having similar attributes.

The execution system 102 is configured to, either automatically or in response to user input, tag the portion of the source data with one or more labels identifying the semantic meaning of the portions of the source data. The discovery, classification, and labeling of the source data can be iterated to improve the classification of the source data and increase the accuracy of labeling the source data. The labels of the source data comprise metadata that is associated with the source data as a label index, as subsequently described. Once the discovery, classification, and labeling of the source data are completed, the label index is loaded into the reference database 116 for use by one or more downstream applications.

As shown in FIG. 1B, once the profiling, classification, and labeling of the source data has been performed by the execution system 102, the load data module 110 can send data to each of the data dictionary database 114 and the reference database 116. If additional labels are defined during or as a result of the semantic discovery process, the newly defined labels are added to the data dictionary database 114 for use in future labeling by the execution system 102 (e.g., by the testing module 106). In addition, or in the alternative, the load data module 110 sends label index data to the reference database 116. The label index describes, for the source data, which label is associated with each field of the source data that has been labeled by the execution system 102. For example, for each label, the label index can include a list of each field that is associated with that label. Alternatively, the label index can describe, for each field of the source data, which labels are associated with that field. The label index is stored in the reference database 116. In a subsequent labeling process by the execution system 102, the label index can be checked (e.g., by the classification module 105) to determine whether a particular field has already been labeled. This can cause the execution system 102 to bypass the testing process and simply label the field with the known label, reducing an amount of data that are processed for labeling the fields. In some implementations, the data indicating that a label has already been applied to the field (or a similar field) can be used during the testing processes to increase the accuracy of the classifiers of the tests, as subsequently described.

In some implementations, the execution system 102 does not bypass testing for a previously labeled field. The execution system 102 performs testing to identify candidate labels and evaluates whether to assign one of the candidate label(s) to the field. Example techniques of how the execution system 102 evaluates whether to assign a candidate label to the field are described herein with reference to FIGS. 6E-6I, and FIG. 8.

The label index can be provided to or retrieved by one or more downstream applications for various uses. The label index provides a quick reference for the downstream applications to determine the meaning of the data values of the dataset without the downstream application having to analyze the dataset. For example, an application need only refer to the label index to determine the semantic meaning of a field. The label index can indicate whether a particular field includes personally identifying information (PII), and how to mask the data of that field. The label index, or the label, can indicate what the schema of the dataset is (e.g., whether the field is a primary or foreign key). The label index can indicate, though the attributes of the designated labels, what the semantic relationships between the fields are (e.g., whether they correlate to one another, whether there is a dependency, and so forth). Because this semantic meaning is included in the attributes of each of the labels, the application need only refer to the label index, rather than scan the dataset itself, to retrieve semantic information. Reducing the amount of data to be processed by the downstream application reduces processing recourses for the application, because only the label index is needed to determine the semantic meaning for each field in the dataset. In an example, the label index may indicate which fields in the dataset include PII. Without scanning each field of the dataset, the application can mask just those fields with PII as needed. As such, the application can access the data store storing the dataset fewer times, and less data can be transmitted (reducing bandwidth usage).

In some implementations, the data dictionary can also be provided to the application. The relatively small data footprint of the data dictionary and the label index can be useful in situations where the dataset is large in size. The sizes of the label index and the data dictionary each increase slowly relative to the size of the dataset itself. Rather than requiring the entire dataset to be retrieved to provide adequate context to the application, the label index and the data dictionary provide all the context that the application needs to access only the relevant portions of the dataset. The application can simply refer to the label of a dataset and the attributes of the label to determine the context of the field in the dataset.

The source data of the data source 112 can include several different kinds of data. In one example, the source data of the data source(s) 112 includes tables with data fields. The execution system 102 is configured to discover, classify, and label the data fields of the tables. For example, the execution system 102 analyses the data content of each discovered field of the source data and determines what the data content of the data field is representing. The execution system 102 classifies each data field by associating the data field with a known label (e.g., by assigning it a probability value). The labeled data of the tables can be output to a data storage 114 that is accessible by other applications and systems for operating on the labeled data. The process of discovering, classifying, and labeling the data fields of data tables is subsequently described in detail. Data sources 112 can include any type of computing system. For example, data sources 112 can include mainframes, databases, unstructured data supplied from a third party, data lakes, personal computers, high-scale networks, and so forth.

In this disclosure, the processes for discovering, classifying, and labeling data fields of data tables are used as examples to illustrate the functionality of the execution system 102 and the networked system 100. However, while data fields are one example of something that the execution system 102 is configured to discover, classify, and detect, the execution system 102 can operate on other types of data. For example, the execution system 102 receives application data from an application. The execution system 102 is configured to discover, classify, and label different data for the application. The data can include different files that are stored and accessed for operating the application. The execution system 102 can be used to discover PII stored by applications, discover malware, changes to the application files, and so forth. In another example, the execution system 102 can analyze files stored in a file system (e.g., on a personal computer). The execution system 102 can scan the file system to identify a particular file subset defined by the user. For example, a user might wish to remove work files from a home computer before reformatting the home computer. The execution system 102 can be configured to scan the file system of the home computer and tag all the work files. The execution system 102 can be configured to label data for data subjects' rights, such as right to forget, data erasure, subject access requests, data correction requests, data suspension, data portability, and consent. Numerous other applications are possible.

To discover, classify, and label portions of the source data (such as data fields), the execution system 102 is configured to access a reference database 116 for one or more files 118. The files 118 provide the execution system 102 with context for performing the discovery, classification, and labeling of the source data. In some implementations, the reference database 116 can store a lookup table that stores relationships between values that are found in entries of the data fields. For example, the data storage can include a lookup table matching codes to a glossary of terms which can be referenced by the execution system 102 during discovering, classifying, and labeling of the source data. The files 118 of the reference database 116 can include weight values used for classification. For example, the weight values can indicate to the execution system 102 the probability that two terms (e.g., business terms) are related to one another for the source data 112 being labeled. These values can be generated during an initial iteration of the discovering, classifying, and labeling of the source data 118, and updated during subsequent iterations, either by the user or automatically.

The files 118 can be defined in advance of discovering, classifying, and labeling of the source data by the execution system 102, during the discovering, classifying, and labeling, or after the discovering, classifying, and labeling in an iterative process. A development environment (not shown) of the networked system 100 can provide a means by which the user can write to the reference database 116 or update files 118 of the data storage. For example, the development environment can include a user interface that provides feedback to a user of the execution system 102. For example, the user interface of the development environment can display reports showing how the execution system 102 is performing, such as what data fields are labeled and with what probability each classification is made by the execution system 102. Examples of feedback provided to the user and the user interface are subsequently described in detail.

Generally, the execution system 102 comprises one or more processors configured to execute the logic of the profile data module 104, the classification module 105, the testing module 106, the results corroboration module 108, and the load data module 110. The operations of each of the profile data module 104, the classification module 105, the testing module 106, the results corroboration module 108, and the load data module 110 can be performed either by batch processing or in real-time. Additionally, the execution system 102 can perform the operations of each of the modules 104, 105, 106, 108, 110 either approximately contemporaneously or during different time periods. For example, in some implementations, the profile data module 104 generates profile data representing a profile of the source data from the data sources 112 at a first time. At a later time, once all the data from the data sources 112 for a given time period has been profiled by the profile data module 104, the classification module 105, the testing module 106, results corroboration module 108, and load data module 110 can analyze the profile data to discover, classify, and label data fields of the source data and load the data into the data storage 116 for one or more downstream applications.

Figure 2A:
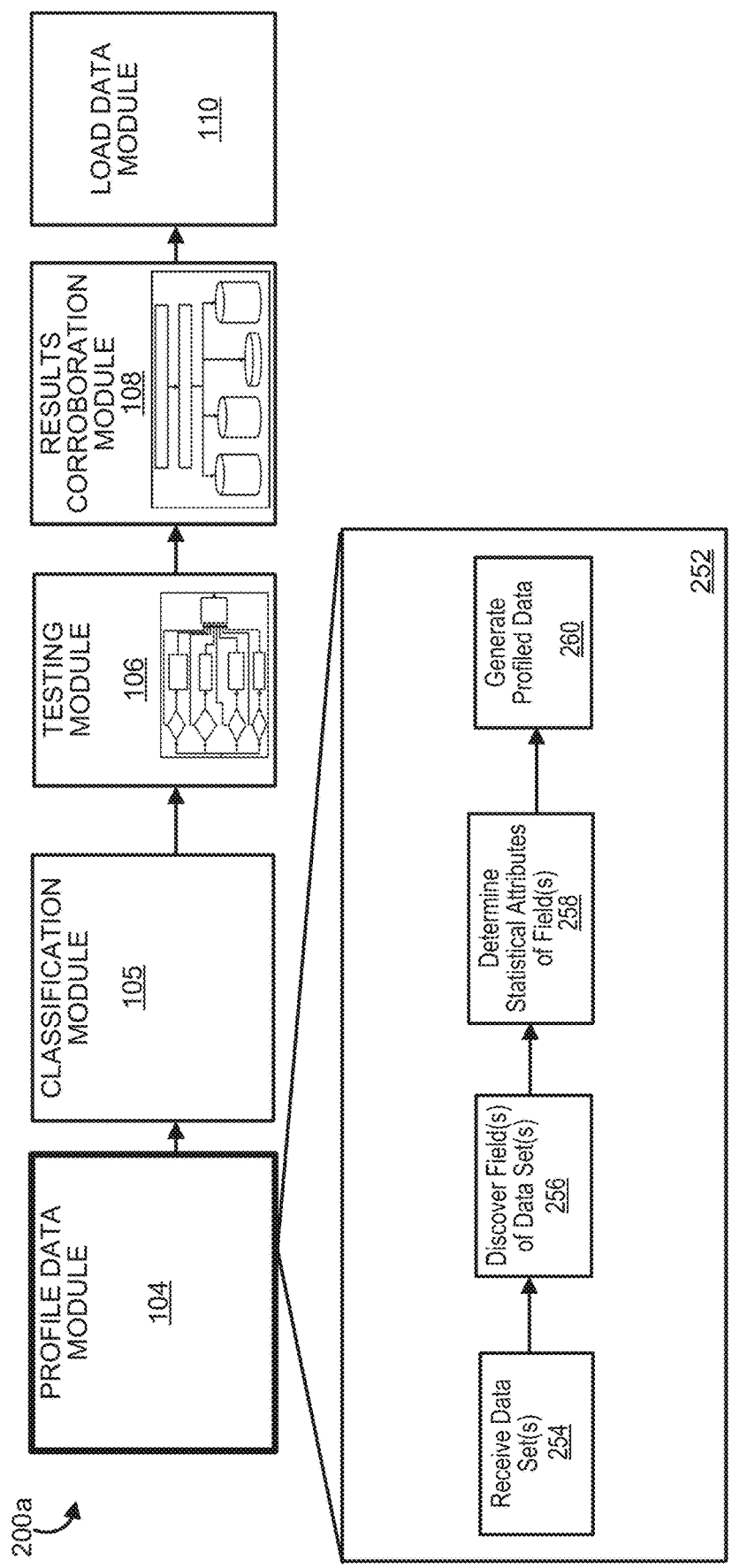
FIGS. 2A-2E are block diagrams of showing how the execution system 202 profiles, classifies, and labels data fields to identify a semantic meaning for the data fields.

FIGS. 2A-2E are block diagrams of showing how the execution system 202 profiles, classifies, and labels data fields to identify a semantic meaning for the data fields. Turning to FIG. 2A, a process 200a for profiling the data sources by the profile data module 104 is shown. The profile data module 104 is configured to receive (254) the source data (e.g., tables, files, etc.) and generate a data profile of the source data. The profile data module 104 discovers (256) fields of the source data (e.g., one or more data sets). The profile data module 104 can discover fields by identifying rows of tables in the source data, finding field names, references to fields, or using any similar process. The profile data module 104 determines (258) statistical attribute(s) of the data fields and generates (260) profile data including those statistical attributes. The profile data identifies patterns in the source data. More specifically, the profile data includes statistics about the values of data fields of tables of the source data. For example, the profile data can include information specifying whether the data values of a data field include numerical data, character strings, etc. For example, the statistics about the data values can include a maximum value, a minimum value, a standard deviation, a mean, and so forth of the values that are included in each of the data fields (if the data are numerical). In some implementations, the statistics about the data can include how many digits or characters are in each entry of the data values. For example, the data profile can indicate that each data value of a data field includes seven (or ten) numbers, which may provide a contextual clue indicating that the data field includes telephone numbers. For example, the data profile can indicate that each entry of the data field includes a value from a small set of values, which may be used to trigger comparisons to lookup tables by the testing module 106.

Data ingestion for the profile data module 104 includes analyzing the field names of the fields, the location of the fields in the tables (or files in the file system), and analysis of the schema of the data. In other words, data ingestion occurs at the field level, the dataset level, and the schema level.

For the field level, the profile data module 104 analyzes the values of the fields and entries of the fields to generate the profile data. The profile data module 104 can determine whether the value of the field or its entries are null, blank, valid for a particular data type, and so on. The profile data can include statistics on null percentages, blank percentages, and value per field percentages. The profile data module 104 can also generate data indicate a change of these percentages from a baseline percentage (which can be specified by a user through the development environment or automatically generated). In another example, the profile data can include an indication of whether the data of an entry is valid for implicit data type. For example, if a data field is known to be a string field, but date data is found, it may be inferred that the data are invalid for that entry. In another example, the profile data can include an indication that data of an entry are valid for a specified format (e.g., two decimal places are required, but no explicit type is specified). In some implementations, some of this functionality is executed by the testing module 106 after the profile data are generated.

For the dataset level, the profile data module 104 can provide statistics that relate a portion of the source data to the data set of the source data overall. For example, the profile data module 104 includes an indication of natural key uniqueness and key cardinality. The profile data module 104 indicates whether there exist duplicates on key values of the source data. The profile data module 104 indicates whether there are duplicates on approximate natural key matches. The profile data module 104 indicates a count of records with one or more of these features. In some implementations, this information is determined by the results corroboration module 108 after, for example, a field is determined to be key values.

For the schema level, the profile data module 104 is configured to determine the statistical information of a data field with respect to the source data over time. For example, the profile data module 104 detects whether there are added or removed columns in a new version of the source data. The profile data module 104 detects delimited fields. In some implementations, the profile data module 104 performs a lineage count to determine whether any records were dropped from a prior version of the source data. Other schema evolution can be detected. In some implementations, this functionality is performed by the results corroboration module 108 after data fields are discovered in the profile data.

In some implementations, the profile data can be improved if contextual data are available in the reference database 116. For example, if the user specifies formats for one or more data fields of the source data, the profile data can generate additional statistical information about those data fields. This can be part of an iterative process. For example, once a data field is discovered in a first iteration (but if classification fails for that iteration), a user might look at the data content of the data field and provide the execution system 102 with additional information for analysis by the profile data module 104 (and other data modules). For example, if the user specifies that all data fields should include only numerical data, the profile data module 104 can quickly determine what data is invalid and provide statistical measures of the that information in the data profile.

The profile data module 104 generates the profile data from the source data by scanning the entire data set of the source data before generating the profile data. The profile data module 104 does not need to copy the entire data set from the source data, though this could be performed to generate the profile data. Because the data sets can be large (e.g., many gigabytes in size or even many terabytes in size), wholesale copying of the data to a local system for analysis may be impractical. Generally, the profile data module 104 scans over the source data during periods of low activity for the data sources.

Figure 2B:
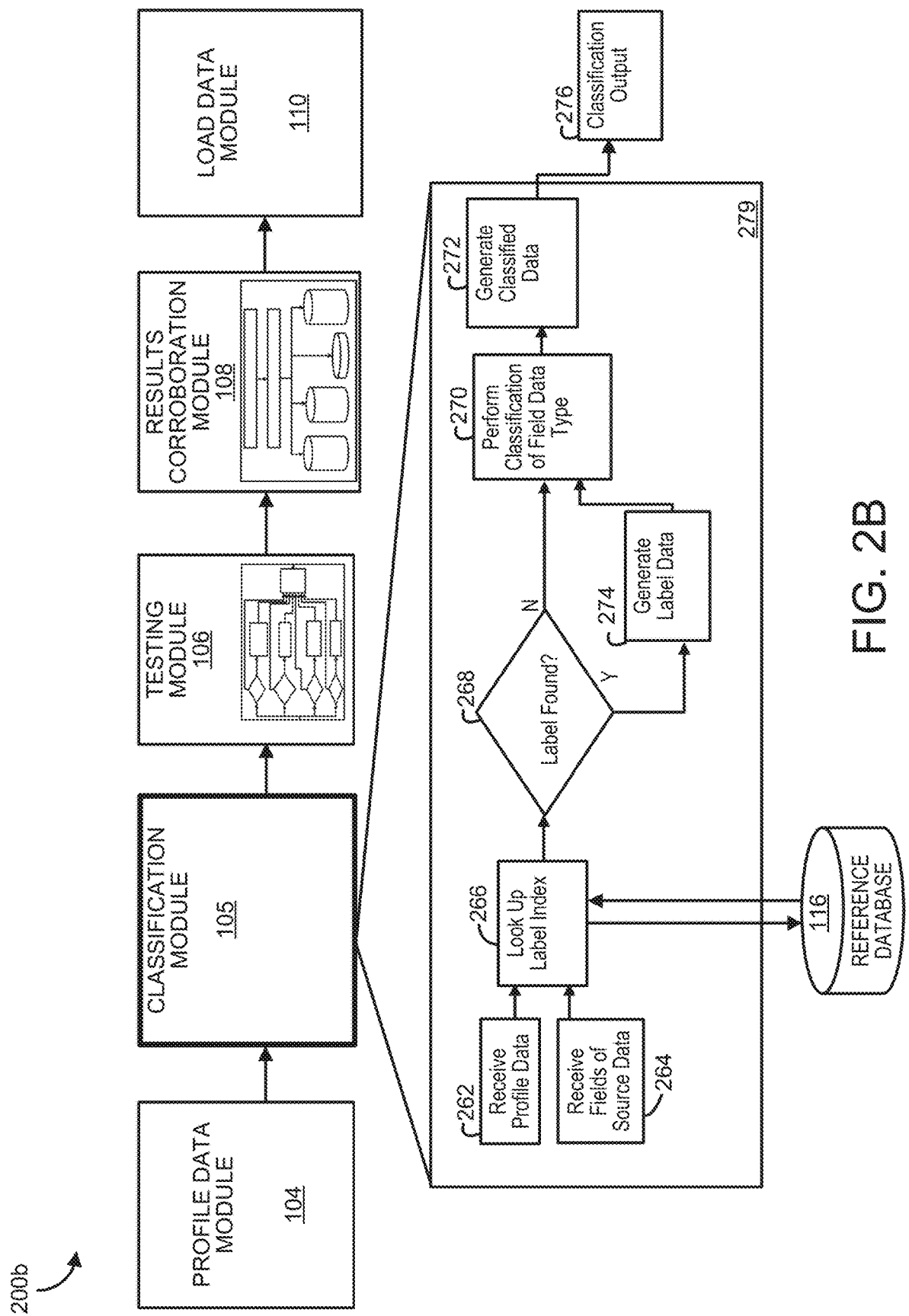

Turning to FIG. 2B, a process 200b for classifying the data fields using the profile data by the classification module 105 is shown. The classification module 105 is configured to receive (262) the profile data and receive (264) the source data including the fields. For each field of the source data, the classification module 105 is configured to look up (266) the label index including existing labels for discovered fields of the source data (e.g., from the reference database 116). These labels can be from prior iterations of the labeling process or the label index (e.g., an initial label index) can be manually generated, imported, or otherwise acquired. However, a label index need not exist prior to performing the labeling process.

For a field, the classification module determines (268) whether the field is already associated with a label in the label index. If a field has not yet been labeled, or if no label index exists, the classification module 105 determines that no label was found for the field. If needed, the classification module 105 generates a new label index to populate with semantic labels. The classification module 105 performs (270) a classification of the field data type. The classification can be based on the profile data of the field, the field name, and the values of the field. For example, the classification module 105 can determine that a field is a "date" field. In some implementations, the classification module 105 can determine that the field is a numeric field, a string field, or other such data type. While the classification module 105 determines a data type for the field, the semantic meaning of the field (and thus the semantic label) is determined by the testing module 106, as subsequently described. For example, the classification module 105 can determine that the field is a date field, and the testing module 106 determines that the dates of the date field are "Dates of Birth" for customers. In another example, the testing module 106 determines that a numeric field is a "User ID" field. Many other such examples are possible. The classification module 105 generates (272) classified data to be sent to the testing module 106 as a classification output 276 for finding the semantic meaning. The classified data is tagged with the data type determined by the classification module 105.

If a label is found, the classification module generates (274) label data that can be passed through the testing module 106 and the results corroboration module 108. The label data informs the testing module 106 and the results corroboration module 108 that the field has already been labeled. This can be used to weight the classifiers applied to the field or suggest a label. However, the field can be re-classified by the classification module 105 and re-tested by the testing module 106 to confirm that the label is accurate and potentially update the label attributes of that label in the data dictionary database 114. For example, if the testing module 106 finds the existing label to be a poor fit, a new label can be suggested. If a user selects the existing label (e.g., as presented by the results corroboration module 108), the label data can be used as a flag to the execution system 102 that the label attributes of the label in the data dictionary database 114 are not representative of the data values being labeled by that label, and these attributes can be updated.

In some implementations, the classification module 105 can be updated over multiple iterations using machine learning approaches. For example, if a discovered field has already been labeled, the classifier can determine that further classification can be bypassed. In another example, a score that was applied to a field can be updated based on additional data that is received from the data source 112 or from user input. The classification module 105 can determine that different test(s) should be performed by the testing module 108 in comparison to a prior iteration. For example, if a fingerprint analysis was inconclusive in a prior iteration, the classifier can determine that this test should be bypassed (or replaced with another test) in a subsequent iteration.

Figure 2C:
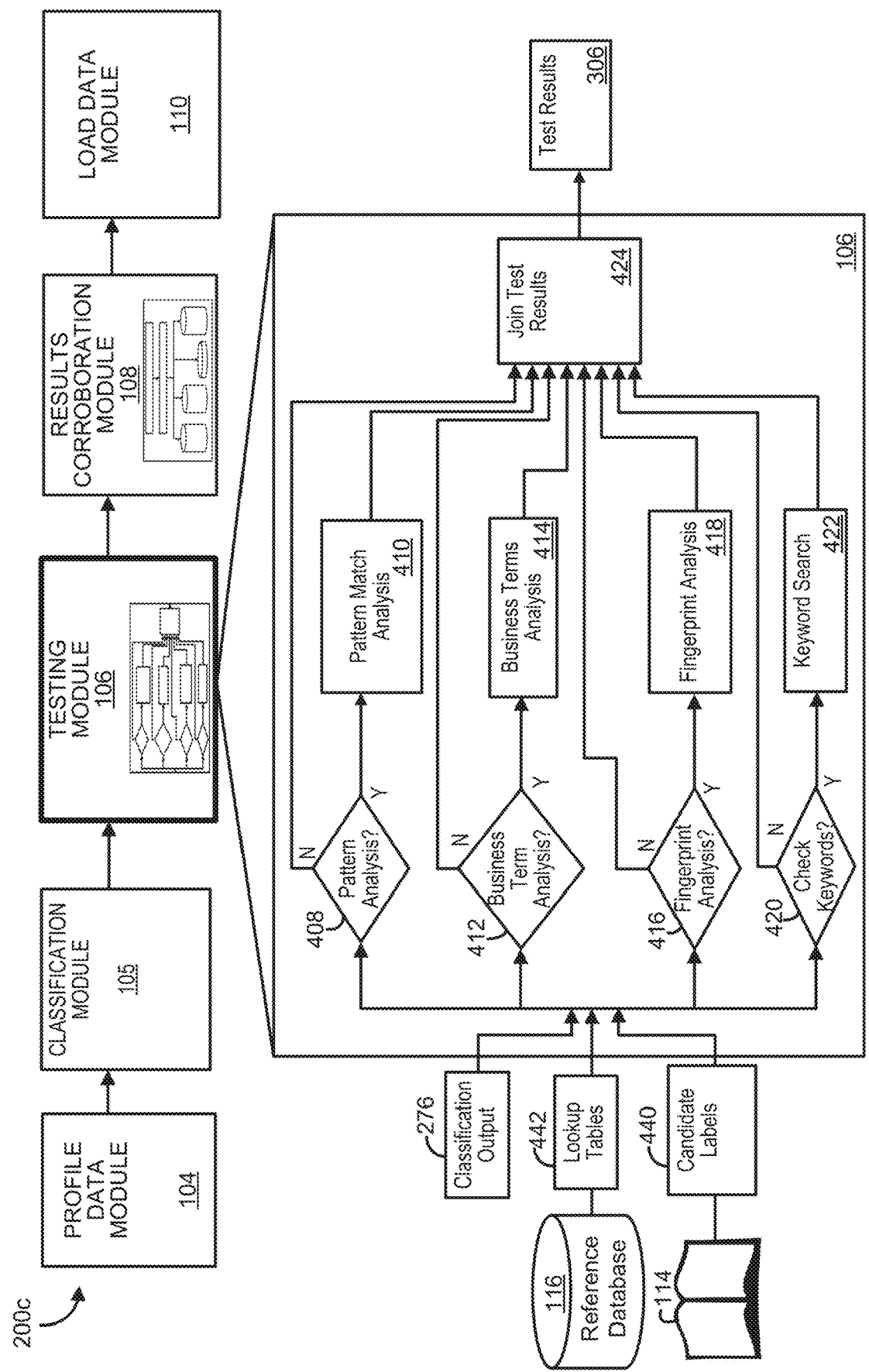

Turning to FIG. 2C, a process 200c for classifying the fields as being associated with semantic labels by the testing module 106 is shown. The testing module 106 is configured to classify the source data of the data set using the statistics in the profile data and using additional contextual information provided in the reference database 116 (such as lookup tables 442). The classification output 276 of the classification module 105 is used to provide the context of a data type for each field and to provide existing labels for the field (if any). The testing module 106 is configured to receive candidate labels 440 from the data dictionary database 114. The candidate labels are a library of existing labels, each associate with one or more attributes, that identify the semantic meaning of a data field (e.g., to a downstream application or a user). As previously stated, the attributes associated with each label in the data dictionary database 114 provide the semantic meaning of the label. The testing module 106 determines which of those candidate labels is the most closely associated with the attributes of the data fields determined by the data profile, the field names, and the data values of the fields.

The testing module 106 includes a plurality of tests (or classifiers), each executed by a different testing module, for associating one or more labels with each field being tested. For example, after fields of the data set are discovered by the profile data module 104, the testing modules determine how closely the attributes of the field correspond to the attributes of each of the candidate labels. Each test uses different data and approaches to propose one or more labels. Because the different tests use different approaches for classification, the proposed labels from each test may not necessarily be the same. The proposed labels are corroborated in the results corroboration module 108, subsequently described. The use of different tests to identify the semantic meaning of the fields results in a much more robust determination of the semantic meaning than using any single test because no single factor (e.g., a field name, or the inclusion of a particular value or set of values in the field, etc.) is relied upon as indicative of the semantic meaning for the field.

The testing of the data in each data field can include determinations of one or more of population levels of data of data sets (how often values occur in the data field), discovered data types (e.g., dates or numbers are held as strings), domains of the data field, discovery of key fields, determinations of whether fields are single words or description fields, and so forth. For example, the classification of the data can include date and time analysis. The testing module 106 thus receives the profile data from the profile data module 104 and performs a series of statistical-based functions to identify, classify, and test the field details against a set of known label types. The rules of the testing vary depending on the data type, which can be identified by the classification module 105 in the classification output 276, or in some cases be included in the profile data generated by the profile data module 104.

The testing module 106 is configured to perform a plurality of different classification tests on the field names and the entries in the data field to determine how to label the data field. The testing module 106 receives the classification output 276, the candidate labels 440, and the any reference data 442 from the reference database 116 and provides these data to the tests. The tests include a pattern analysis 410, a business term analysis 414, a fingerprint analysis 418, and a keyword search 422. As previously stated, while tables with field names and field data are described as an illustrative example, the tests 410, 414, 418, and 422 of the testing module 106 can be performed on other data types. Examples of classification tests that are executed against the data fields and data entries of the source data can include a fuzzy matching plan, a column data plan, a business term matching plan, keyword matching, a fingerprinting plan (e.g., contextual data lookup), pattern matching, and corroboration.

The fuzzy matching logic of the testing module 106 includes logic for fuzzy matching of field names from a dictionary of terms. Generally, fuzzy matching is configured to find a match between a field name and a term in the dictionary when an exact match cannot be found. The system finds dictionary terms that are less than exact. For example, the testing module 106 sets the threshold of the fuzzy match to a percentage value less than 100, and the dictionary database (e.g., database 116) will then return any matches in its memory corresponding to (e.g., greater than) that percentage. In some implementations, a probability score is assigned to each match. The probability score can be presented to the user.

The business term analysis 414 of the testing module 106 includes logic for matching a data field name to a business term that is known in a glossary of terms. Generally, the business term can be placed in different contexts or business term groups. The testing module 106 performs a check to find the occurrence of a particular word or term within another word or term. This can include references to a particular specification. For example, the testing module 106 receive a specification indicating different abbreviations for street names, such as "st", "ln", "ave", "pl", "ct", and so forth. The testing module 106 performs a check to determine whether any of those abbreviations is included within the data field. If one or more of the data elements of the specification are included in the data field, the testing module 106 determines that the data field includes street names. This piece of information can be used on its own, such as to determine that the data field includes street names and therefore should be labeled as such. This piece of information can also indicate that the data field includes other information, such as addresses. The testing module 106 uses the determination that there are street names in a column in addition to other data to determine whether the data field includes addresses, street names only, or some other data. In another example, the phrase "date of birth" could be recognized and associated with such a label. Other matching strategies can include matching using fuzzy matching, synonyms, etc. Generally, the testing module 106 associates a probability score with each match. The user can generate the specifications to configure this logic, such as through the development environment.

The pattern matching analysis 410 of the testing module 106 uses the data content of the fields (in addition to or instead of the field names). The types of pattern matching that are used for the pattern matching can be determined by the testing module 106 based on the results of the classification data 276. For example, the classification data 276 may identify a data type of a field, such as that the data are numerical. In this example, the profile data also indicates that each entry in the data field is 13-18 characters long. This may indicate to the testing module 106 that the data field may be a credit card number data field. To confirm this, one or more pattern tests can be executed by the testing module 106 against the data of the suspect data field. For example, the first 4-6 digits for each entry can be checked against a table of issuer codes. The last number can include a check digit defined by a Luhn test. If a threshold percentage of the entries for the data field satisfy each of these patterns, the testing module 106 can conclude that the field holds credit card numbers, and associate the field name with the appropriate label and probability. For the pattern matching logic, both the data itself of a given field and the patterns of the data in the field (e.g., identified in the profile data) can be used to discern which pattern tests to run and what labels to apply to the given data field.

The testing module 106 determines (408) whether to perform a pattern analysis test 410 on the source data 112. The determination can be a result of the classification data 276. The pattern match analysis 410 uses profile data to determine whether the source data 112 conforms to predetermined patterns that are indicative of a candidate field label. For example, if the data of a field has a particular length and composition, the pattern match analysis 410 identifies a corresponding candidate label. The pattern score applied to the label can be a function of how close a match the identified pattern is to the predetermined pattern, how distinctive the pattern is, or any number of factors. The weight can be adjusted as a function of the distinctiveness of the pattern. For example, a very unusual pattern may correspond to a higher weight value. If the values for a discovered field match the pattern closely (over all or a portion of the values), the score can be higher than if only a small number of values match the pattern.

The testing module 106 can include a keyword search test 422. The keyword test (which is similar to the business term matching test) includes data based tests including searches for particular keywords within data fields. For example, to find an address, the testing module 106 searches for common address words, such as "street", "road", "avenue", etc. The test can be extended by the user, who can add new keyword files to a specification of the reference database 116. The keyword tests can be used to find a word in a phrase or in part of a word, such as for addresses and company names in which there is a limited set of common words that can uniquely identify the data field.

The testing module 106 can determine (420) whether to perform a keyword analysis 422 on the field names. In this example, the testing module 106 would execute a keyword matching test if some of the fields still are not associated with label values. The field names (and possibly the field values) are checked for whether they include one or more keywords from a table, which may assist the testing module 106 in associating a particular label with the fields. The testing module 106 performs the keyword search 422 and generates a keyword search score.

The testing module 106 can include a fingerprinting test 418 for analyzing the data values of the source data. The logic of the fingerprinting generally includes a data lookup for data fields as a whole. Fingerprinting logic includes data value-based tests. The logic of fingerprinting data fields includes comparing a known list (e.g., from reference database 116) against the data of the data field to determine if the data of the data field correlates to the data of the list. For example, data from the data field can be compared to a list of first names, a list of state names, a list of city names, and so forth. The fingerprints (known data lists) are generally representative, rather than comprehensive. In other words, the fingerprint need not include each and every example of a value that is a part of the set of the fingerprint. Generally, the fingerprint can include selected example values representing approximately the most common values that should appear in the data entries of the data field. For example, the fingerprint does not need all possible first names in the U.S. for a first name table, but rather a selected group of the most popular names can be sufficient. For example, a top 100 names generally give sufficient data for showing a correlation between the data field and the data fingerprint. The data fingerprints can be generated from master data. For example, a system might include the 50-100 most populous U.S. cities to check whether a data field corresponds to city names. A user can add new domains to a specification in order to increase the functionality of fingerprinting tests for a particular system.

The testing module 106 determines (416) whether to check fingerprint tables for the fields. Fingerprinting can work well in situations where there is a long list of possible values for a field, but a few of the values are expected to be more common than others. For example, city names, street names, and even first and last names are good candidates for fingerprinting analysis. The testing module 106 performs the fingerprint analysis 418 and generates a fingerprint score.

The testing module 106 determines (412) whether to run a business term analysis. A business term analysis can be useful when there are many unique terms in the source data 112 that may correspond to business terms for labeling the fields. If the business analysis is performed, the testing module 106 performs 414 a business terms analysis by comparing the field names to business terms to find matches and generate labels and their associated probabilities. The result of the business terms analysis 414 is associated with a weight and score, similar to the pattern match analysis 410.

The testing module 106 can be configured to compare results across tests to improve results using corroboration logic. For example, corroboration logic can be used to validate a business term match using another classification test. For example, a test specifying that a data field includes maiden name values should also pass a classification test of being a last name field.

The testing module 106 is configured to execute machine learning logic in which classifications of prior data sets (e.g., from a particular source) or of prior iterations of the same data set are remembered and influence which tests are selected for subsequent iterations and how the probability values of those subsequent iterations are determined. The machine learning logic is trained on the data set and can apply the weights that are developed using the training data to classify new data of the data set.

Each of the tests 410, 414, 418, and 422 can output one or more proposed labels for the data field being analyzed. The tests 410, 414, 418, and 422 need not be in agreement. Each proposed label can be associated with a score (not shown) and a weight value (not shown). The score and the weights for each label can be used by the results corroboration module 108 to suggest a particular label of the proposed labels as identifying the semantic meaning of the field and to categorize the label (or bucket the label) into a category. The category (subsequently described) indicates how much agreement there is among the tests and thus suggests a confidence of the proposed label as identifying the semantic meaning of the data for the field.

To execute the tests, the testing module 106 receives the data 276, 442, and 440 and determines whether each test is to be executed. For example, a test can be not executed if the type of data being received is not formatted for the particular test. Any combination of the tests can be executed. The testing module determines (408) whether to execute a pattern analysis 410, determines (412) whether to execute business term analysis 414, determines (416) whether to execute a fingerprint analysis 418, and determines (420) whether to execute a keyword search 422. Each test 410, 414, 418, and 422 generates one or more proposed labels and outputs the proposed labels. The tests results including all the proposed labels are joined (424) and sent to the results corroboration module 108 as test results 306.

In some implementations, subsequent tests can be performed if a result has not yet been found from the earlier tests. In some implementations, the testing module 106 prepares reference data by retrieving data from the reference database 116 based on the source data 112 being analyzed. For example, the testing module 106 can retrieve data from the reference database 116 based on a location of the source data 112, table names in the source data, user input, and so forth. The testing module 106 can determine which lookup tables are to be accessed and checked against each field of the source data. The choice of lookups can be performed based on the profile data received from the profile data module 104.

In some implementations, the testing module 106 determines whether to run a schema analysis. The schema analysis can be used to analyze the source data 112 over time and as a whole. For example, if fields are missing, added, deleted, and so forth, the information can be used for labeling other data fields.

In some implementations, once the tests have each been completed, the testing module 106 combines the associated scores to generate a final score, which is shown with the associated proposed label to which the score applies. In some implementations, upstream scores affect downstream scores, so that the scores are not distinct from one another, but represent a score that is updated as each analysis occurs. In some implementations, each proposed label and its score are separately reported to the results corroboration module 108, which then determines how to categorize the test results 306.

In some implementations, the order of the tests can be such that more processing-intensive tests are scheduled last. The more time-intensive tests can be a last resort if other tests fail. Ordering tests in this way can reduce processing time on the execution system 102 for labeling the source data 112.

Figure 2D:
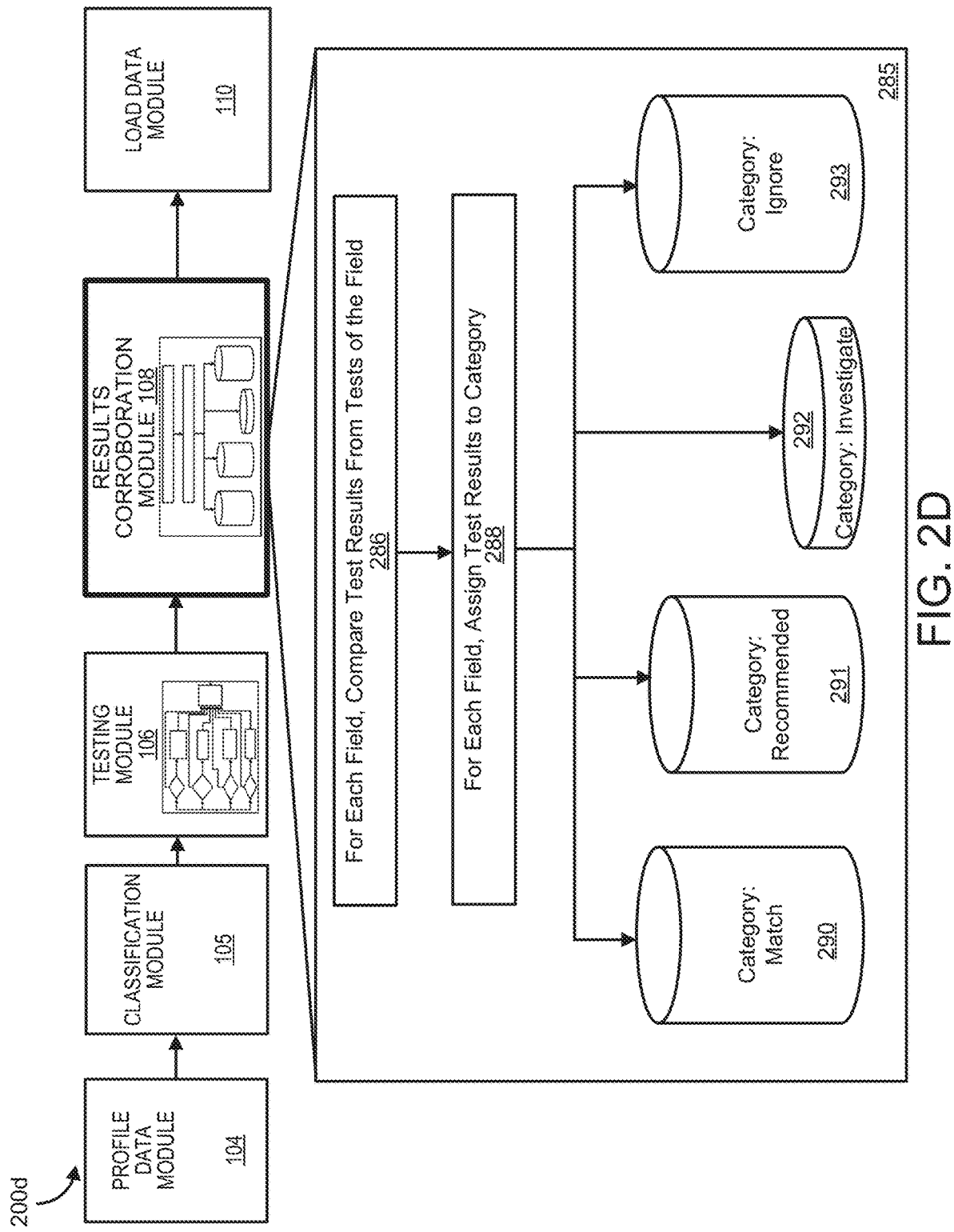

Turning to FIG. 2D, the results corroboration module 108 is configured to execute corroboration logic. Once the testing module 106 has run classification tests for the source data and determined probability values for labels of data fields of the source data, the results corroboration module 108 performs a check to determine whether the classified results are indicative of a high confidence or whether further testing should be performed.

The results corroboration module 108 receives the test results 306 of the different tests executed on the source data by the testing module 106 and determines whether the results corroborate or conflict with each other. The results 306 of the tests of the testing module 106 are sorted into several classification categories by the results corroboration module 108. The categories include a match category 290, a recommendation category 291, an investigate category 292, and an ignore category 293. Each of the categories is indicative of a similarity among the label proposals in the test results 306. For example, of all the label proposals are identical, the test results have a high level of similarity. If each label proposal is different, the test results have a low level of similarity. The similarity can be more than just a voting mechanism by each of the test. Each label proposal is associated with a weighted score value. If one label proposal of a test does not match the others, but is associated with a relatively high score value and a large weight compared to the other proposed labels of the other tests, then the similarity can be identified as being lower despite that three of four tests are in agreement.

Depending on the category identified, the results corroboration module 108 can either automatically validate the label as identifying the semantic meaning of the field or it can prompt a user to manually validate the label. Validation can be done through a client device on a user interface, as subsequently described.

The match category 290 is indicative of the highest level of confidence for a label (e.g., a 100 match). In some implementations, matched labels are automatically included in the metadata associated with the source data. However, the results corroboration module 108 can still be configured to present this result to a user for manual validation. Generally, a match categorization indicates that all the executed tests proposed the same label. In some implementations, the match category can be selected if the labels do not all match, but when any dissenting labels were below a score threshold, indicating general agreement among the tests.

The recommendation category 291 generally indicates that at least one label has a high quality association to the data field. However, the recommended label is generally below a threshold level set for a highest confidence, and further validation is preferred. In some implementations, a recommendation category is indicative of several high quality labels being associated with the data field. In some implementations, the results corroboration module 108 ranks and lists the recommended labels, each with a probability score, which can aid a user in selecting the best label(s) for the data field.

The investigate category 292 is indicative of a value or a data field having some interesting statistical property that does not pass any particular test. For example, the data field can appear as though it should have a meaning, but no tests have proposed labels, or they have, or the proposed labels have scores below a given threshold. For example, the data field can include profile attributes indicating that the data field is a domain or field of significance in the source data, but no labels are recommended (or recommended above a threshold probability). Generally, such a result indicates that additional rules should be added to the tests (e.g., the tests should be extended or changed somehow) and performed again.

The ignore category 293 indicates that a data field is either designated as uninteresting or that the field triggered no tests and displayed no profile attributes suggesting that the data field is significant. Generally, the ignore category is shown when the data received have errors or have no discernable pattern. While the ignore category may indicate that a new label should be defined, it generally indicates that the field includes miscellaneous data that has no particular structure.

Generally, to categorize (e.g., bucket) the test results 306 into a category, the results corroboration module 108 performs a process 285. The results corroboration module 108 compares (286) the test results from the field. For each field, the results corroboration module assigns (288) the test results 306 to a category based on the level of similarity.

In addition to generating a classification file specifying a classification category, the results corroboration module 108 is configured to generate other files. The other files include a profile comments file. The profile comments file is a file that describes the results of the classification analysis process. The other files include a discovery results summary, which describes the combined output form the business term matching process and the fingerprinting process.

The results corroboration module 108 is configured to determine whether there are outliers for data values based on aggregates and ranges for each data field. Outliers include data values that do not conform to an identified relationship or format for a data field. Results corroboration module 108 determines outliers are determined based on clustering and predictions of relationships from the classification of the testing module 106.

The processes described above can be iterated to increase the accuracies of the classifications and enable a user to update the classification tests to get better results. As stated previously, in some implementations, machine learning logic can be used to train classifier(s) during each iteration to facilitate this process. Generally, once the profile data is generated by the profile data module 104, the processes of the testing module 106 and the results corroboration module 108 are iterated; new profile data need not be repeatedly generated unless the source data itself is updated.

Figure 2E:
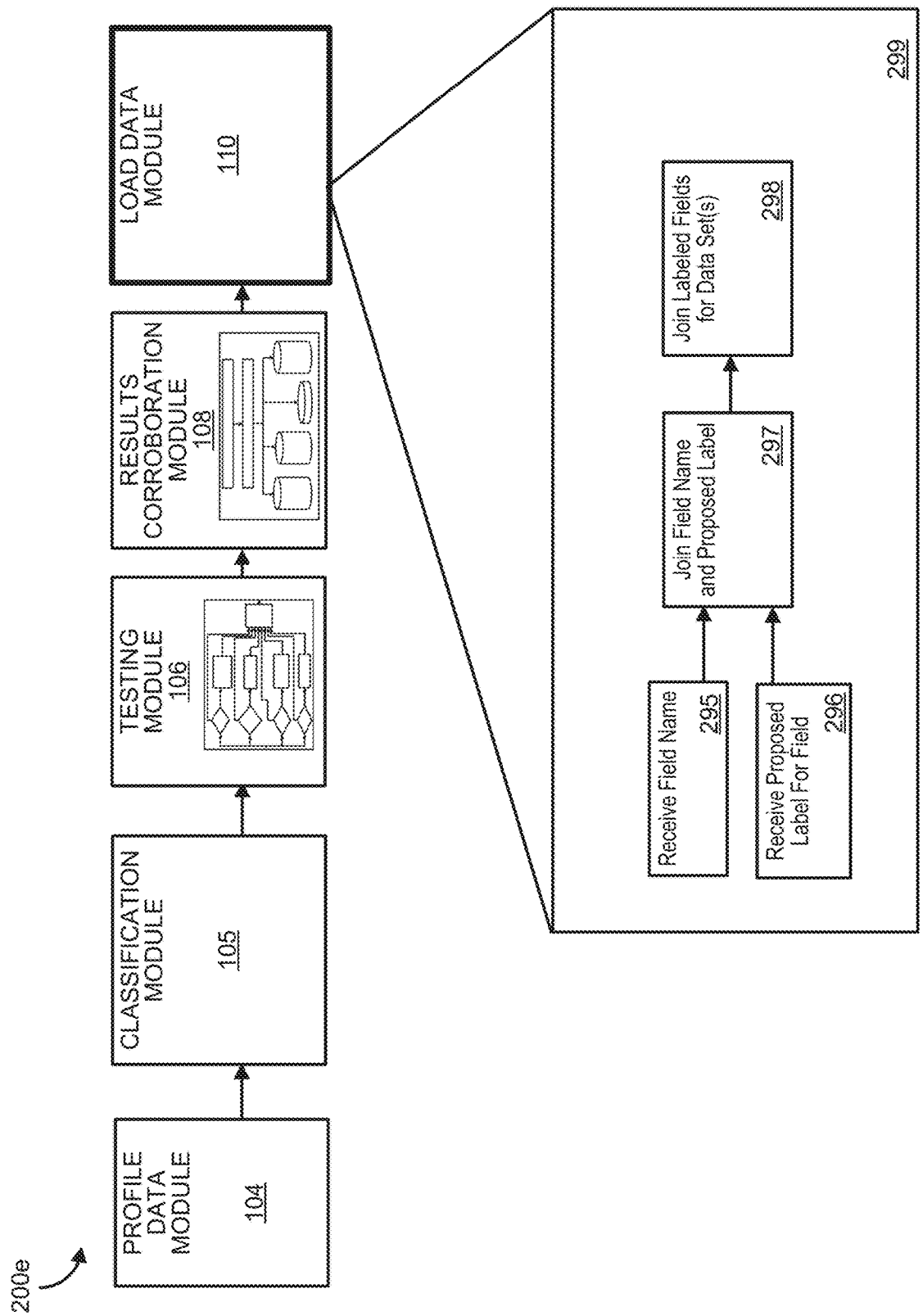

Once the profile data module 104, the classification module 105, the testing module 106, and the results corroboration module 108 have generated labels for each of the data fields, the load data module 110 can load the metadata including the label index into the reference database 116. Turning to FIG. 2E, the load data module 110 executes a process 299 for updating the label index and loading the data into the reference database 116. The load data module 110 receives (295) the field name and receives (296) the proposed label for the field, which has been validated either manually or automatically. The load data module 110 joins (297) the field name and the proposed label. The load data module updates the label index by associating the label with the field's location in the data set. The load data module joins (298) the labels for the data sets being analyzed into a label index that can be referenced for the data set by the execution system 202 and by downstream applications.

Generally, the reference database 116 can be accessed by one or more downstream computing systems for various applications. For example, the generated labels of data sets can be used for data quality enforcement, personal data anonymization, data masking, (PII) reports, test data management, data set annotation, and so forth.

The load data module 110 is configured to package the metadata and the source data into a package that is usable by one or more other computing systems. For example, once the profile data is generated, the operations of the classification module 105, the testing module 106 and the results corroboration module 108 can be each configured to run multiple instances of their processes in parallel on different partitions of the source data. For example, if the source data includes a plurality of tables, the source data can be partitioned by table. The testing module 106 and the results corroboration module 108 can run instances of their logical processes on a plurality of tables concurrently to increase throughput of the processes of the execution system 102. Once the source data are labeled, the load data module 110 can be configured to merge the partitions back together and store the labeled source data in the reference database 116.

Figure 3A:
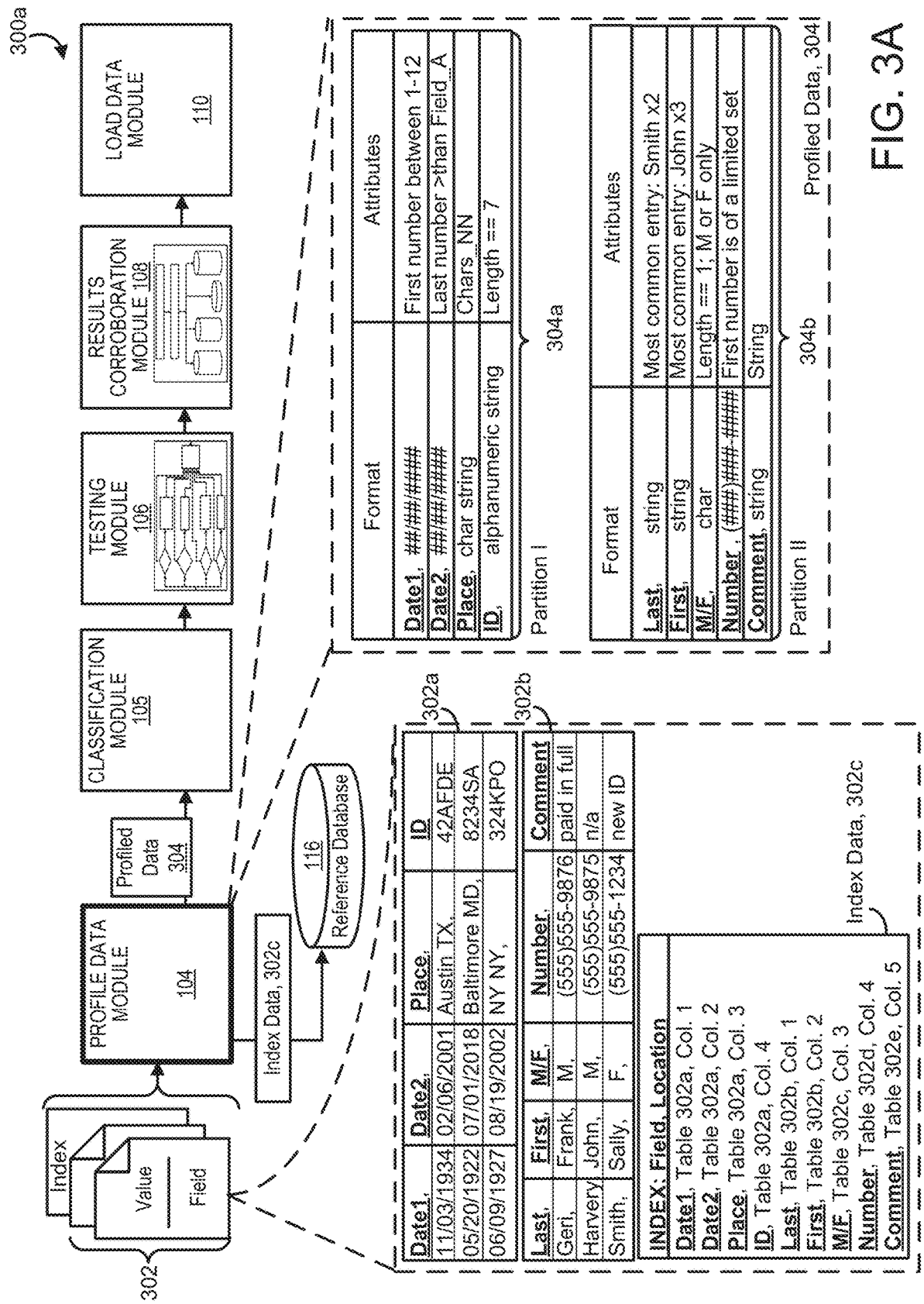
FIGS. 3A-3G are block diagrams of the process for profiling, classifying and labeling data fields to identify the semantic meaning of the data fields.

FIGS. 3A-3G are block diagrams of the process for profiling, classifying and labeling data fields to identify the semantic meaning of the data fields. In the example of FIG. 3A, a block diagram 300a shows that source data 302 is partitioned so that each table 302a, 302b is processed in parallel by the execution system 102. The source data 302 includes fields and values of entries in the fields. As previously discussed, while tables and fields are shown as examples of source data, the source data can include other types of data. The profile data module 104 receives the source data 302 and stores index data 302c in the reference database 116. The index data 302c can be an index of the tables for the source data 302. The index data 302c are later modified to include the labels for each of the fields in the source data 302 and thus becomes the label index. As shown in FIG. 3A, the index data 302c associates a field name with a field location in the source data 302 for each field.

The source data 302 includes two tables, table 302a and table 302b. The first table 302a includes dates, city names, and alpha-numeric codes. The second table 302b includes names, phone numbers, and dates. While it may be apparent to a user that the city names are indeed city names, or that the phone numbers are indeed phone numbers, it might be harder for user to determine the purpose of the alphanumeric codes or determine what the dates are representing. The execution system 102 is configured to solve this issue by classifying each of the fields of the first and second tables 302a, 302b as described previously.

Generally, the profile data module 104 first profiles all the tables of the source data 302 to determine statistical characteristics about the tables. Once the profile data 304a, 304b has been generated for each of tables 302a, 302b, respectively, the execution system 102 partitions the first table 302a into a first partition 304a and the second table 302b into a second partition 304b.

As previously discussed, the profile data 304 includes statistical information about the field names and the entries of each of the fields. For example, for table 302a, the profile data 304a identifies four fields: Date1, Date2, Place, and ID. The profile data module 104 has determined that the data values (also called entries) of Date1 include the same format: ##/##/####. In practice, the profile data module 104 can determine that nearly all the values have this format, and discard outliers. In addition to determining a format of the values of Date1, the profile data module 104 determined that the values of Date1 all fall within 1-12 for the first two digits. This data can indicate to the testing module 106 that the values of the entries for Date1 are dates.

Similarly, the profile data module 104 performs a format analysis and a statistical analysis on each of the fields Date2, Place, and ID. Date2 also has a ##/##/####format for its entries. The profile data module 104 has also determined that the values of the last four-digit portion of Date2 are always greater than the corresponding values of the las four-digit portion of the entries of Date1. This indicates that, if both Date1 and Date2 include dates, that the date values of Date2 are always later in time than the corresponding date values of Date1 for each entry in the table 302a. The profile data module 104 determines that Place is a character string in which a two-character code always follows a first word. The profile data module 104 determines that ID always includes an alphanumeric string of length 7, which may provide clues to the testing module 106 that the value of ID is a code, user ID, etc.

The profile data module 104 also profiles table 302b to generate profile data 302b. Generally, the tables 302a, 302b are profiled together before partitioning occurs. The profile data module 104 determines that Last of table 302b includes a string, and that the value of "Smith" is the most common entry (×2). The profile data module 104 determines that first of table 302b includes a string, and that the value of "John" is the most common entry (×3). The profile data module 104 determines that M/F includes a single character that is one of two values: "M" or "F." The profile data module 104 determines that the format of Number includes (###) ###-####, and that the numbers within the parentheses (or the first three numbers) are from a limited set. The profile data module 104 determines that Comment includes a string, and that the first two digits are between 1 and 12.

The profile data 304, once generated by the profile data module 104, is send to the testing module 106. The testing module 106 is configured to operate on the tables in parallel in partitions 306a and 306b. The profile data module 104 sends profile data 304 to the classification module 105.

Figure 3B:
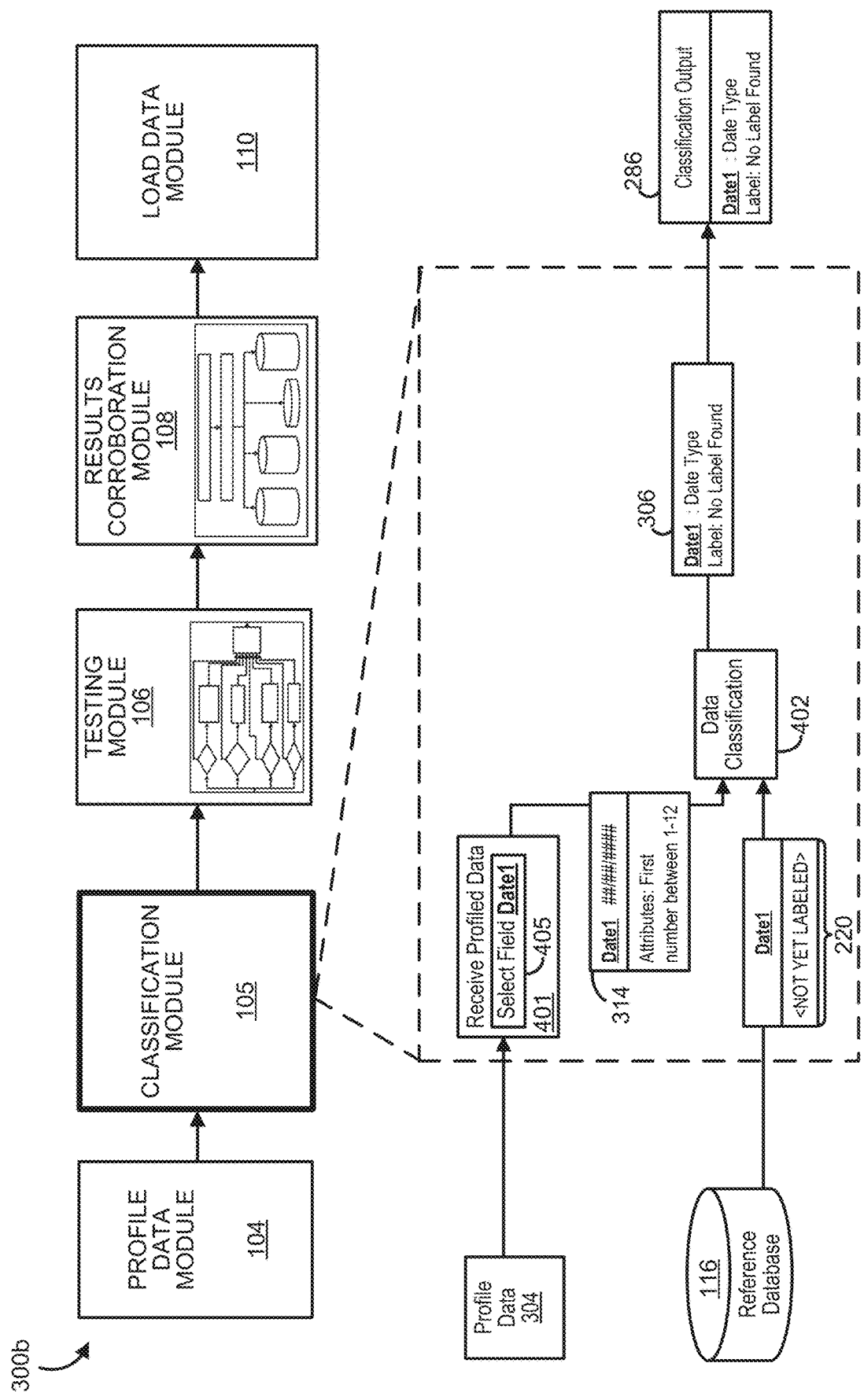

Turning to FIG. 3B, a block diagram 300b shows how the classification module 105 processes the profile data 304 and the source data 302 for classifying the type of data for each field. The classification module 105 receives (401) the profile data 304 from the profile data module 104 and the label index 220 from the reference database 116. The classification module 105 selects (405) a field from the source data. In this example, field Date1 is selected for classification. The classification is performed on a field-by-field basis for the source data 302. The profile data 314 for the selected field are classified based on whether there is an existing label for the field. Here, a status of field Date1 is shown as <NOT YET LABELED>. The classification module 105 classifies the field Date1 to determine that the field is a date field, and indicates any labels for the field (none are found in this case). This information is the classification output 286 that is sent to the testing module 106.

Figure 3C:
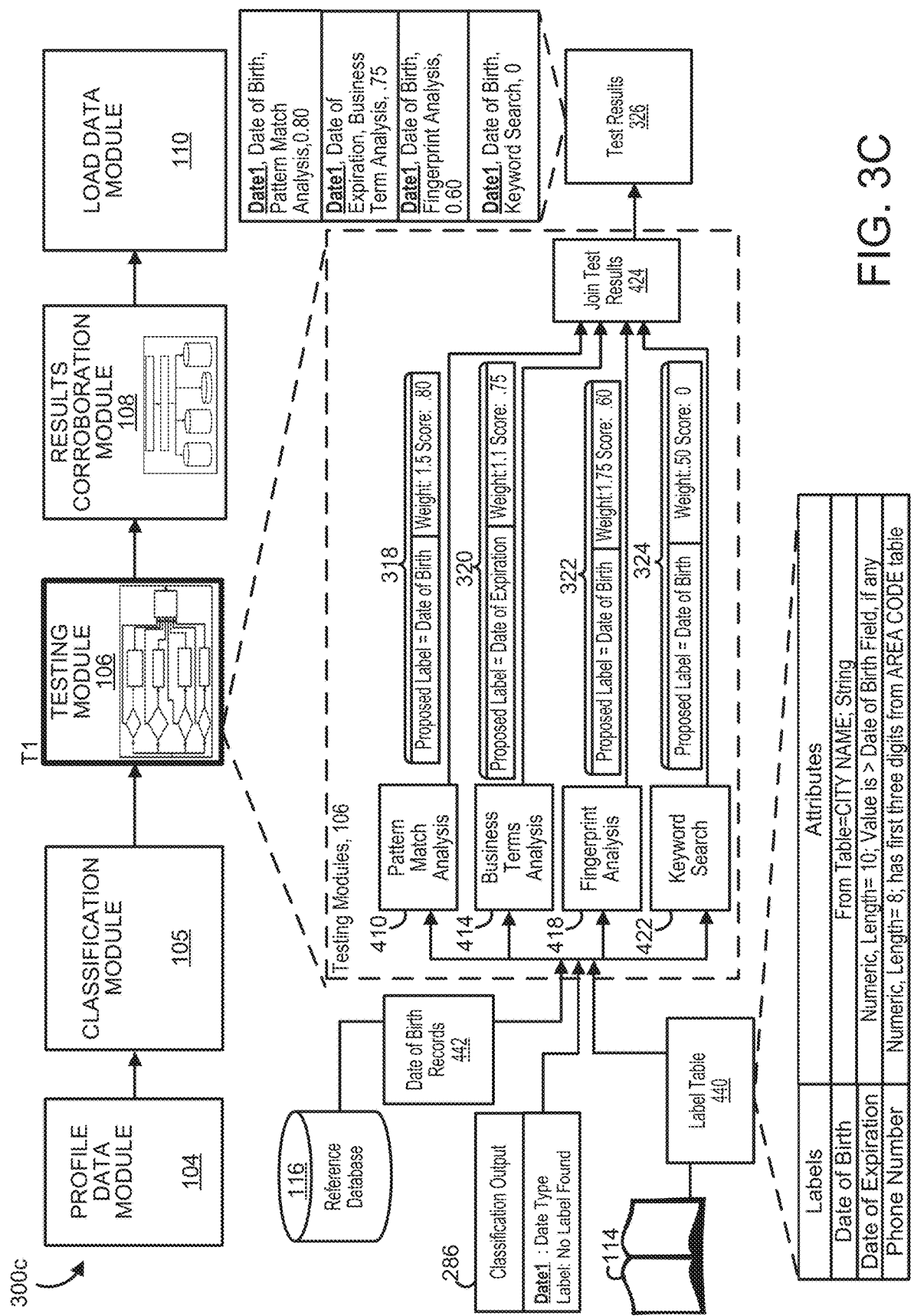

Turning to FIG. 3C, a diagram 300c shows how the testing module 106 proposes label(s) for the field Date1. This diagram 300c shows testing for a single field of the data set at a first time T1. Testing is performed on field-by-field basis, but generally all fields are tested for the data set. The testing module 106 generates classification outputs 306 by using the clues provided by the classification output 286, the profile data 304, and data stored in the reference database 116 including a lookup table 442. For example, as previously described, the classification module 105 determines from the format of Date1 of table 302a that the first field is a "date" field. The additional information that the first portion is a number between 1-12 (and that the system uses U.S. date notation) further suggests that Date1 is a date field. The testing module 106 assigns a probability that Date1 is a date field of 95. However, with no further context, the testing module 106 cannot determine what kind of date the date field is representing. The date field of Date1 could include a date of signing up for a service, a date of birth, a renewal date, and so forth. The testing module can determine that the Date1 field is a "Date of Birth" field because the tests use the contextual information of the reference database 116 and the label table 440. The label table 440 includes the list of defined labels for the data set being analyzed. The label table 440 can be amended as needed to add additional labels, as previously described. As shown in FIG. 3C, each label of the label table 440 as one or more attributes which describe what features there are for the data that the label should be describing. For example, a valid phone number has the first three digits from a set of possible numbers in an areas codes table in the reference database. For example, a date for the Date of Expiration field will always be later than the date in the Date of Birth field (if one exists). These attributes, which indicate complex relationships among field values and other features of the data, indicate that the data have the semantic meaning identified by the associated label.

To test the field Date1, the testing module 106 performs the tests 410, 414, 418, and 422 in any combination as previously described. One or more labels are proposed by each test. For example, the pattern match analysis 410 proposes a Date of Birth label proposal 318 with a score of 0.80 and a weight of 1.5. For example, the business term analysis 414 proposes a Date of Expiration label proposal 320 with a score of 0.75 and a weight of 1.1. For example, the fingerprint analysis 418 proposes a Date of Birth label proposal 322 with a score of 0.60 and a weight of 1.75. For example, the keyword search analysis 422 proposes a Date of Birth label proposal 324 with a score of 0 and a weight of 0.5. The weights can be predetermined based on feedback applied to the execution system 102 by the user or can be automatically adjusted by a machine learning process. The scores indicate how strong the proposal is by a test. For example, the score of 0 for the keyword search test 422 can be given because the available data are not properly formatted for such an analysis to be used. Therefore, the proposal for this test is discarded in this case. A score of 1, for example, indicates a high confidence for the test that the proposed label is correct. For example, if all the attributes for a particular label in the label table 440 are identified in the source data 302 and the profile data 304 for the field Date1, the test can be certain that the particular label accurately identifies the semantic meaning of the field.

The testing module 106 joins 424 the label proposals 318, 320, 322, and 324 into test results 326. The test results 326 include the labels that are proposed and their associated scores and weights. The results corroboration module 108 uses the scores and weights to determine how similar the label proposals are to each other for categorizing the proposal into a category.

Figure 3D:
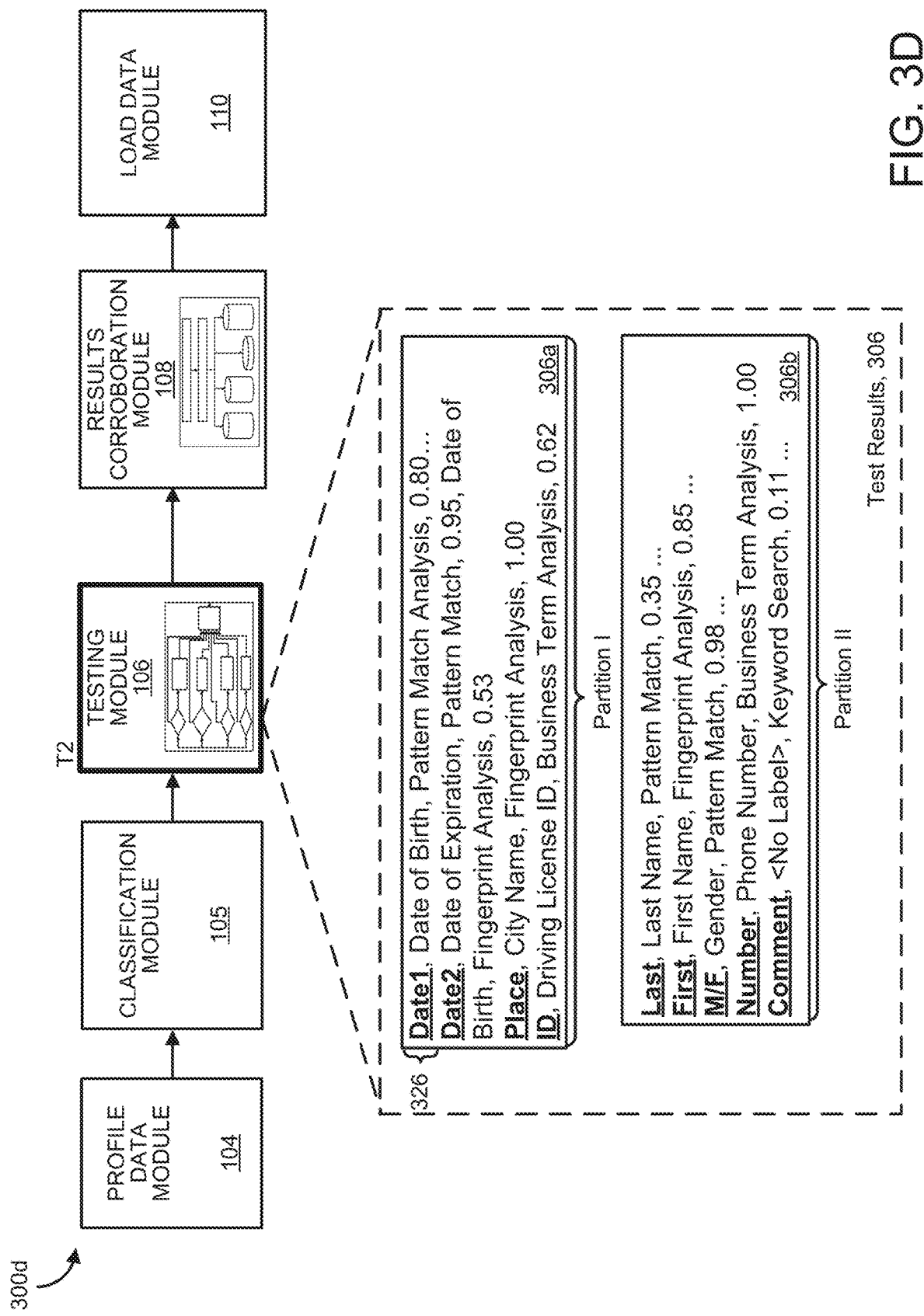

Turning to FIG. 3D, diagram 300d shows a second time T2 after which each of the fields of the source data have been tested. Test results 326 are shown for Date1, and these are joined with other test results for other fields. For example, the testing module 106 determines that Date2 is a Date of Expiration with a 95 score, similar to the determination that Date1 is a Date of Birth. The testing module 106 has additional context that this date is always after the date value of Date1 for each entry. Additional information can be accessed to further define the date. In this example, the test proposes "Date of Expiration" as a potential field name. The testing module 106 assigns a score of 53 to Date2 for the label of "Date of Birth" based on a fingerprint analysis.

The testing module 106 performs a lookup based on the values in the entries of Place. As previously described, the testing module 106 can use lookup tables, keyword matching, fuzzy matching logic, etc. to determine that the values of the character string are city names, and that the two-letter strings in each entry represent state abbreviations. In some implementations, the testing module 106 is configured to dissect the two portions of each value of the entries of Place to determine that the entry values represent both city and state names.

The testing module 106 refers to a particular lookup table provided for this source data 302 by a system administrator. Because this system is ingesting data from a motor vehicles department, one of the tables that is included by the user is a Driving License ID table. The testing module 106 can determine that the formats of the values of ID match the formats of the Driving License IDs that are in the lookup table. In this case, a fingerprinting algorithm is applied. While some matches are found between ID and the lookup table values, in this example there are only a few matches. The testing module 106 assigns a corresponding score of 62 to this label. A subsequent iteration in this example could provide additional values for the fingerprinting algorithm to get a stronger match. However, in other examples, the fingerprinting algorithm can provide a high-confidence match on a first attempt.

In parallel to analysis of table 302a in partition 306a, the testing module 106 is configured to analyze the profile data for and content of table 302b in partition 306b. In this example, the testing module 106 applies one or more classifiers to Last of table 302b to determine that the field represents last names. For example, the classification algorithms described previously can be applied to the data of the table 302b. Because the most common value ("Smith") only occurs twice, the testing module 106 assigns the field a label of "Last Name" with a low score of 35. However, for First, based on a similar analysis of a lookup table, because the name "John" occurs more frequently (and is identified as a first name value), the first name score is 85.

The testing module 106 performs a check against single character codes for the values of M/F of table 302b. A gender designation table is found, and the values of M/F match those specified in the table. M/F is assigned a label of "Gender" with a 98 score.

For Number, the testing module 106 determines that the format of each entry (or most entries) corresponds to a phone number. As a second check, the first three digits are compared to an area codes table. Because the first three digits of each value of Number match values in the area codes table (not shown), the testing module 106 assigns a label of "phone number" to Number with a 100 score. For Comment, the testing module 106 determines that no test has found a likely label. The test results 306 can be kept in partitions 306a, 306b based on the tables being analyzed.

Figure 3E:
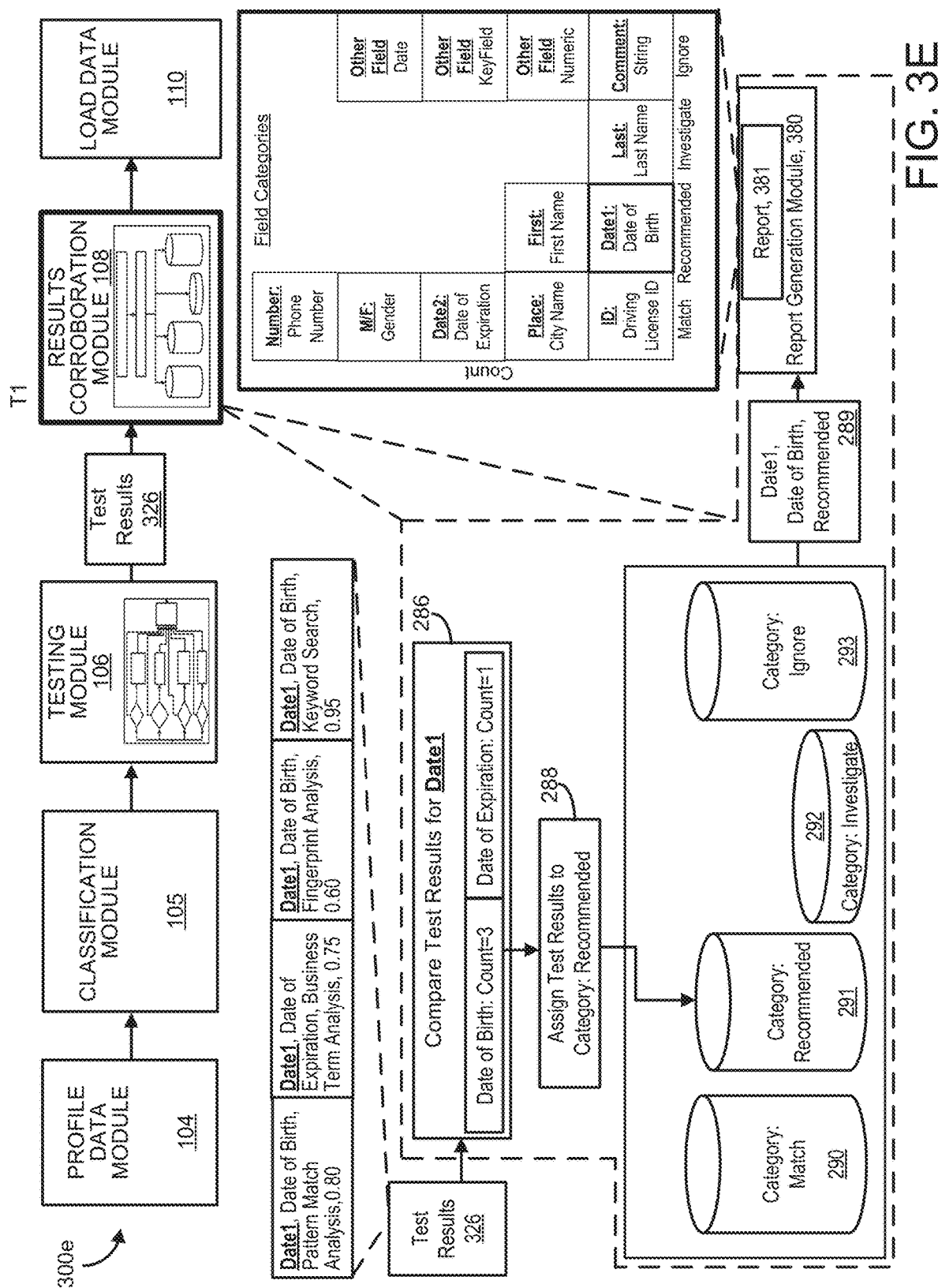

Turning to FIG. 3E, the diagram 300e shows how the results corroboration module 108 processes the test results 326 for the field Date 1. FIG. 3E shows a time T1 for processing the particular field Date 1, as each field is categorized on a field-by-field basis. The results corroboration module 108 receives, the test results 326 for field Date1.

The results corroboration module 308 compares the label proposals of the test results 326 to one another at module 286. The data of birth label proposal has a count of 3, while the date of expiration label proposal has a count of 1. In some implementations, a simple voting mechanism can be used to determine which label(s) should be shown to the user as the final label proposed for identifying the semantic meaning of a field such as Date1. In some implementations, the scores and weights can be used to determine which label is proposed and what category is associated with the proposed label. For example, the results corroboration module 108 can rank the proposed labels by their weighted scores and select the highest ranked proposed label. In some implementations, all proposed labels are shown to the user for validation (if more than one is proposed).

The results corroboration module 108 assigns the proposed label to a category based on the similarity among the proposed labels by module 288. The category can be selected based on the weight scores, counts for each proposed label, and so forth. A function of the counts, scores, and weights can be used to assign the label proposal(s) for a field to one of the categories 290, 291, 292, or 293. Here, because the proposed labels are not unanimous among the tests, and because the dissenting test is associated with a high enough weighted score value, the recommended category 291 is chosen (rather than the match category 290). The results corroboration module will likely prompt a user to validate the categorized proposal 289.

A report generation module 380 can generate a report 381 showing how each of the fields is categorized and with what label proposals. For example, a histogram is shown including a count for each category and which fields and proposed labels are in each category. Generally, a low number of fields need to be investigated, while a high number of fields have recommended proposals or matched proposals.

Figure 3F:
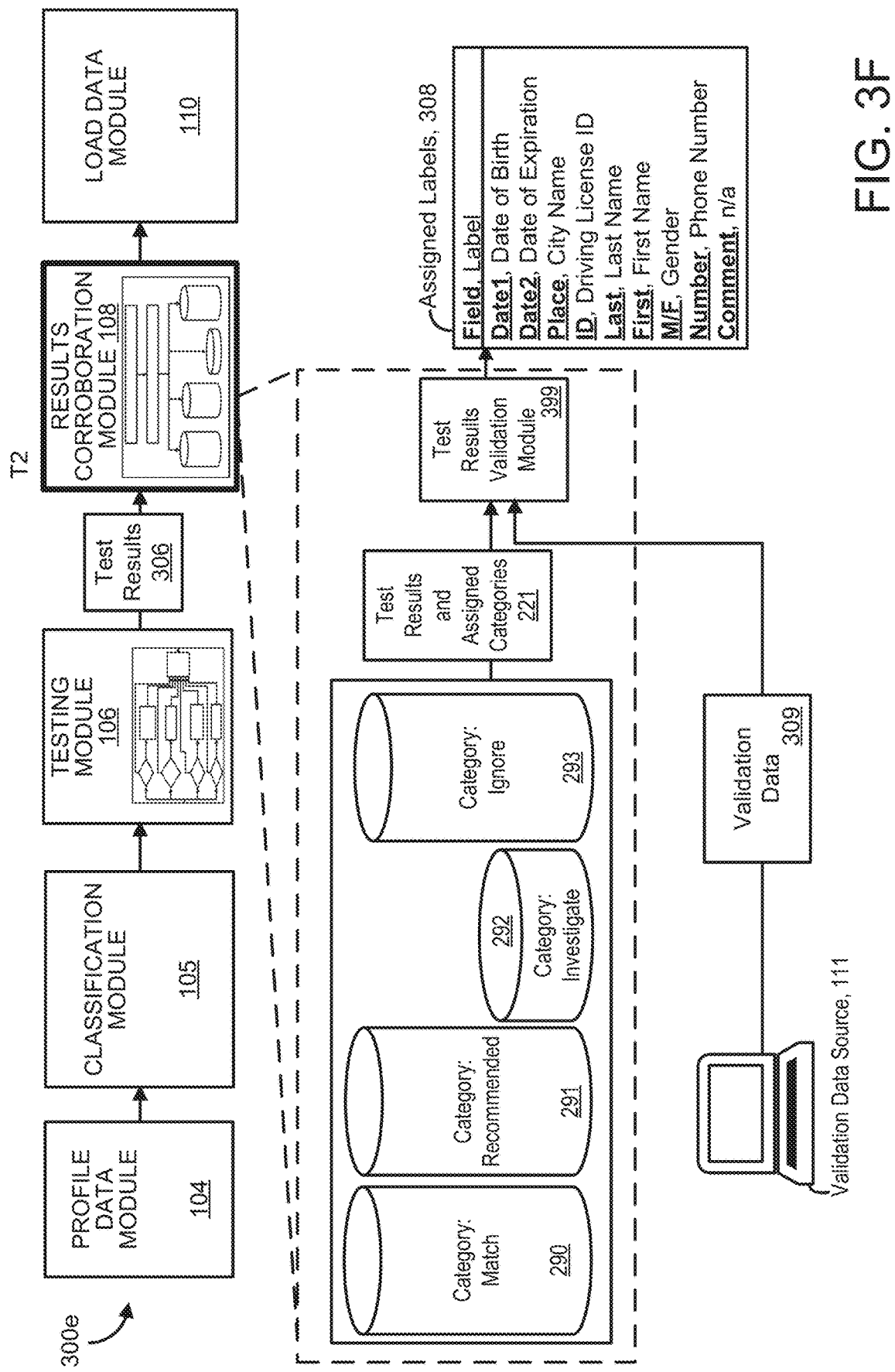

Turning to FIG. 3F, block diagram 300e shows a time T2 for the results corroboration module after all the fields have associated categorized label proposals. The test results and assigned categories 221 are sent to a test results validation module 399. The validation module 399 can cause presentation of a user interface to a user, such as on a validation data source 111 (e.g., a client device). Validation data 309 are received via the source 111, and the validated labels are assigned to the fields as assigned labels 308. Each field is associated with one assigned label identifying the semantic meaning of the data of the field.

Figure 3G:
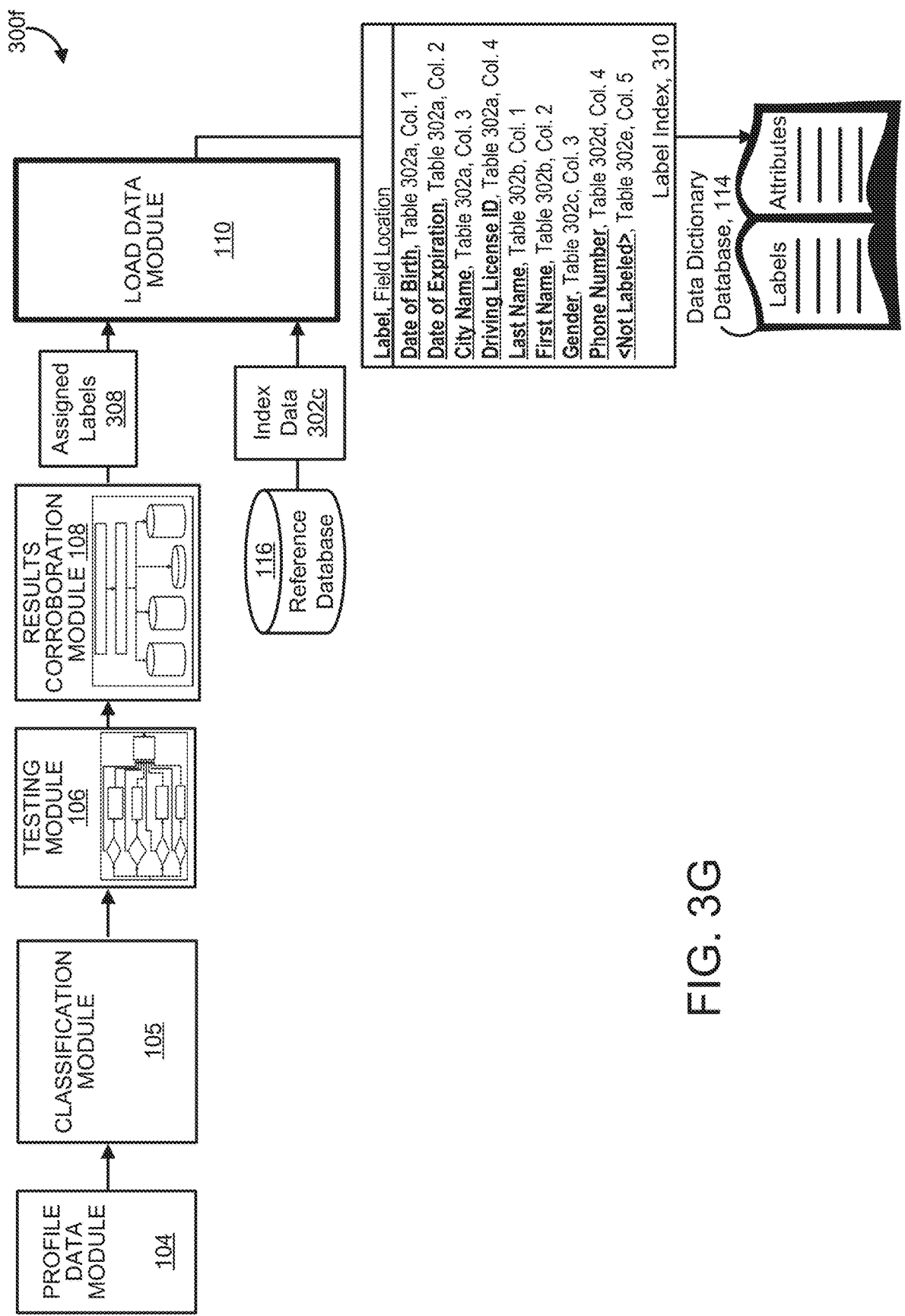

Turning to FIG. 3G, diagram 330f shows how the assigned labels 308 for the fields of the source data 302 are stored by the load data module 110 and how the label index is updated/generated. The load data module 110 receives the index data 302c from the reference database 116. The index 302c is used to generate, for each label in the data dictionary database 114, a location of every field assigned that label. The label index 310 shows this association. When downstream applications manipulate the source data 302, the label index can be referenced 310 to reduce errors in data handling and quickly look up the semantic meaning for a given field without having to analyze the data further. This makes it possible for downstream applications to screen personally identifying data, for example, without actually accessing the data itself.

Figure 4:
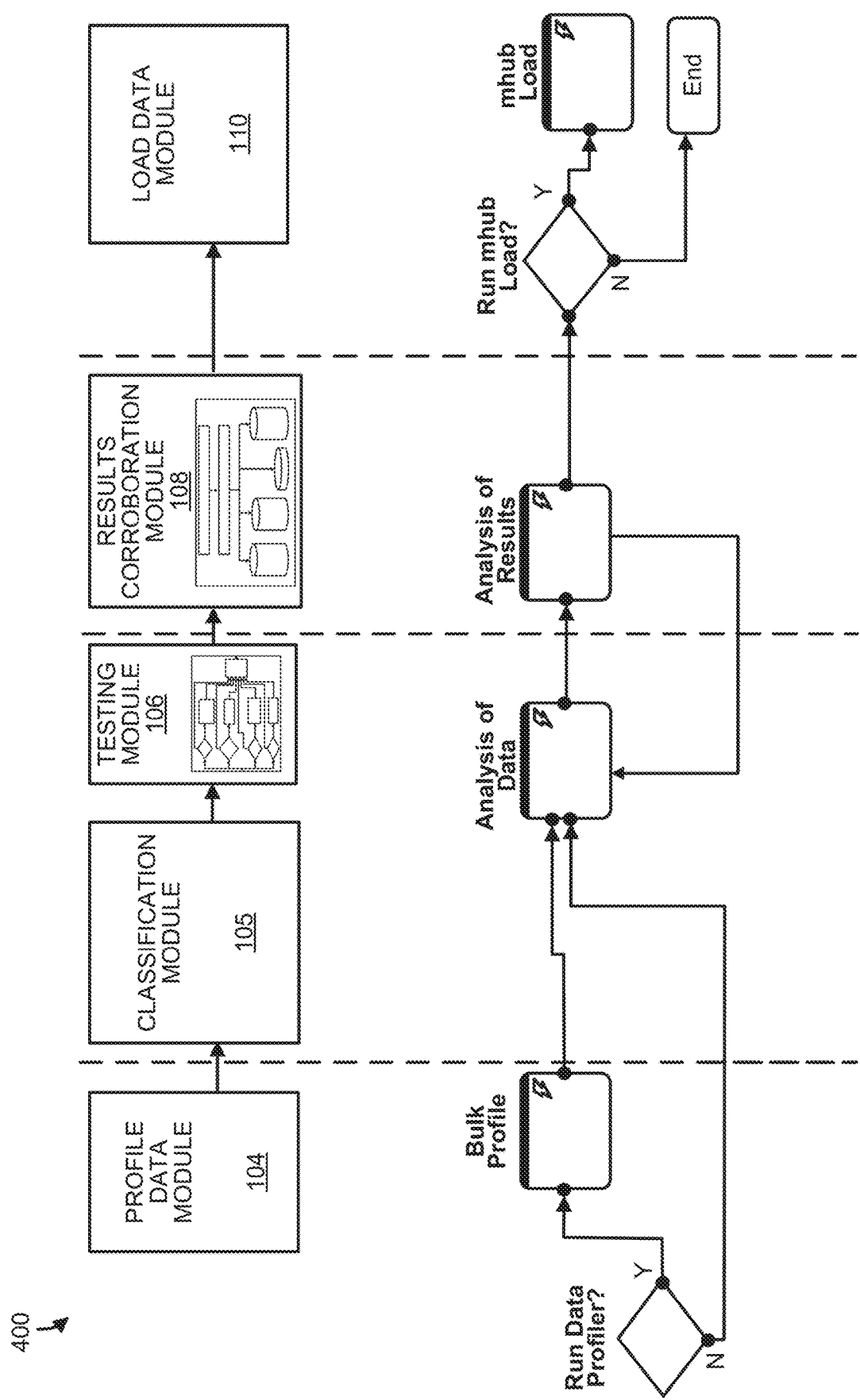
FIG. 4 is a flow diagram showing operations performed by logic engines of the execution system for discovering, classifying and labeling data fields by analyzing a data profile generated from data of the data fields.

FIG. 4 is a flow diagram 400 showing operations performed by logic engines of the execution system for discovering, classifying and labeling data fields by analyzing a data profile generated from data of the data fields. As previously described, once an analysis has been performed by the results corroboration module 108, the analysis can be repeated if the results are inconclusive.

Figure 5:
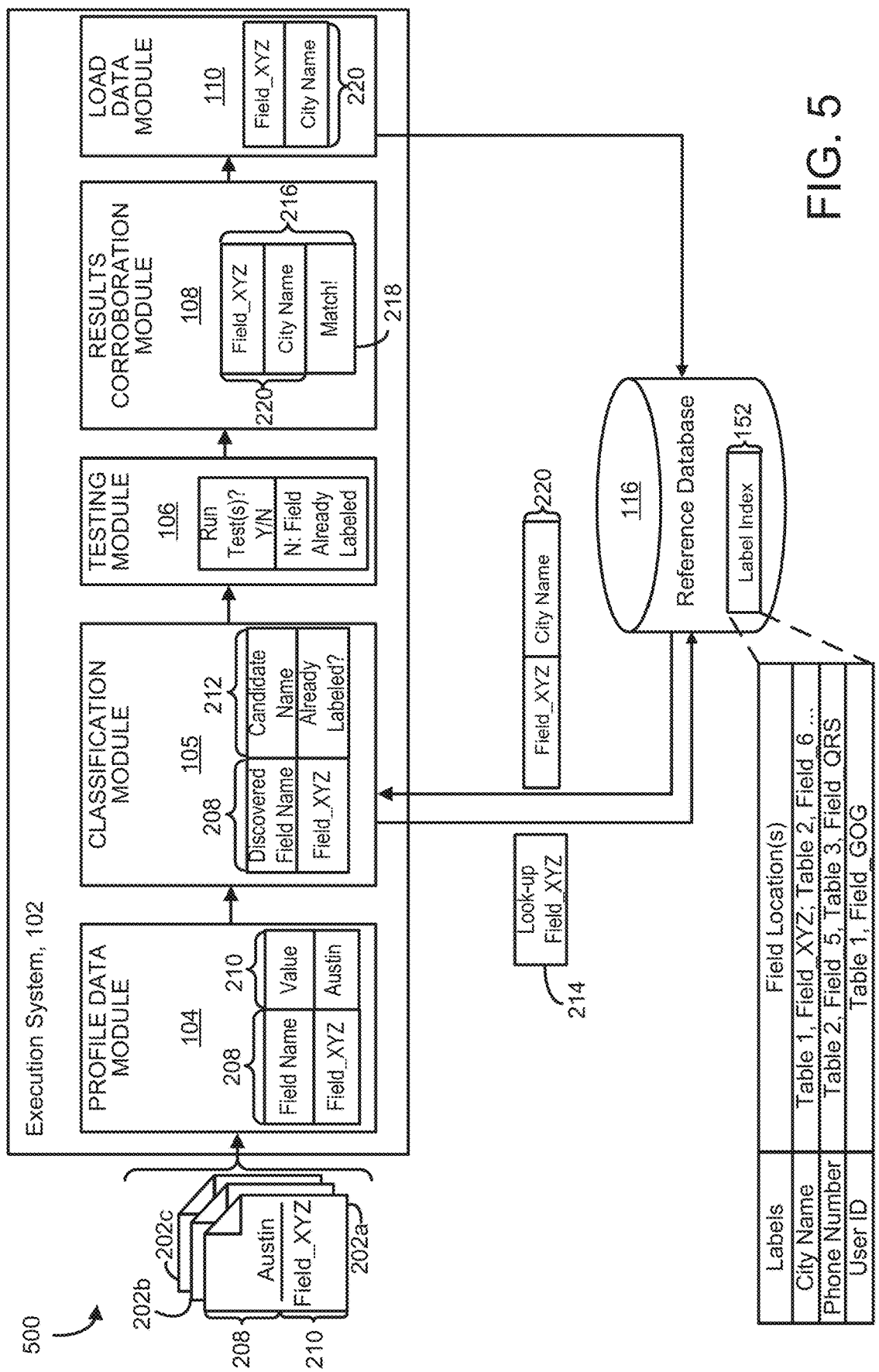
FIG. 5 is a block diagram of the process for profiling, classifying and labeling data fields to identify the semantic meaning of the data fields.

FIG. 5 shows a block diagram of the execution system 102 for discovering, classifying and labeling data fields by analyzing a data profile generated from data of the data fields is shown. The execution system 102 is shown in an example environment 500 in which a particular field 208 is being labeled from source data 202 including fields 202a, 202b, and 202c. In this example, the extensibility of the system is shown, as a label has already been associated with field 208.

In the example of FIG. 5, the source data 202 includes a field 208 called "Field_XYZ," which is a technical field name. The execution system 102 is configured to receive the source data 202 and label the field 208 with a business term that represents what kinds of values are stored in the field. The field 208 includes data entries, such as data entry 210 which includes the string "Austin TX."

The profile data module 104 is configured to receive the source data 202 and generate profile data from the source data. While this example is constrained to a particular data entry, the source data 202 typically includes many entries. Generally, the entries can be scanned for statistical information. Once the profile data are generated for a field (or generally, a table), the testing module 106 performs one or more classification tests, as described previously. The classification 106 can reference the reference database 116 to determine whether the field name "Field_XYZ" already has a label. In this example, a direct lookup result is found in a label index 154. The field name "Field_XYZ" is known (e.g., by a specification generated by a user or by some other means) to represent the field name of "City Name." Because this relationship is explicitly defined in the index 154, the testing module 106 can score the relationship with a high confidence or pass the result to the results corroboration module 108. The testing module 106 can use the knowledge of what a "City Name" might be to make further determinations as to what value is included in the value 210.

The labels that are identified by the testing module 106 are sent to the results corroboration module 108. The results corroboration module 108 categorizes the label into a category "match" 218, determines whether the label should be automatically applied, and requests validation if needed. The results corroboration module 108 corroborates the different classification tests as previously described to output a ranked list of recommendations for labeling the field 208. Once the label 220 is validated, the assigned label is sent to update the index table 152 if needed. In some implementations, the attributes of the label City Name can be updated based on the attributes of field 208.

Figure 6A:
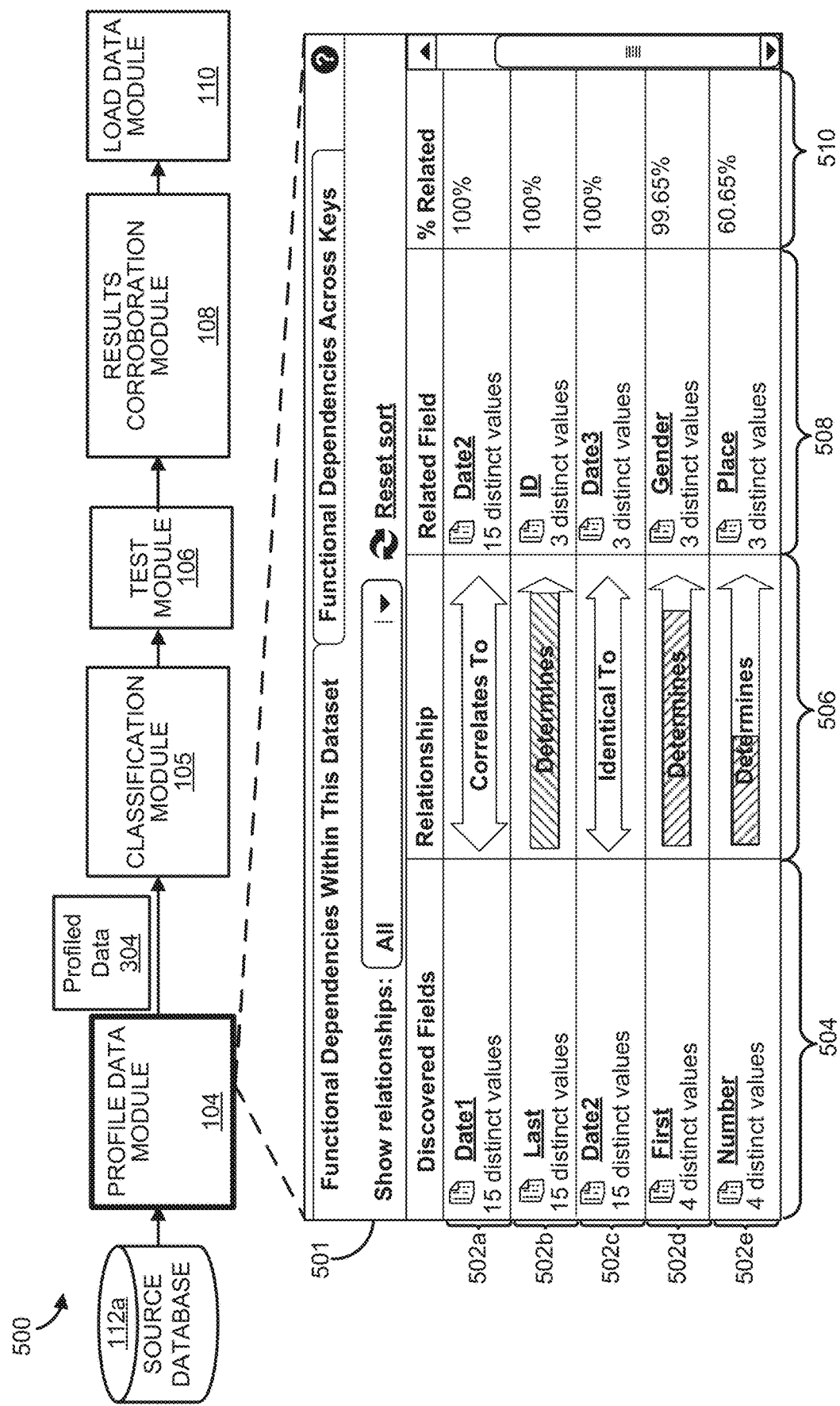
FIG. 6A is a depiction of a user interface showing results of a data profiling process.

Turning to FIG. 6A, a depiction is shown of a user interface 500 showing results of a data profile process, such as by profile data module 104. The user interface 500 includes a header 501 and rows 502a-e and columns 504, 506, 508, and 510. Each of the rows 502a-e represents a field of the source data 112. In some implementations, different rows represent the same field (such as rows 502a and 502b), but each row shows a different detected relationships between the field and other fields. For example, row 502a shows that the field "Date 1" correlates to the field "Date2," while row 502b shows that field "Last" determines field "ID."

Column 504 shows each of the fields of the source data 112. Column 506 shows the kind of relationship that is detected between the field and a related field of the source data 112, shown in column 508. Column 510 includes the confidence score (e.g., probability) that the fields of columns 504 and 508 are related to one another as indicated in column 506.

The relationships that are detected in the source data can be used by the testing module 106 to determine label values for each of the fields. For example, determining that a zip code field is related to a state field can provide clues as to what each field means in practical terms. This is useful if names of the fields are technical or otherwise do not indicate the type of data that are included in the fields.

Figure 6B:
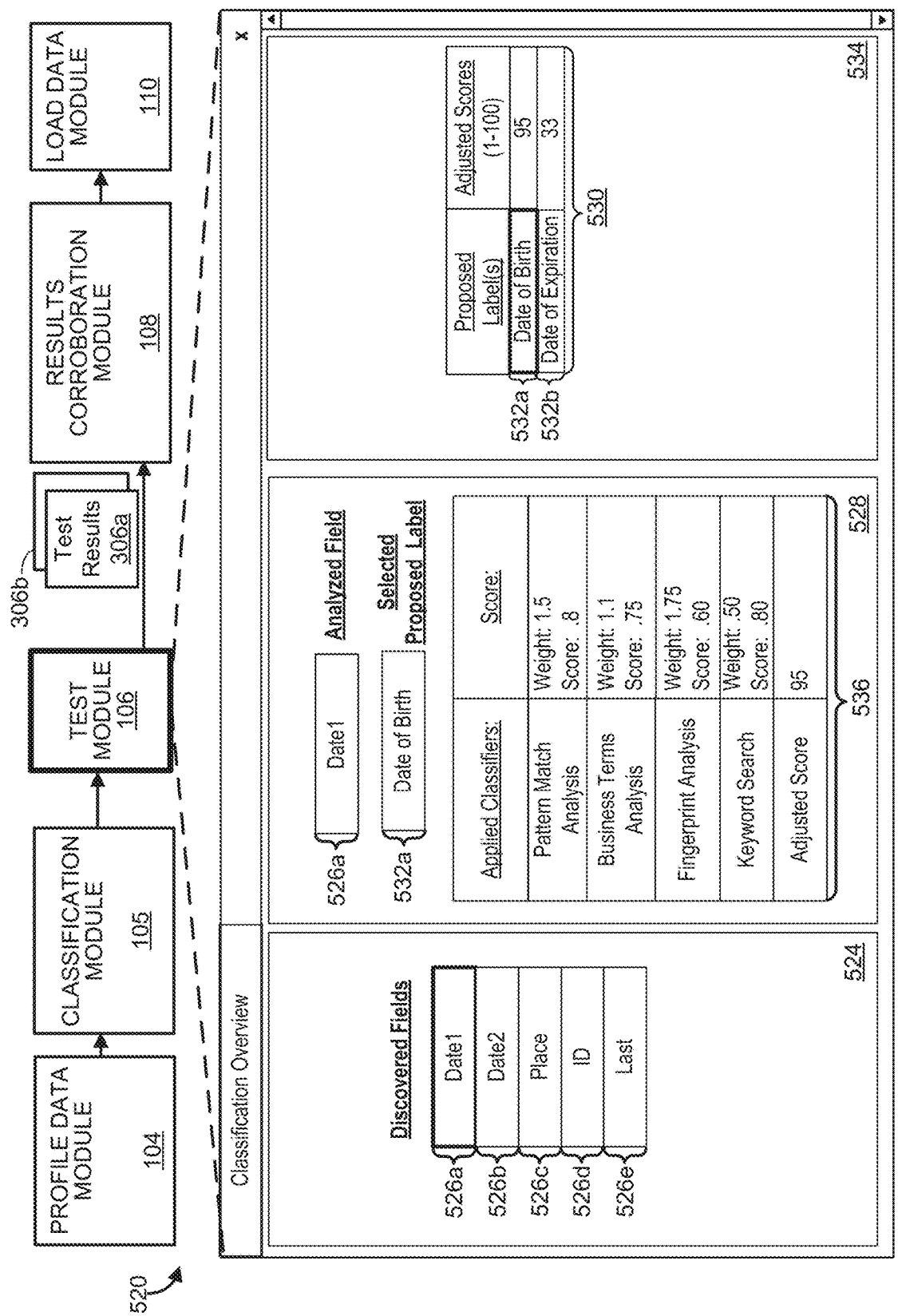
FIG. 6B is a depiction of a user interface showing results of a classification process.

Turning to FIG. 6B, a depiction is shown of a user interface 520 including results of a classification process of the testing module 106. A window 524 shows discovered fields 526a-e list. In this example, fields from columns 504 and 508 of FIG. 6A are included. Box 526a shows which fields have been analyzed by the testing module 106. In this example, field "Date1" has been analyzed. In some implementations, each field can be selected to show details about how the testing module 106 analyzes that discovered field and how the score is generated. For example, the bold outline of button 526a shows that this button has been selected.

Window 528 shows details of the analysis of the selected discovered field of window 524. Here, window 528 shows that four classifier tests are applied: pattern match analysis, business terms analysis, fingerprint analysis, and keyword search. Each test is associated with a corresponding weighted score. The final, adjusted score is also shown in box 536.

Window 534 shows a list 530 of candidate labels and their adjusted scores. Here, the label "Date of Birth" is associated with a score of 95. A second label, "Date of Expiration," is associated with a score of 33. While the candidate labels are shown as ranked according to their scores, the candidate labels can be shown in any order. The score of 95 matches the adjusted score shown in window 528. The analysis performed and scores shown in window 528 are associated with the candidate label 532a "Date of Birth."

In some implementations, the semantic label update module 340 of the results corroboration module 108 uses adjusted scores of candidate labels to perform evaluation. For example, the semantic label update module 340 may use an adjusted score associated with a candidate label to evaluate whether to assign the candidate label to a field as part of its updating.

Window 534 shows additional details about the classification process of the testing module 106. For the number of proposed labels can be shown. In this example, the number is 2. In another example, a number of iterations for analyzing one or more of the discovered fields can be shown.

Figure 6C:
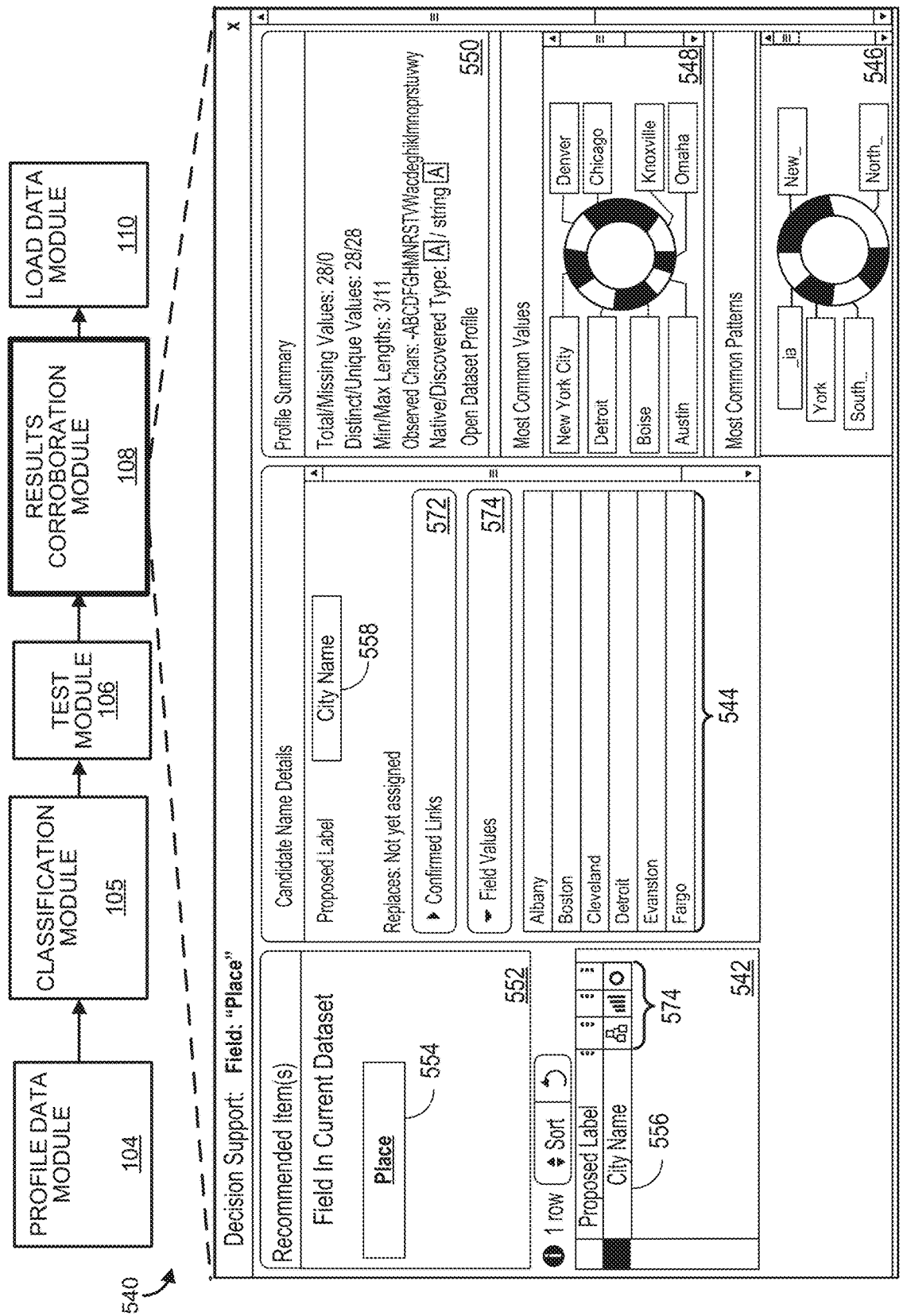
FIG. 6C is a depiction of a user interface showing recommendations for labels of discovered data fields.

FIG. 6C is a depiction of a user interface 540 showing an example of the results of the results corroboration module 108. The user interface 540 includes a proposed labels pane 542 in which labels that are likely to represent data fields are shown. A window 552 shows which fields are discovered in the analysis as received by the results corroboration module 108. The discovered field 554 has a name of "Place," which is included in the profile data of FIG. 6A and analyzed as described in relation to FIG. 6B. A proposed label 556 having a value of "City Name" is recommended to the user as a label for a field "Place."

The recommended item information pane 544 includes data describing the discovered field for which the label is recommended. For example, the current label(s) 558 assigned to the field can be shown. In this example, the field is not yet labeled (possibly, user input is pending). The values of entries in the data field can be shown in pane 574. Links among fields can be shown in menu 572. In this example, values including "Albany," "Boston," "Cleveland," "Detroit," "Evanston," and "Fargo" are shown.

The profile summary pane 550 shows summary of the contents of the field. For example, the summary pane 550 can include statistical data about the field, such as total values, missing values, a number of distinct/unique values, minimum and maximum lengths of the entries, the characters included in the entries, the data type(s) of the entries, and so forth. In this example, the field to be labeled "genre" has 28 values, with 28 unique values. All values are between 3 and 11 characters long, and all are string type. These clues can be used by the testing module 106 to determine that the label "genre" should be recommended, in addition to the data of the entries.

The common values pane 548 shows which values are most common in the field and their relative proportion of the values of the field. In this example, all different values of the field occur a similar number of times.

The patterns pane 546 shows common patterns for each of the entries of the field. For example, if a date were present, the pattern might include ##/##/####, as described above. Here, there is no particular pattern which dominates the field, though values including a pattern of "New_" are the most common. While these particular profile data are shown in panes 550, 548, 546, any data can be shown which can assist a user in approving a proposed candidate name for the discovered field.

Figure 6D:
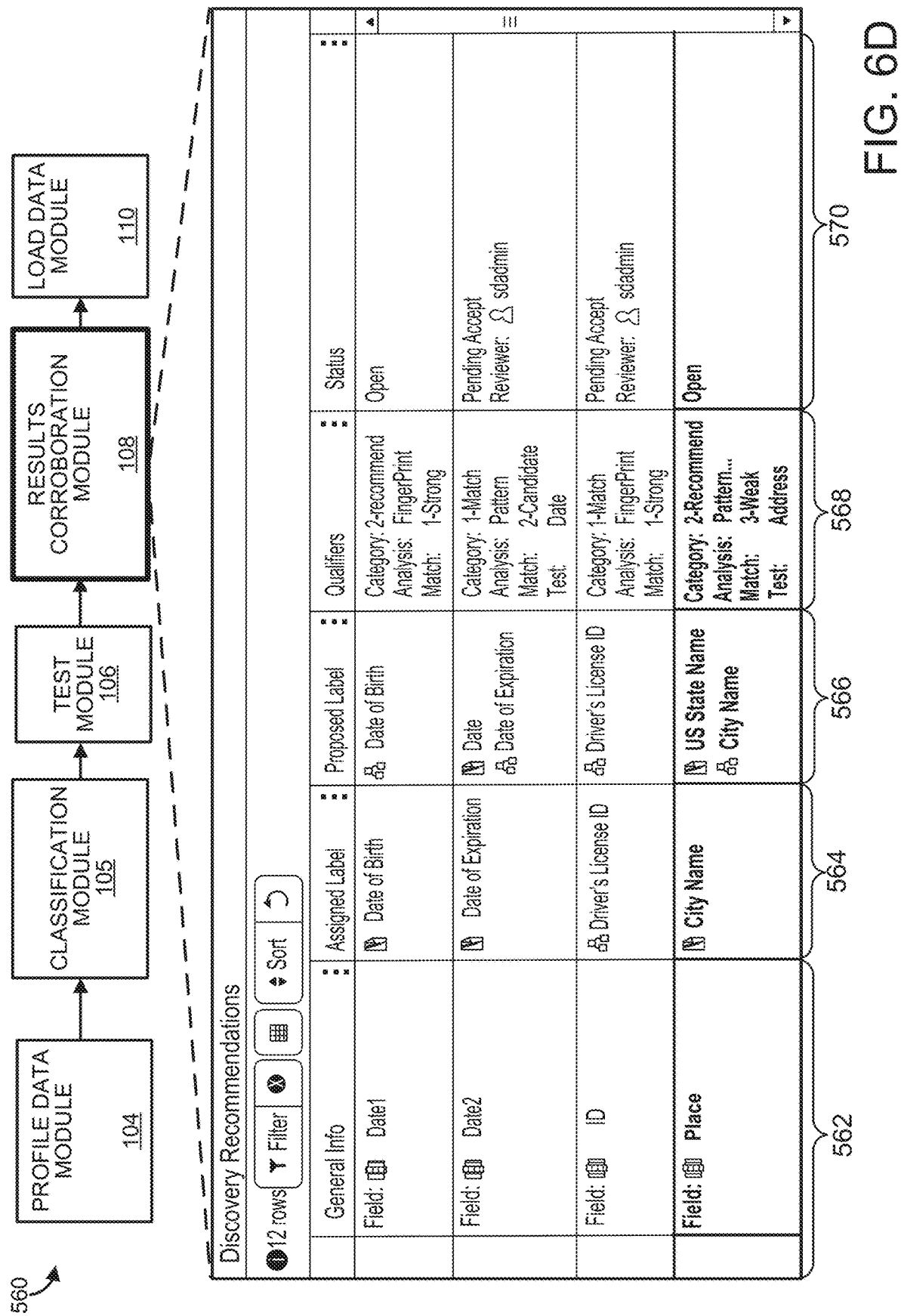
FIG. 6D is a depiction of a user interface showing an example of results of labeling the data fields.

Turning to FIG. 6D, a depiction of a user interface 560 showing recommendations for labels of discovered data fields. The user interface is presented in a tabular format in which values of the table are interactive. Column 562 shows field names received in the source data. Column 564 shows which labels have been assigned to the field. As described previously, each field can be associated with more than one label. Column 566 shows a proposed label for the field of column 562. Column 568 identifies which test(s) were run by the testing module 106 on the field, how strong the results are, and what category of recommendation is made for the label. Column 570 shows and pending decisions for the user with respect to the field of column 562. For example, the user might be prompted to accept/reject a proposed label, rerun a test with updated parameters, and so forth.

In this example, in the final row, the discovered field "Date1," which has been discovered, profiled, classified, and labeled as described in relation to FIGS. 6A-6C, is shown. The field "Date1" is assigned a label of "Date of Birth." As shown in column 568, the category of the label is the "recommend" category, as the score associated with the candidate label is 95, as shown in FIG. 6B. The analysis performed included pattern matching in addition to other analyses. The decision to assign a label to the field "Date1" is open, as a label has been assigned and no further action is needed by the user.

Figure 6E:
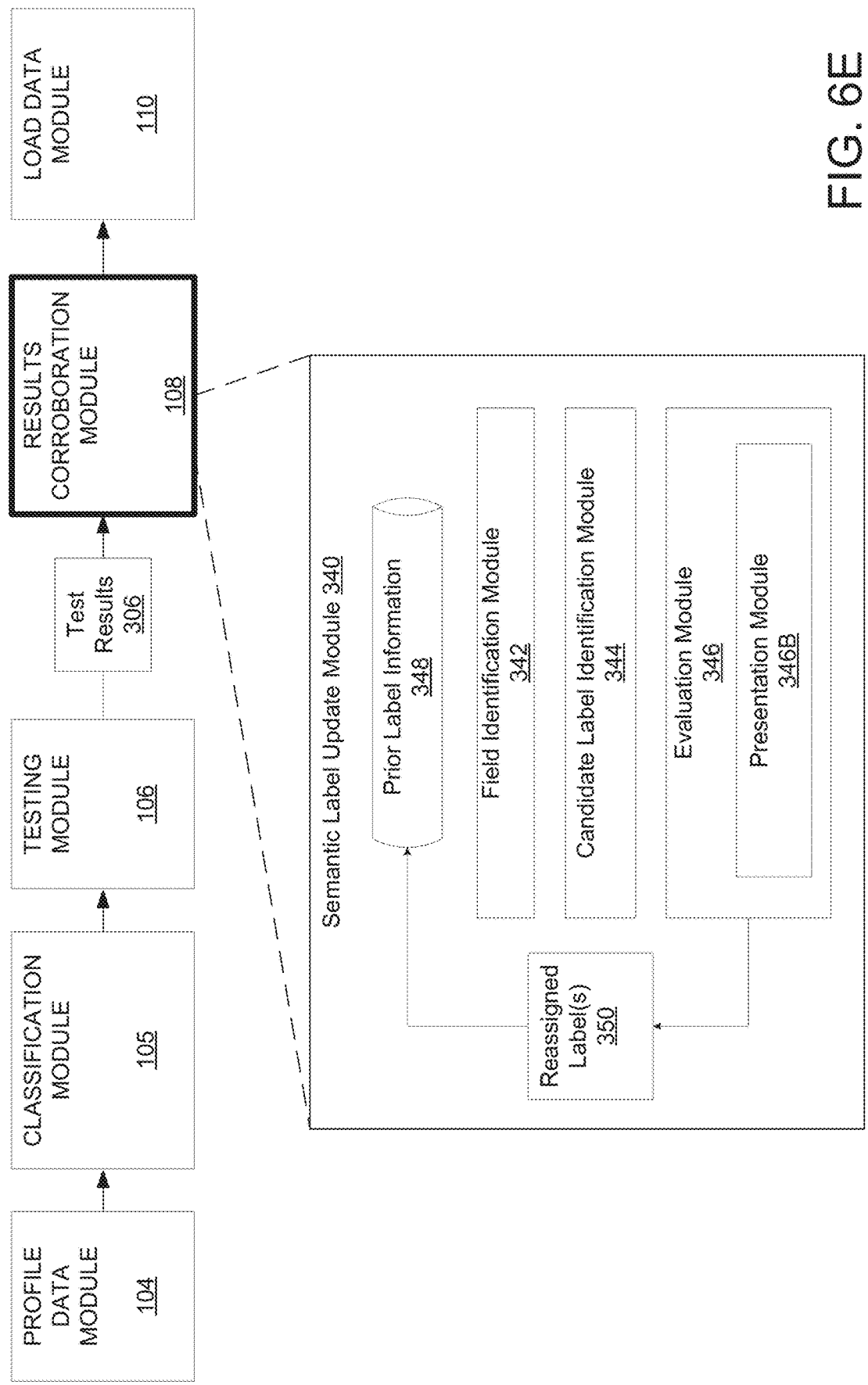
FIG. 6E is a block diagram depicting a semantic label update module of the results corroboration module 108.

Turning to FIG. 6E, the block diagram shows a semantic label update module 340 of the results corroboration module 108. The semantic label update module 340 manages labeling of fields for which labeling has previously been completed (e.g., in a previous iteration of semantic discovery performed by the execution system 102). The semantic label update module 340 includes a field identification module 342, a candidate label identification module 344, an evaluation module 346, and a data store 348 storing prior label information.

In some embodiments, the results corroboration module 108 determines that labeling of a field is complete after a label is assigned to the field indicating the semantic meaning of the field. For example, the results corroboration module 108 completes labeling of the field in response to receiving input through a user interface indicating that the user has accepted a candidate label for assignment to the field. In some embodiments, the results corroboration module 108 determines that labeling of a field is complete when all candidate labels were rejected. For example, the results corroboration module 108 may receive input through a user interface indicating that all the candidate label(s) are to be ignored to indicate that none of the candidate label(s) are accepted for a given field. In this example, the results corroboration module 108 determines that labeling is complete for the field after receiving the input indicating that all the candidate label(s) for the field are to be ignored. In some embodiments, the results corroboration module 108 determines that labeling for a given field is complete when there are no candidate labels generated for the field during the labeling process. For example, the results corroboration module 108 may not have identified any candidate labels from application of the label proposal tests to profile data.

In some embodiments, the results corroboration module 108 may determine that labeling for a given field is incomplete if it is assigned a label outside of the system 100. For example, labeling for the field may not be determined to be complete if a label is manually assigned outside of a labeling process performed by the execution system 102.

In some embodiments, the prior label information 348 includes an indication of fields for which labeling has previously been completed and information labeling of those fields. The information about the fields may include labels assigned to the fields and/or information about previous candidate labels for the fields. The information 348 may include scores associated with labels assigned to one or more fields and/or may scores associated candidate labels for one or more fields. The information 348 may include indications of one or more fields for which no candidate labels have previously been identified.

In some embodiments, the semantic label update module 340 updates the prior label information 348. The semantic label update module 340 updates the information 348 after completing labeling for a field. After completing labeling for the field, the semantic label update module 340 updates the prior label information 348 to store information about labeling of the field. For example, the semantic label update module 340 may store a label assigned to the field and a corresponding score, one or more candidate labels proposed for the field and corresponding score(s), and/or an indication that no candidate labels were generated for the field.

The field identification module 342 identifies fields for which labeling has previously been completed. The field identification module 342 may identify a field for which labeling has been completed using prior label information about the field (e.g., stored in data store 348). In some embodiments, the field identification module 342 determines whether a field is assigned a label by checking whether a label is assigned to the field in a label index. In some embodiments, the field identification module 342 determines whether one or more candidate labels have been identified for a field and, if so, whether they were all rejected.

The candidate label identification module 344 identifies one or more candidate labels for a field and corresponding candidate label score(s). A score may indicate a strength of a label in identifying a semantic meaning of a field (e.g., a higher score may indicate a stronger label). The scores may be determined using scores and weights provided by the testing module 106. In some embodiments, a candidate label score is an adjusted score as described herein with reference to FIG. 6B. candidate label identification module 344 identifies the candidate label(s) and corresponding candidate label score(s) using test results obtained from the testing module 106. Techniques of generating label proposals and corresponding scores by applying label proposal tests are described herein.

The evaluation module 346 evaluates whether to assign a candidate label to a field using a corresponding candidate label score and prior label information of the field. In some embodiments, the evaluation module 346 determines whether to generate an interface through which a user can provide input indicating whether to assign the candidate label to the field. For example, the interface may be a graphical user interface (GUI) through which a user can provide input (e.g., as shown in FIGS. 6H-6I). In some embodiments, the evaluation module 346 evaluates whether to automatically assign the candidate label to the field. For example, the evaluation module 346 may: (1) determine whether the candidate label score is a threshold amount (e.g., 1, 2, 3, 4, 5, 10, 15, 20, or 25) higher than a score of an assigned label; and (2) automatically assign the candidate label to the field when it is determined that the candidate label score is the threshold amount higher. In another example, the evaluation module 346 may: (1) determine whether the candidate label score meets a threshold score (e.g., 70, 75, 80, 85, 90, 95, 100); and (2) automatically assign the candidate label to the field when the candidate label score meets the threshold score.

In some embodiments, the evaluation module 346 evaluates whether to assign a candidate label to a field by: (1) determining whether the candidate label score is a threshold amount greater than a score of a label currently assigned to the field; (2) generating an interface through which a user can provide input indicating whether to assign the candidate label to the field when the candidate label score is a threshold amount greater than the assigned label score; and (3) bypassing generation of the interface when the candidate label score is not greater than the assigned label score by the threshold amount. The threshold amount may be 1%, 2%, 3%, 4%, 5%, 10%, 15%, 20%, 25%, 50%, or another suitable amount greater than the assigned label score. In some embodiments, the evaluation module 346 evaluates whether to assign a candidate label to a field by: (1) determining whether the candidate label score meets a threshold score; (2) generating an interface through which a user can provide input indicating whether to assign the candidate label to the field when the candidate label score meets the threshold score; and (3) bypassing generation of the interface when the candidate label score does not meet the threshold score. For example, the threshold score may be 50, 55, 60, 65, 70, 75, 80, 85, 90, 95, 100, or another suitable threshold score.

In some embodiments, the evaluation module 346 evaluates whether to assign a candidate label to a field by: (1) determining whether the candidate label score is a threshold amount greater than score(s) of previously-determined candidate label(s) for the field that were rejected; (2) generating an interface through which a user can provide input indicating whether to assign the candidate label to the field when the candidate label score is the threshold amount greater than the score(s) of previously-determined candidate label(s) for the field; and (3) determining to bypass generation of the interface when the candidate label score is not the threshold amount greater than the score(s) of the previously determined candidate label(s). The threshold amount may be 1%, 2%, 3%, 4%, 5%, 10%, 15%, 20%, 25%, 50%, or other suitable amount greater than the previously-determined candidate label scores.

In some embodiments, the evaluation module 346 evaluates whether to assign a candidate label to a field by: (1) determining whether any candidate labels were previously identified for the field; and (2) generating an interface through which a user can provide input indicating whether to assign the candidate label to the field when it is determined that no candidate labels have previously been identified for the field.

The presentation module 346A of the evaluation module 346 generates interfaces through which users may provide input on a candidate label for a field. In some embodiments, the presentation module 346A generates an interface through which a user may provide input indicating acceptance of a candidate label as indicating a semantic meaning of the field. In response to receiving the input, the evaluation module 346 may assign the candidate label to the field. For example, the presentation module 346A may provide a user with an option to accept or reject a candidate label for assignment. In some embodiments, the presentation module 346A generates an interface for approving acceptance of a candidate label for a field. The interface may allow a reviewer to approve a user's acceptance of the candidate label for the field. For example, the presentation module 346A may provide a reviewer with an option to approve or reject acceptance.

In some embodiments, the reassigned label(s) 350 may be stored in a label index. For example, the load data module 110 may store the reassigned label(s) 350 in the label index. The label index may be accessed by downstream processes (e.g., software applications). In some embodiments, a label assigned to a field may associate one or more attributes with the field. Data from the field may be processed (e.g., by downstream processes) in accordance with the attribute(s). For example, the attribute(s) associated with a field may indicate that the field includes PII. A software application may determine, from the attribute(s) associated with the field based on its assigned label, that data from the field includes PII. When the software application determines that the data from the field includes PII, the software application may process data from the field by masking PII in the data (e.g., by masking data values or portions thereof).

In some embodiments, reassigned label(s) 350 may be used in execution of a software application. For example, reassigned label(s) 350 may be used to execute a software application that performs data quality enforcement. As another example, one of the reassigned label(s) 350 may indicate that a respective field includes PII. The label may be used to execute a software application that performs PII anonymization and/or execute a software application that masks PII.

In some embodiments, the reassigned label(s) 350 may be used to determine data processing rule(s) for processing data from respective fields. For example, a data processing system may receive a request to process data from a first field. In response to the request, the data processing system may access a label assigned to the field (e.g., from a label index). The data processing system may determine one or more data processing rules for processing data from the field based on the label assigned to the field. The data processing system may process data from the field in accordance with the data processing rule(s). In some embodiments, the data processing rule(s) may be stored in a label index in association with the label assigned to the field. The data processing system may thus identify the label in the label index and identify the data processing rule(s) associated with the label in the label index. For example, a label assigned to a field in the label index may indicate that data stored in the field includes PII. The label may further be associated with one or more data processing rules in the label index, where the data processing rule(s) indicate data masking rules to mask PII in data from the field. Data from the field may be processed (e.g., by software application(s)) using the data processing rule(s). For example, data may be processed by applying the data masking rules to data from the field.

In some embodiments, the reassigned label(s) 150 may be used to process data from a field without scanning or analyzing data from the field. For example, data from the field may be processed based on a label assigned to the field indicating that data from the field includes PII. Given that the assigned label indicates that data stored in the field includes PII, data from the field may be processed without scanning or analyzing the data to determine whether it includes PII. Data from the field may be processed using data processing rule(s) (e.g., associated with the assigned label) without scanning or analyzing the data (e.g., to determine whether it has certain attribute(s)).

Figure 6F:
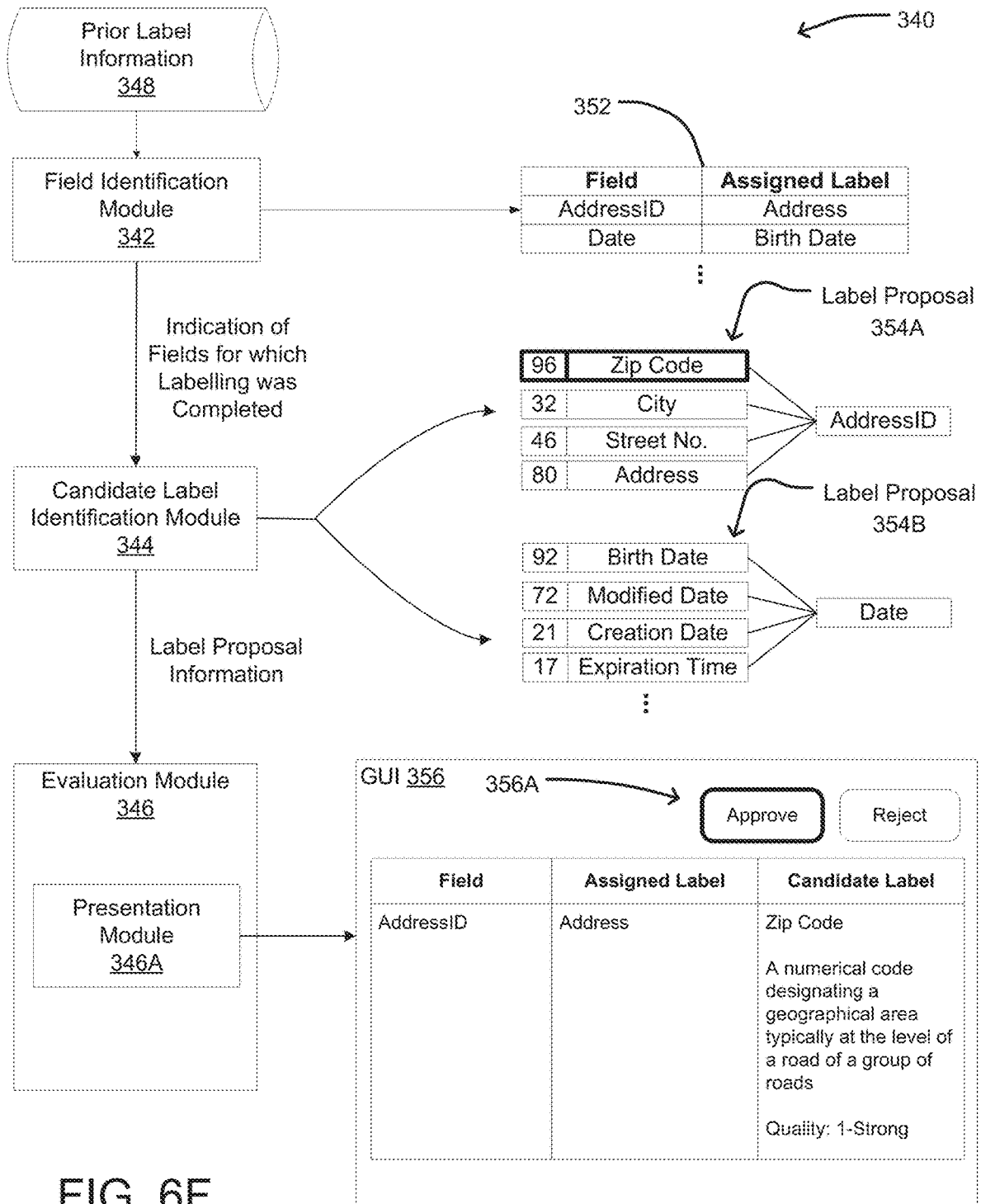
FIG. 6F is a depiction of labeling a previously labeled field performed by the semantic label update module of FIG. 6E.

FIG. 6F is a depiction of labeling a previously labeled field performed by the semantic label update module 340 of FIG. 6E. In the example of FIG. 6, the field identification module 342 identifies fields 352 for which labeling has previously been completed using prior label information from data store 348 (e.g., by identifying fields that have labels assigned and/or identifying fields that had candidate labels that were all rejected). In the example of FIG. 6F, the previously labeled fields 352 include an "AddressID" field assigned a label of "Address", and a "Date" field assigned a label of "Birth Date".

The candidate label identification module 344 receives from the field identification module 342, an indication of fields for which labeling was completed. For example, the candidate label identification module 344 may receive references to the fields 352 from the field identification module 342. The candidate label identification module 344 identifies, for each of the fields 352, one or more candidate labels and corresponding candidate label score(s) (e.g., using test results obtained from the testing module 106). In the example of FIG. 6F, the candidate label identification module 344 identifies label proposal 354A for the "AddressID" field and label proposal 354B for the "Date" field. The label proposal 354A includes the following candidate labels and corresponding scores: "Zip Code" with a corresponding score of 96, "City" with a corresponding score of 32, "Street Number" with a corresponding score of 46, and "Address" with a corresponding score of 80. The label proposal 354B includes the following candidate labels and corresponding scores: "Birth Date" with a corresponding score of 92, "Modified Date" with a corresponding score of 72, "Creation Date" with a corresponding score of 21, and "Expiration Time" with a corresponding score of 17.

The evaluation module 346 receives label proposal information from the candidate label identification module. The label proposal information may include the label proposals 354A, 354B determined by the candidate label identification module 344.

Figure 6G:
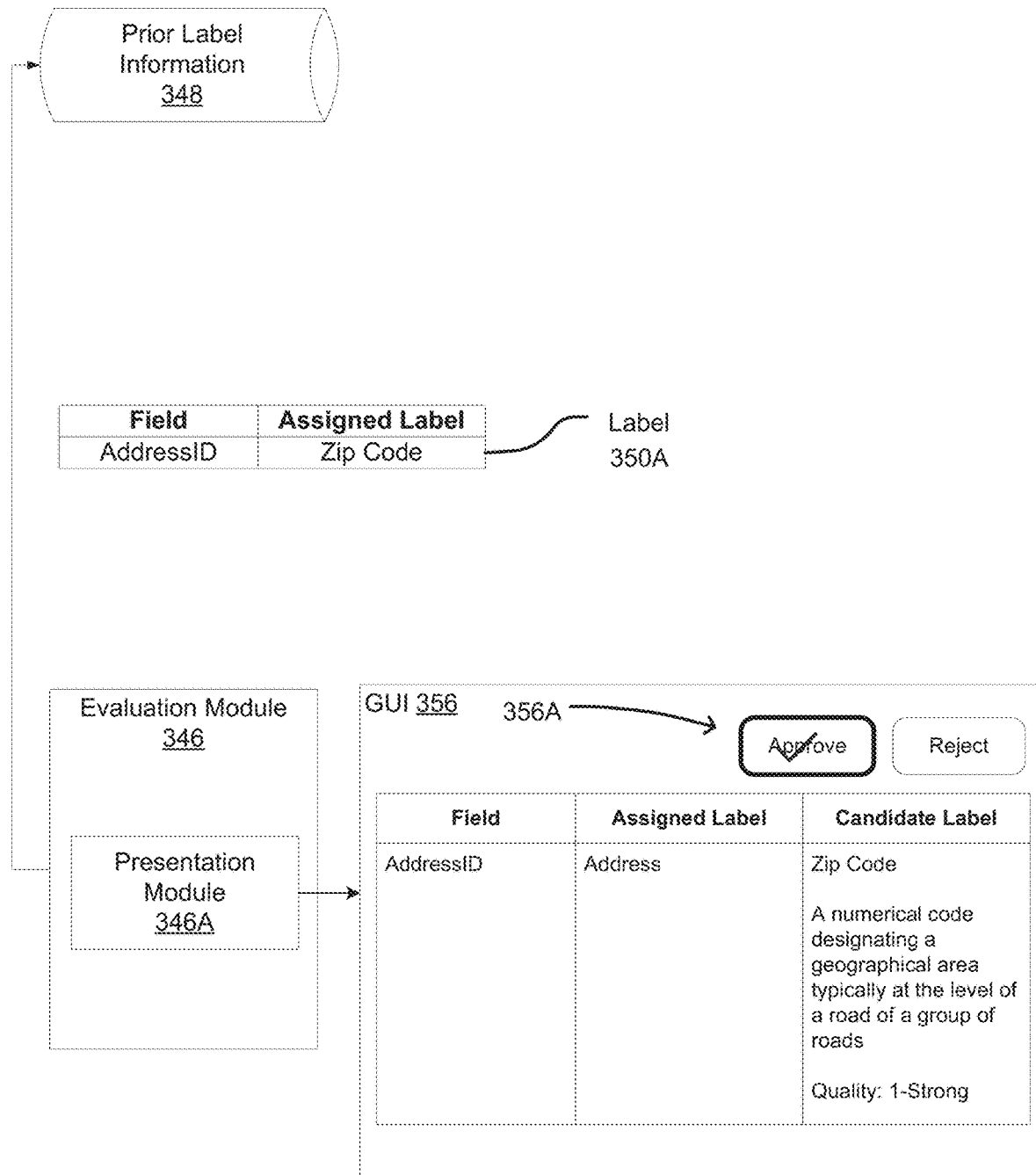
FIG. 6G is a depiction of re-assigning a label to a previously labeled field performed by the semantic label update module of FIG. 6E.
Figure 6H:
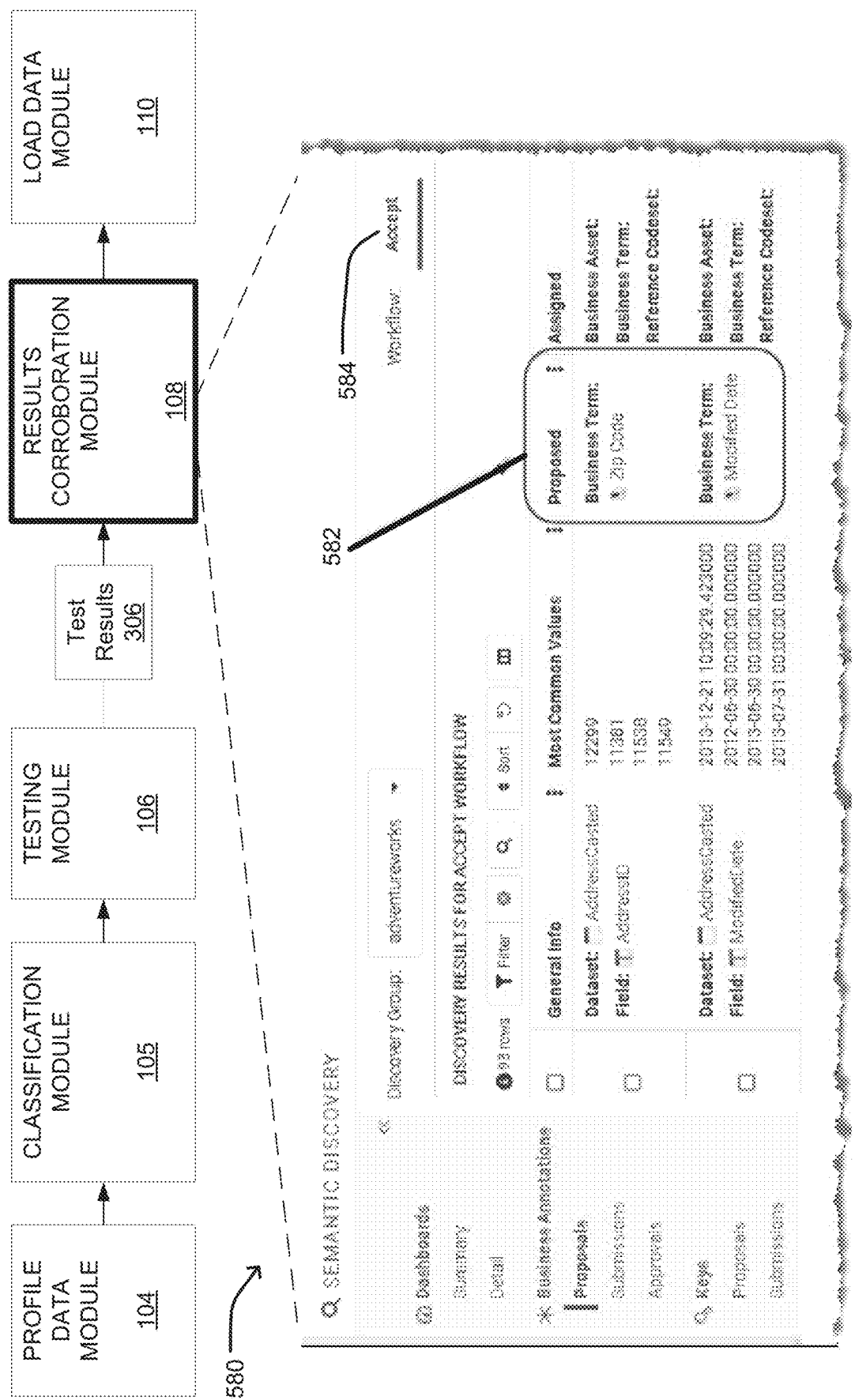
FIG. 6H is a depiction of a user interface through which a user can provide input indicating to assign candidate labels to fields.
Figure 6I:
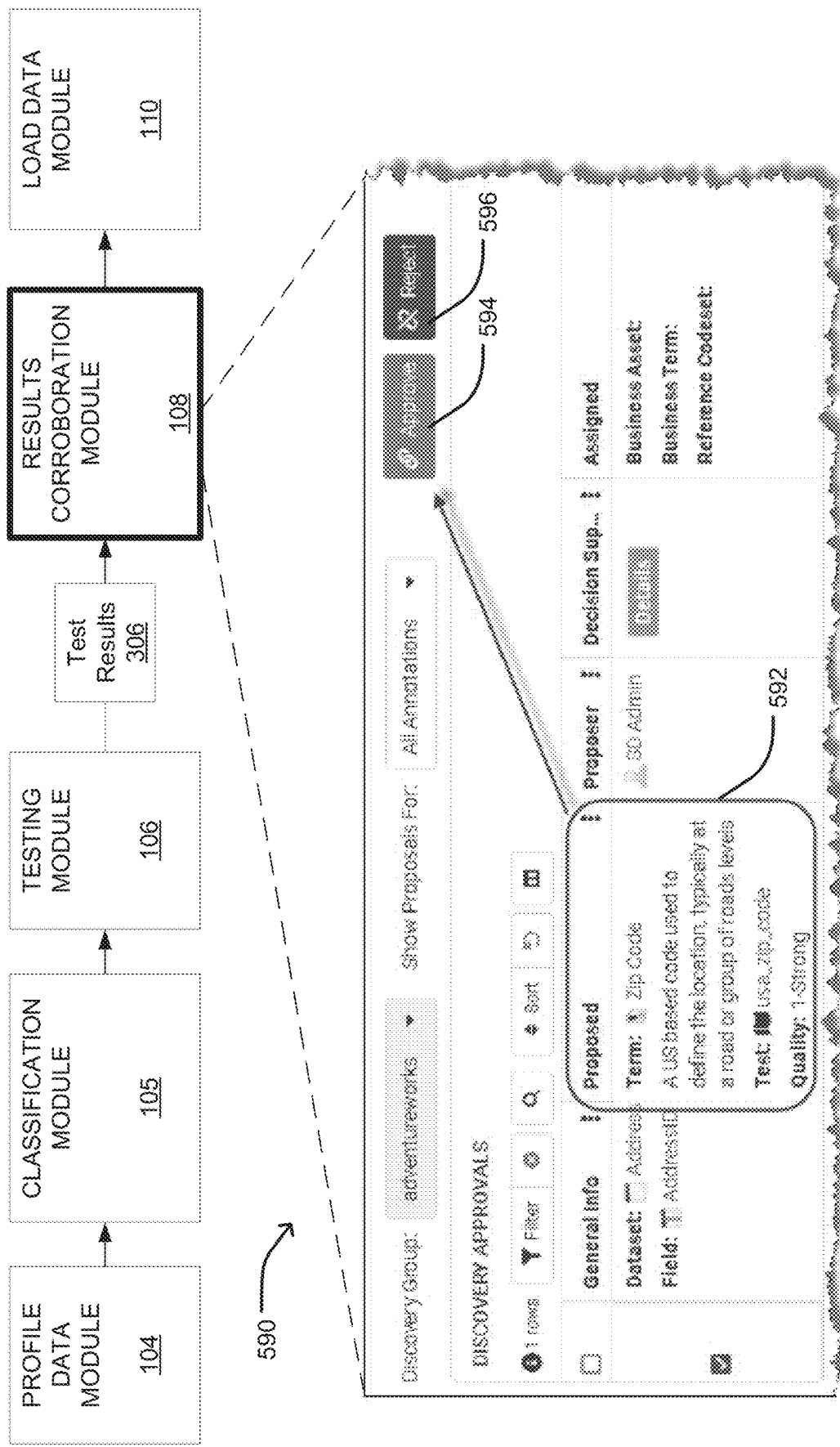
FIG. 6I is a depiction of a user interface through which an assignment of a candidate label to a field can be approved or rejected.

In the example of FIG. 6F, the evaluation module 346 determines to generate an interface through which a user can provide input indicating whether to assign the candidate label "Zip Code" to the "AddressID" field. For example, the evaluation module 346 may determine to generate the interface by determining that the score associated with the "Zip Code" candidate label is sufficiently higher (e.g., at least a threshold amount greater) than the score associated with the assigned label "Address". As another example, the evaluation module 346 may determine to generate the interface by determining that the score associated with the "Zip Code" candidate label meets a threshold score. When it is determined to generate the interface, the presentation module 346A of the evaluation module 346 generates the GUI 356 through which a user can provide input to assign the candidate label "Zip Code" to the "AddressID" field replacing the previous "Address" label. As shown in FIG. 6G, the GUI 356 includes graphical options 356A that allow a user to approve the updated label assignment or reject the updated label assignment.

In the example of FIG. 6F, the evaluation module 346 determines to bypass generating an interface through which a user can provide input whether to assign a new label to the "Date" field. For example, the evaluation module 346 may determine to bypass generation of the interface by determining that none of scores of the candidate labels in label proposal 354B are sufficiently higher than the score associated with the currently assigned label of "Birth Date". As another example, the evaluation module 346 may determine to bypass generation of the interface by determining that none of the scores associated with the candidate labels other than "Birth Date" meet a threshold score. Accordingly, the evaluation module 346 does not provide an interface through which a user can provide input approving or rejecting assignment of a different label to the "Date" field.

FIG. 6G is a depiction of re-assigning a label to a previously labeled field performed by the semantic label update module of FIG. 6E. As illustrated in FIG. 6G, a user selects one of the graphical options 356A in GUI 356 indicating approval of assigning the candidate label "Zip Code" to the "AddressID" field in place of "Address". In response to receiving the user input, the evaluation module 346 relabels the "AddressID" field with a label 350A of "Zip Code". The evaluation module 346 updates the prior label information 348 to indicate the new label for the "AddressID" field. For example, the evaluation module 346 may update a label index storing assigned labels of fields.

FIG. 6H depicts a user interface 580 displaying candidate labels 582 for various fields for which labeling was previously completed. The fields are the "AddressID" field and the "ModifiedDate" fields. The fields may have been evaluated by the semantic label update module 340 of the results corroboration module 108 described herein with reference to FIG. 6E. As shown in FIG. 6H, the user interface 580 shows a new candidate label of "Zip Code" for the "AddressID" field and new candidate label of "Modified Date" for the "ModifiedDate" field. The user interface 580 includes a workflow option 584 that allows a user to accept each of the candidate labels for each field.

FIG. 6I depicts a user interface 590 for reviewing an accepted candidate label. The user interface 590 may be generated after acceptance of a candidate label. In the example of FIG. 6I, the candidate label "Zip Code" was accepted for the "AddressID" data field. The user interface 590 displays information 592 about the accepted candidate field. The user interface 590 provides an option to approve 594 the label assignment. The user interface 590 also provides an option 596 to deny the label assignment. For example, a user may provide input indicting that the term "Zip Code" proposed for the "AddressID" field is to be rejected.

The semantic label update module 340 may output one or more reassigned labels 350 as a result of evaluation performed by the evaluation module 346. For example, the evaluation performed by the evaluation module 346 may result in replacing a previous label assignment for a field with a new label assignment to indicate a semantic meaning of the field. In another example, the evaluation performed by the evaluation module 346 may result in assigning a label to a field which previously did not have any label assigned to it. In another example, evaluation performed by the evaluation module 346 may not result in any change in a label assignment of a field.

The semantic label update module 340 may store the reassigned label(s) 350 in a data store. In some embodiments the semantic label update module 340 updates the data store 348 of prior label information based on its evaluations. In some embodiments, the semantic label update module updates a label index based on its evaluations.

In some embodiments, the semantic label update module 340 updates labeling of a field for each of multiple label groupings. A particular field may have a label assigned in each of the label groupings. As an illustrative example, the multiple label groupings may be business terms, business assets, and reference code sets. Business terms may comprise of labels indicating words with understood meanings in a business context. Example business terms include "social security number", "bank account number", "credit score", and/or other business terms. Business assets may comprise of labels indicating concepts (e.g., reporting and data transformations) and/or objects (e.g., databases and reports) that are important to a business. Reference code sets comprise of terms indicating various domains such as countries, states, cities, and/or other domains.

In some embodiments, the semantic label update module 340 evaluates whether to assign a candidate label to a field in each of multiple groupings. The semantic label update module 340 may update a label assignment of a field in one or more groupings while not updating label assignment in one or more other groupings. Accordingly, the semantic label update module 340 may apply techniques described herein for each of the multiple groupings. Continuing with the example label groupings above, business assets, and reference code sets, the semantic label update module 340 may reassign a business term label for a field but keep label assignments of the business asset and reference code set groupings the same. When relabeling a field for a particular grouping, the semantic label update module 340 may use candidate label(s) and corresponding scores, and prior label information for the particular label grouping. For example, when the semantic update module 340 is evaluating whether to assign a candidate label to a field for the business term grouping, the semantic update module 340 may use candidate label(s) and corresponding score(s) determined for the business term grouping, and prior label information for the business term grouping.

Figure 7:
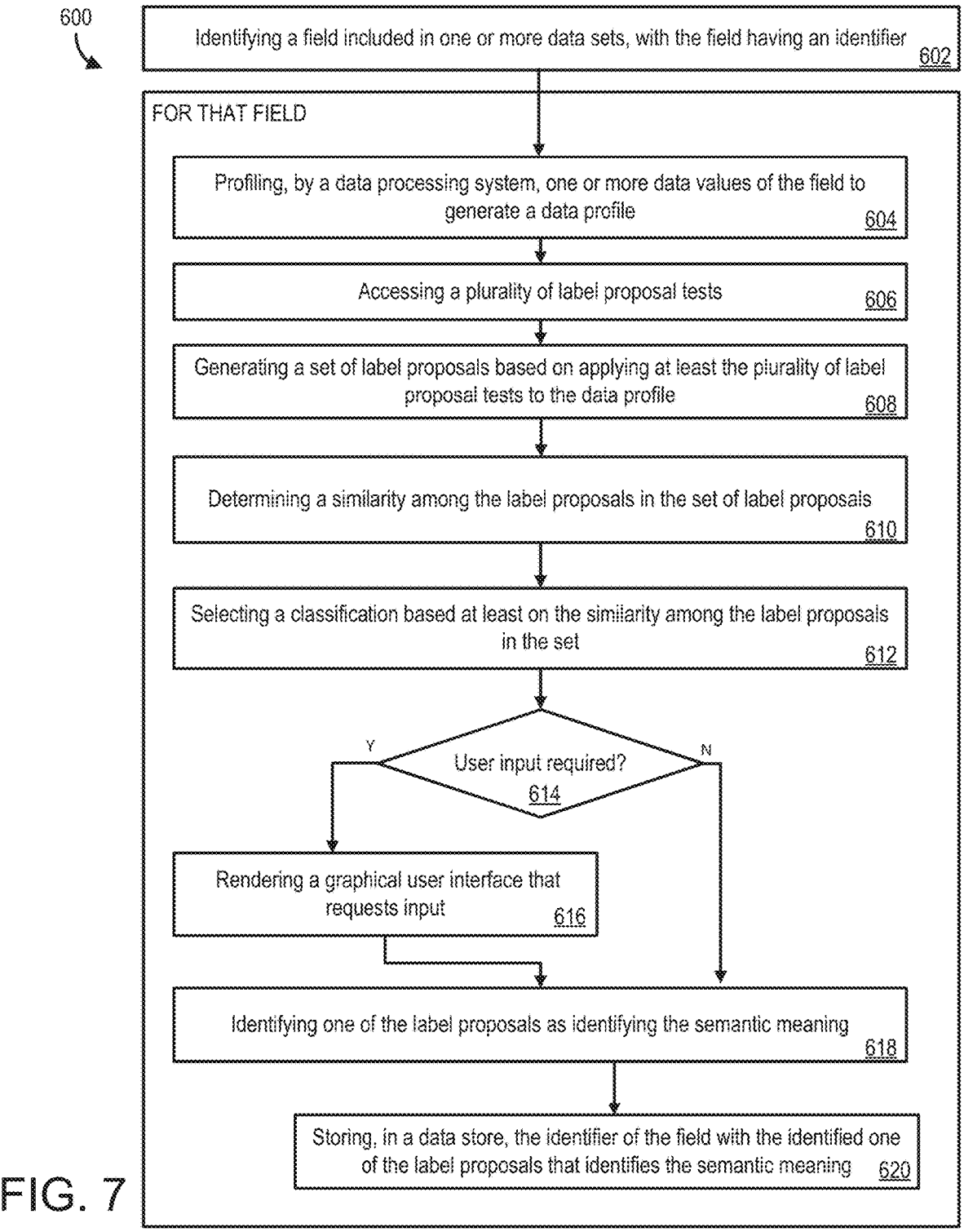
FIG. 7 is a flow diagram showing example processes for discovering, classifying and labeling data fields by analyzing a data profile generated from data of the data fields.

FIG. 7 shows a flow diagram of the process 600 for labeling discovered fields with candidate labels. The process 600 includes identifying (602) a field included in one or more data sets, with the field having an identifier. The process 600 includes, profiling (604), by a data processing system, one or more data values of the field to generate a data profile. The process 600 includes accessing (606) a plurality of label proposal tests. The process 600 includes generating (608) a set of label proposals based on applying at least the plurality of label proposal tests to the data profile. The process 600 includes determining (610) a similarity among the label proposals in the set of label proposals. The process 600 includes selecting (612) a classification based at least on the similarity among the label proposals in the set. The process 600 includes determining (614) if user input is required. The process 600 includes rendering (616) a graphical user interface that requests input if user input is required. The process 600 includes identifying (618) one of the label proposals as identifying the semantic meaning. The process includes storing (620), in a data store, the identifier of the field with the identified one of the label proposals that identifies the semantic meaning.

Figure 8:
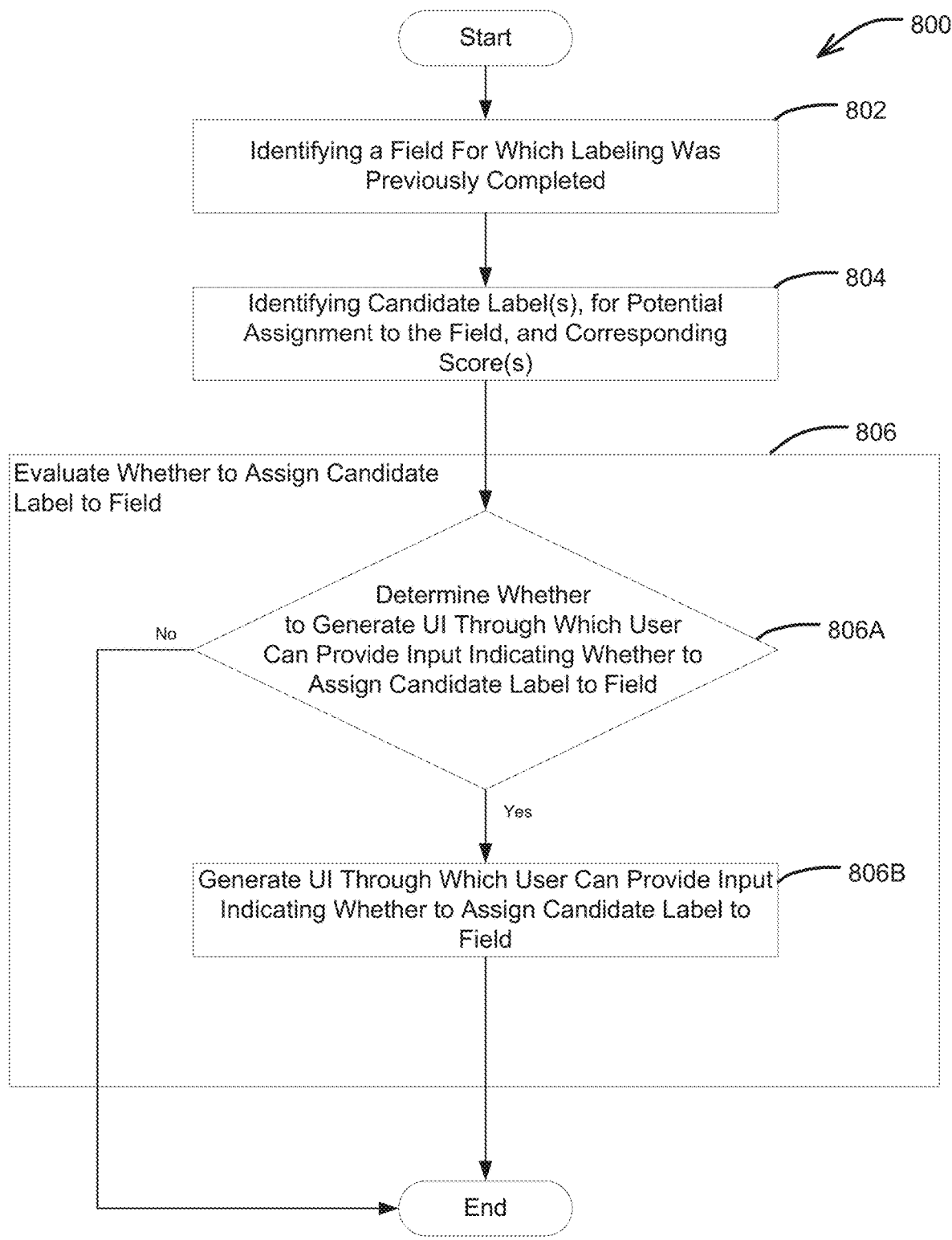
FIG. 8 is a flow diagram showing an example process for updating a semantic label of a field.

FIG. 8 shows a flow diagram of the process 800 for updating a semantic label of a field. In some embodiments, the process 800 may be performed by execution system 102. For example, the process 800 may be performed by the semantic label update module 340 of the results corroboration module 108 described herein with reference to FIG. 6E.

Process 800 begins at block 802, where the system identifies a field for which labeling was previously completed (e.g., in a prior iteration of labeling). In some embodiments, the system may identify a field having a previously-assigned label that indicates a semantic meaning of the field. The previously-assigned label may have a corresponding previously-determined label score. In some embodiments, the system may identify a field that does not have an assigned label that indicates a semantic meaning of the field. One or more previously-identified candidate labels for the field may previously have been identified as potential assignments to the field with a corresponding set of previous candidate label score(s). None of the previously-identified candidate labels may have been assigned to the field. In some embodiments, the system may identify a field that does not have an assigned label that indicates a semantic meaning of the field, and for which no candidate labels were previously identified for potentiation assignment to the field.

Next, process 800 proceeds to block 804, where the system identifies one or more candidate labels for the field and corresponding candidate label score(s). The system may identify the candidate label(s) and the candidate label score(s) using results of label proposal tests applied to profile data of the field. In some embodiments, the label proposal tests and the profile data of the field may be updated relative to a previous time at which labeling was performed for the field. In some embodiments, one or more labels may have been added or removed (e.g., to a label dictionary) after labeling was performed for the field. As a result of such updates, the candidate label(s) and their corresponding score(s) may be different from the labels and/or scores previously identified.

In some embodiments, the system identifies candidate label(s) by applying label proposal tests to a profile of the field to obtain label proposals and corresponding label proposal scores. In some embodiments, the system applies the label proposal tests to a previously generated profile of the field. In some embodiments, the system profiles the field to generate a new profile and apply the label proposal tests to the new profile. The system determines the candidate label(s) and the corresponding set of candidate label scores using the label proposals and the label proposal scores. In some embodiments, the label proposal tests may be associated with respective weight values and the system determines the candidate label scores using the label proposal scores and the weight values. The system may determine weighted scores as the candidate label scores using the label proposal scores and the weight values as described. For example, the system may determine adjusted scores as the candidate label scores as illustrated herein with reference to FIG. 6B.

In some embodiments, a candidate label score (e.g., an adjusted score) may be a percentage value between 0 and 100 obtained using label proposal scores and weight values associated with label proposal tests. For example, the label proposal scores may be probability values between 0 and 1 outputted by the label proposal tests. The system may determine a percentage value using the weighted probability values. To illustrate, the system may obtain the following sets of label proposal scores and corresponding weights for a candidate label: (0.8, 1.5), (0.75, 1.1), (0.9, 1), (0.8, 0.8). In this example, the system may determine a mean weighted label proposal score of approximately 0.81. The system may determine the candidate label score to be 81.

Next, process 800 proceeds to block 806, where the system evaluates whether to assign a candidate label to a field. In the example of FIG. 8, the evaluation of block 806 includes determining, at block 806A, whether to generate a user interface (e.g., a GUI) through which a user can provide input indicating whether to assign the candidate label to the field. The system may use a candidate label score associated with the candidate label to determine whether to generate the user interface. In some embodiments, the system may determine whether to generate the user interface by determining whether the candidate label score is a threshold amount greater than a score of a label presently assigned to the field. In some embodiments, the system may determine whether to generate the user interface by determining whether the candidate label score is a threshold amount greater than score(s) of candidate label(s) previously identified for the field. In some embodiments, the system may determine whether to generate the user interface by determining whether any candidate labels were previously identified for the field. Example techniques for determining whether to generate a user interface are described herein with reference to FIG. 6E.

If at block 806A the system determines to generate the user interface through which a user can provide input indicating whether to assign the candidate label to the field, then process 800 proceeds to block 806B, where the system generates the user interface. Example user interfaces are described herein with reference to FIGS. 6E-6I. The system may then receive user input indicating whether the candidate label is to be assigned to the field.

If at block 806A the system determines not to generate the user interface through which a user can provide input indicating whether to assign the candidate label to the field, then process 800 bypasses generation of the user interface and ends.

As an illustrative example, a field may previously have been labeled with the term "Code". In a subsequent iteration of semantic discovery, the system may determine a candidate label of "Product Code" for the field. An adjusted score associated with the assigned label "Code" is 89 while the adjusted score associated with the label "Produce Code" is 95. The system determines to generate a user interface to obtain user input indicating whether "Product Code" is to be assigned to the field because the score associated with the label "Product Code" is sufficiently greater than the score associated with the label "Code".

As another example, an "AddressID" field may not be assigned a label. The maximum adjusted score among previously-identified candidate labels for the field was 56. All of the previously-identified candidate labels for the "AddressID" field were rejected (e.g., based on user input and/or automatically by the system). The system may identify a candidate label of "Zip Code" that was not previously identified for the "AddressID" field, and which has an associated adjusted score of 96. The system determines to generate the user interface when it determines that the adjusted score associated with the candidate label "Zip Code" is sufficiently greater than the maximum score of 56 among previously-identified candidate labels for the "AddressID" field.

As described herein with reference to FIG. 6E, in some embodiments, the system may perform updating of semantic labels for multiple groupings (e.g., business asset, business term, reference code set). In these embodiments, the system may perform the process 800 for each of the label groupings.

The techniques described above can be implemented using software for execution on a computer. For instance, the software forms procedures in one or more computer programs that execute on one or more programmed or programmable computer systems (which can be of various architectures such as distributed, client/server, or grid) each including at least one processor, at least one data storage system (including volatile and non-volatile memory and/or storage elements), at least one input device or port, and at least one output device or port. The software can form one or more modules of a larger program, for example, that provides other services related to the design and configuration of charts and flowcharts. The nodes, links and elements of the chart can be implemented as data structures stored in a computer readable medium or other organized data conforming to a data model stored in a data repository.

The techniques described herein can be implemented in digital electronic circuitry, or in computer hardware, firmware, software, or in combinations thereof. An apparatus can be implemented in a computer program product tangibly embodied or stored in a machine-readable storage device (e.g., a non-transitory machine-readable storage device, a machine-readable hardware storage device, and so forth) for execution by a programmable processor; and method actions can be performed by a programmable processor executing a program of instructions to perform functions by operating on input data and generating output. The embodiments described herein, and other embodiments of the claims and the techniques described herein, can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Computer readable media for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry. Any of the foregoing can be supplemented by, or incorporated in, ASICs (application-specific integrated circuits).

To provide for interaction with a user, embodiments can be implemented on a computer having a display device, e.g., an LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of embodiments, or any combination of such back end, middleware, or front end components. The components of the system can be interconnected by any form or medium of digital data communication, e.g., a communication network. Examples of communication networks include a local area network (LAN) and a wide area network (WAN), e.g., the Internet.

The system and method or parts thereof may use the "World Wide Web" (Web or WWW), which is that collection of servers on the Internet that utilize the Hypertext Transfer Protocol (HTTP). HTTP is a known application protocol that provides users access to resources, which may be information in different formats such as text, graphics, images, sound, video, Hypertext Markup Language (HTML), as well as programs. Upon specification of a link by the user, the client computer makes a TCP/IP request to a Web server and receives information, which may be another Web page that is formatted according to HTML. Users can also access other pages on the same or other servers by following instructions on the screen, entering certain data, or clicking on selected icons. It should also be noted that any type of selection device known to those skilled in the art, such as check boxes, drop-down boxes, and the like, may be used for embodiments using web pages to allow a user to select options for a given component. Servers run on a variety of platforms, including UNIX machines, although other platforms, such as Windows 2000/2003, Windows NT, Sun, Linux, and Macintosh may also be used. Computer users can view information available on servers or networks on the Web through the use of browsing software, such as Firefox, Netscape Navigator, Microsoft Internet Explorer, or Mosaic browsers. The computing system can include clients and servers. A client and server are generally remote from each other and typically interact through a communication network. The relationship of client and server arises by virtue of computer programs running on the respective computers and having a client-server relationship to each other.

Other embodiments are within the scope and spirit of the description and the claims. For example, due to the nature of software, functions described above can be implemented using software, hardware, firmware, hardwiring, or combinations of any of these. Features implementing functions may also be physically located at various positions, including being distributed such that portions of functions are implemented at different physical locations. The use of the term "a" herein and throughout the application is not used in a limiting manner and therefore is not meant to exclude a multiple meaning or a "one or more" meaning for the term "a." Additionally, to the extent priority is claimed to a provisional patent application, it should be understood that the provisional patent application is not limiting but includes examples of how the techniques described herein may be implemented.

Figure 9:
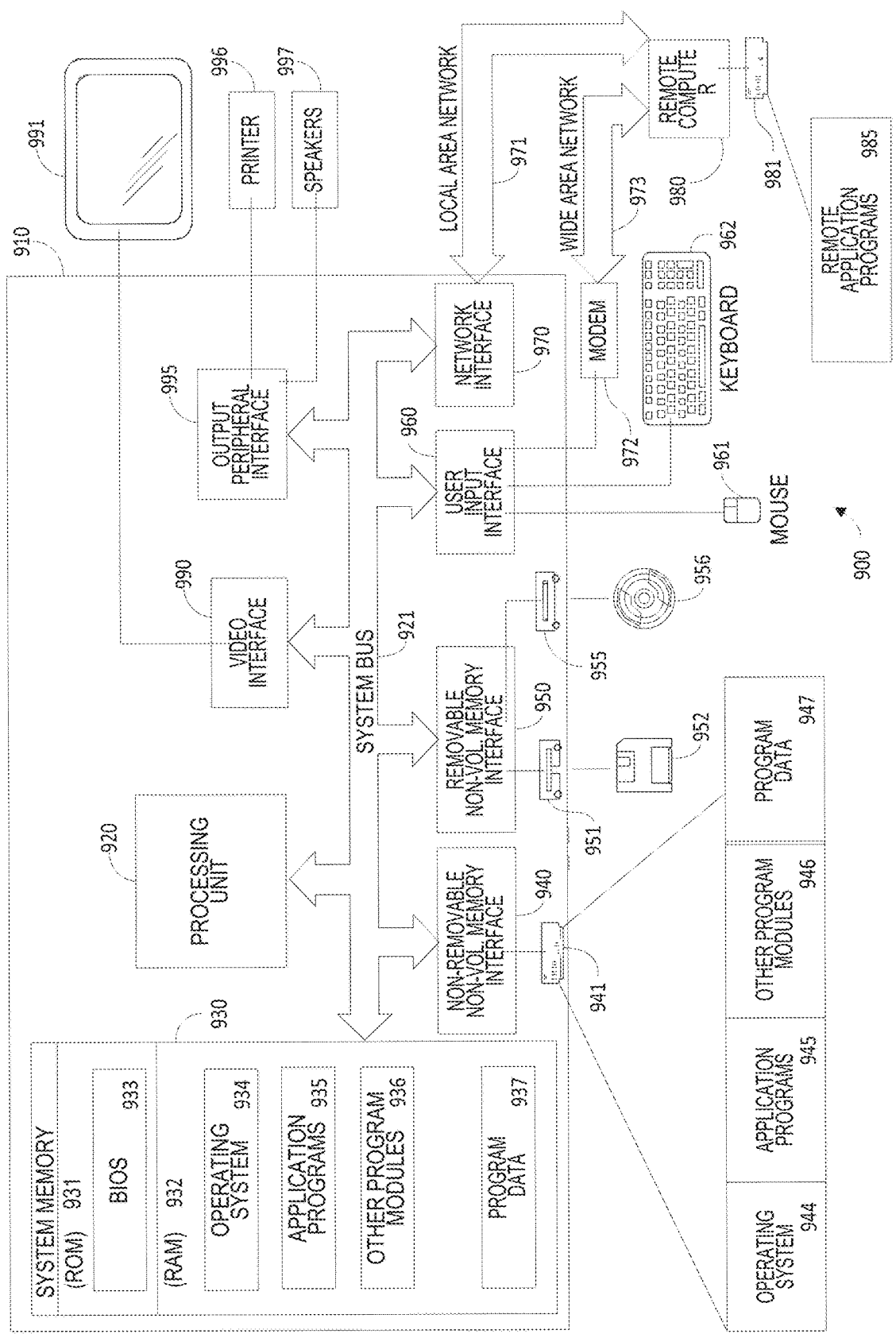
FIG. 9 illustrates an example of a suitable computing system environment on which the technology described herein may be implemented.

FIG. 9 illustrates an example of a suitable computing system environment 900 on which the technology described herein may be implemented. The computing system environment 900 is only one example of a suitable computing environment and is not intended to suggest any limitation as to the scope of use or functionality of the technology described herein. Neither should the computing environment 900 be interpreted as having any dependency or requirement relating to any one or combination of components illustrated in the exemplary operating environment 900.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 9, an exemplary system for implementing the technology described herein includes a general purpose computing device in the form of a computer 900. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (ELISA) bus, Video Electronics Standards Association (VESA) local bus, and Peripheral Component Interconnect (PCI) bus also known as Mezzanine bus.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information, and which can be accessed by computer 910. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a flash drive 951 that reads from or writes to a removable, nonvolatile memory 952 such as flash memory, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media described above and illustrated in FIG. 9, provide storage of computer readable instructions, data structures, program modules and other data for the computer 910. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. An actor may enter commands and information into the computer 910 through input devices such as a keyboard 962 and pointing device 961, commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus but may be connected by other interface and bus structures, such as a parallel port, game port or a universal serial bus (USB). A monitor 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include a local area network (LAN) 981 and a wide area network (WAN) 983 but may also include other networks. Such networking environments are commonplace in offices, enterprise-wide computer networks, intranets and the Internet.

When used in a LAN networking environment, the computer 910 is connected to the LAN 981 through a network interface or adapter 980. When used in a WAN networking environment, the computer 910 typically includes a modem 982 or other means for establishing communications over the WAN 983, such as the Internet. The modem 982, which may be internal or external, may be connected to the system bus 921 via the actor input interface 960, or other appropriate mechanism. In a networked environment, program modules depicted relative to the computer 910, or portions thereof, may be stored in the remote memory storage device. By way of example, and not limitation, FIG. 9 illustrates remote application programs 985 as residing on memory device 981. It will be appreciated that the network connections shown are exemplary and other means of establishing a communications link between the computers may be used.

A number of embodiments of the invention have been described. Nevertheless, it will be understood by one of ordinary skill in the art that various modifications may be made without departing from the spirit and scope of the claims and the techniques described herein.

The invention claimed is:

1. A method implemented by a data processing system for discovering semantic meaning of data in fields included in one or more data sets, the method comprising:
   using the data processing system to perform:
      identifying a first field having a previously-assigned label that indicates a semantic meaning of the first field, the previously-assigned label having a corresponding previously-determined label score;
      identifying a set of one or more candidate labels, for potential assignment to the first field instead of the previously-assigned label, and a corresponding set of candidate label scores, the set of candidate labels including a first candidate label corresponding to a first candidate label score in the set of candidate label scores; and
      evaluating, using the previously-determined label score and the first candidate label score, whether to assign the first candidate label to the first field, the evaluating comprising:
         when the first candidate label score is at least a first threshold amount greater than the previously-determined label score, presenting the first candidate label to a user by generating an interface through which the user can provide input indicating whether to assign the first candidate label to the first field instead of the previously-determined label; and
         when the first candidate label score is not at least the threshold amount greater than the previously determined label score, bypassing presentation of the first candidate label to the user.

2. The method of claim 1, wherein bypassing presentation of the first candidate label to the user comprises bypassing generation of the interface through which the user can provide input indicating whether to assign the first candidate label to the first field instead of the previously-determined label.

3. The method of claim 1, further comprising:
   identifying a second field, different from the first field, that does not have an assigned label that indicates a semantic meaning of the second field, wherein one or more previously-identified candidate labels were previously identified for potential assignment to the second field with a corresponding set of previous candidate label scores and wherein none of the previously-identified candidate labels were assigned to the second field;
   identifying a second set of one or more candidate labels, for potential assignment to the second field, and a corresponding second set of candidate label scores, the second set of candidate labels including a second candidate label corresponding to a second candidate label score in the second set of candidate label scores; and
   evaluating, using the previous candidate label scores and the second candidate label score, whether to assign the second candidate label to the second field, the evaluating comprising:
      when the second candidate label score is at least a second threshold amount greater than each of the previous candidate label scores, presenting the second candidate label to the user by generating an interface through which the user can provide input indicating whether to assign the second candidate label to the second field; and when the second candidate label score is not at least the threshold amount greater than each of the previous candidate label scores, bypassing presentation of the second candidate label to the user.

4. The method of claim 1, further comprising:
identifying a third field that does not have an assigned label that indicates a semantic meaning of the third field, wherein no candidate labels were previously identified for potential assignment to the third field;
identifying a third set of one or more candidate labels, for potential assignment to the third field, and a corresponding third set of candidate label scores, the third set of candidate labels including a third candidate label corresponding to a third candidate label score in the third set of candidate label scores; and
evaluating whether to assign the third candidate label to the third field, the evaluating comprising:
presenting the third candidate label to the user by generating an interface through which the user can provide input indicating whether to assign the third candidate label to the third field.

5. The method of claim 1, wherein identifying the set of one or more candidate labels for potential assignment to the first field and the corresponding set of candidate label scores comprises:
applying a plurality of label proposal tests to a profile of the first field to obtain a plurality of label proposals and a corresponding plurality of label proposal scores; and
determining the set of one or more candidate labels and the corresponding set of candidate label scores using the plurality of label proposals and the corresponding plurality of label proposal scores.

6. The method of claim 5, wherein the plurality of label proposal tests are associated with a plurality of weight values, and determining the set of candidate label scores comprises:
determining the set of candidate label scores using the plurality of label proposal scores and the plurality of weight values.

7. The method of claim 1, further comprising:
in response to receiving user input indicating to assign the first candidate label to the first field, storing, in a data store, an identifier of the first field in association with the first candidate label to indicate the semantic meaning of the first field.

8. The method of claim 1, further comprising using the data processing system to perform:
after evaluating whether to assign the first candidate label to the first field:
determining a label assigned to the first field;
associating one or more attributes with the first field based on the label assigned to the first field, the one or more attributes indicating that data in the first field includes personally identifying information (PII); and
processing at least some data from the first field based on the one or more attributes.

9. The method of claim 8, wherein processing the at least some data from the first field based on the one or more attributes comprises masking of PII in data from the first field.

10. The method of claim 1, further comprising using the data processing system to perform:
after evaluating whether to assign the first candidate label to the first field, using a label assigned to the first field to execute at least one software application that performs data quality enforcement, PII anonymization, and/or data masking of personally identifiable information (PII).

11. The method of claim 10, wherein the label assigned to the first field indicates that the first field includes PII.

12. The method of claim 1, further comprising using the data processing system to perform:
after the evaluating whether to assign the first candidate label to the first field,
receiving a request to process data managed by the data processing system;
accessing, in response to the request, the label assigned to the first field;
determining, based on the label assigned to the first field, one or more data processing rules for processing the data; and
processing the data in accordance with the determined one or more data processing rules.

13. The method of claim 12, wherein the data includes data stored in the first field.

14. The method of claim 13, wherein the determining, based on the label assigned to the first field, one or more data processing rules for processing the data includes:
identifying, in a label index data structure, the label assigned to the first field;
identifying, from the label index data structure, the one or more data processing rules associated with the label identified in the label index data structure, wherein one or more data processing rules are associated with the label in the label index data structure.

15. The method of claim 14, wherein the label assigned to the first field indicates that the data stored in the first field includes PII, and the one or more data processing rules include one or more data masking rules to mask PII.

16. The method of claim 15, wherein processing the data in accordance with the determined one or more data processing rules comprising masking PII included in the first field without scanning data in the first field to determine whether it includes PII.

17. The method of claim 12, wherein the label assigned to the first field indicates that the data stored in the first field includes PII, and the one or more data processing rules include one or more data anonymization rules to anonymize PII in the first field.

18. The method of claim 12, wherein processing the data in accordance with the determined one or more data processing rules comprises processing the data in accordance with the determined one or more data processing rules without analyzing data stored in the first field.

19. A data processing system for discovering semantic meaning of data in fields included in one or more data sets, the data processing system comprising:
at least one processor; and
at least one non-transitory computer-readable storage medium storing instructions that, when executed by the at least one processor, cause the at least one processor to perform a method comprising:
identifying a first field having a previously-assigned label that indicates a semantic meaning of the first field, the previously-assigned label having a corresponding previously-determined label score;
identifying a set of one or more candidate labels, for potential assignment to the first field instead of the previously-assigned label, and a corresponding set of candidate label scores, the set of candidate labels including a first candidate label corresponding to a first candidate label score in the set of candidate label scores; and evaluating, using the previously-determined label score and the first candidate label score, whether to assign the first candidate label to the first field, the evaluating comprising:
- when the first candidate label score is at least a first threshold amount greater than the previously-determined label score, presenting the first candidate label to a user by generating an interface through which the user can provide input indicating whether to assign the first candidate label to the first field instead of the previously-determined label; and
- when the first candidate label score is not at least the threshold amount greater than the previously determined label score, bypassing presentation of the first candidate label to the user.

20. At least one non-transitory computer-readable storage medium storing instructions that, when executed by at least one processor of a data processing system, cause the at least one processor to perform a method for discovering meaning of data in fields included in one or more data sets, the method comprising:

identifying a first field having a previously-assigned label that indicates a semantic meaning of the first field, the previously-assigned label having a corresponding previously-determined label score;

identifying a set of one or more candidate labels, for potential assignment to the first field instead of the previously-assigned label, and a corresponding set of candidate label scores, the set of candidate labels including a first candidate label corresponding to a first candidate label score in the set of candidate label scores; and evaluating, using the previously-determined label score and the first candidate label score, whether to assign the first candidate label to the first field, the evaluating comprising:
- when the first candidate label score is at least a first threshold amount greater than the previously-determined label score, presenting the first candidate label to a user by generating an interface through which the user can provide input indicating whether to assign the first candidate label to the first field instead of the previously-determined label; and
- when the first candidate label score is not at least the threshold amount greater than the previously determined label score, bypassing presentation of the first candidate label to the user.

\* \* \* \* \*